US012496252B2

(12) United States Patent
Ayu et al.

(10) Patent No.: US 12,496,252 B2

(45) Date of Patent: Dec. 16, 2025

(54) ADAPTIVE HIGH FREQUENCY CHEST WALL OSCILLATION SYSTEM

(71) Applicant: HILL-ROM SERVICES PTE. LTD., Singapore (SG)

(72) Inventors: Aaron A. Ayu, Singapore (SG); Kok Boon R. Ong, Singapore (SG); Deny D. Barilea, Singapore (SG); John A. Bobey, Daniel Island, SC (US); Leonardo B. Artiaga, Jr., Singapore (SG); Xiaolan Zhang, Singapore (SG); Wei Bian, Singapore (SG); Yong Guan Tay, Singapore (SG); Mo Chuk Wong, Singapore (SG); Qingqing Koh, Singapore (SG); Joo Cheng Chhua, Singapore (SG); Stacey Reuland, Crystal, MN (US); Mathieu Bernard, Pluvigner (FR)

(73) Assignee: HILL-ROM SERVICES PTE. LTD., Singapore (SG)

( * ) Notice: Subject to any disclaimer, the term of this patent is extended or adjusted under 35 U.S.C. 154(b) by 693 days.

(21) Appl. No.: 17/093,764

(22) Filed: Nov. 10, 2020

(65) Prior Publication Data

US 2021/0137779 A1 May 13, 2021

Related U.S. Application Data

(60) Provisional application No. 62/933,920, filed on Nov. 11, 2019.

(51) Int. Cl.
*A61H 23/02* (2006.01)

(52) U.S. Cl.
CPC . *A61H 23/0254* (2013.01); *A61H 2201/1619* (2013.01); *A61H 2201/165* (2013.01);
(Continued)

(58) Field of Classification Search
CPC ................ A61H 23/0254; A61H 23/00; A61H 2201/1619; A61H 2201/165;
(Continued)

(56) References Cited

U.S. PATENT DOCUMENTS

| | | | |
|---|---|---|---|
| 1,833,103 | A | 11/1931 | Anderson |
| 2,699,163 | A | 1/1955 | Carl-Gunnar |

(Continued)

FOREIGN PATENT DOCUMENTS

| | | | |
|---|---|---|---|
| DE | 4433068 | A1 | 3/1996 |
| DE | 19726281 | A1 | 1/1998 |

(Continued)

OTHER PUBLICATIONS

Japanese Office Action issued in Japanese Patent Application No. 2022-526807, drafted Apr. 14, 2023, and its English translation (8 pages).

(Continued)

*Primary Examiner* — Tu A Vo
*Assistant Examiner* — Kelsey E Baller
(74) *Attorney, Agent, or Firm* — Barnes & Thornburg LLP

(57) ABSTRACT

Devices, systems, and methods for HFCWO oscillation therapy can enhance expectoration by preferred impact to the user to encourage mucus dislodging, including by successive pressure imposition to a chest engagement device to provide HFCWO.

30 Claims, 54 Drawing Sheets

(52) U.S. Cl.
CPC ................ *A61H 2201/5023* (2013.01); *A61H 2201/5084* (2013.01); *A61H 2205/084* (2013.01); *A61H 2230/405* (2013.01)

(58) Field of Classification Search
CPC .... A61H 2201/5023; A61H 2201/5084; A61H 2201/5007; A61H 2201/5035; A61H 2201/5043; A61H 2201/5046; A61H 2201/5058; A61H 2201/5097; A61H 2201/1409; A61H 2201/1621; A61H 2201/501; A61H 2201/5038; A61H 2205/084; A61H 2230/405; A61H 9/0007; A61B 5/08; A61B 5/113; A61B 5/7275; A61B 5/746; A61B 2560/0462; A61B 2562/0219
See application file for complete search history.

(56) References Cited

U.S. PATENT DOCUMENTS 2,762,366 A 9/1956 Huxley, III et al.
2,772,673 A 12/1956 Huxley
2,779,329 A 1/1957 Huxley, III et al.
2,780,222 A 2/1957 Polzin et al.
2,832,335 A 4/1958 Huxley et al.
2,845,062 A 7/1958 Kling et al.
3,120,228 A 2/1964 Huxley, III
3,333,581 A 8/1967 Robinson et al.
3,548,811 A 12/1970 Wilson
3,566,862 A 3/1971 Schuh et al.
3,896,794 A 7/1975 Mcgrath
4,003,373 A 1/1977 Spelio
4,079,733 A 3/1978 Denton et al.
4,398,531 A 8/1983 Havstad
4,424,806 A 1/1984 Newman et al.
4,637,386 A 1/1987 Baum
4,838,263 A * 6/1989 Warwick ........... A61M 16/0006 601/44
4,971,042 A 11/1990 Lerman
4,977,889 A 12/1990 Budd
5,056,505 A 10/1991 Warwick et al.
5,137,432 A 8/1992 Tsai
5,163,818 A 11/1992 Betsill et al.
5,360,323 A 11/1994 Hsieh
5,398,676 A 3/1995 Press et al.
5,453,081 A 9/1995 Hansen
5,508,908 A 4/1996 Kazama et al.
5,529,467 A 6/1996 Rometsch
5,551,843 A 9/1996 Hauser
5,569,170 A 10/1996 Hansen
5,682,878 A 11/1997 Ogden
5,769,797 A 6/1998 Van Brunt et al.
5,830,164 A 11/1998 Cone et al.
5,848,878 A 12/1998 Conti et al.
5,997,488 A 12/1999 Gelfand et al.
6,030,353 A 2/2000 Van Brunt
6,036,662 A 3/2000 Van Brunt et al.
6,066,101 A 5/2000 Johnson et al.
6,179,793 B1 1/2001 Rothman et al.
6,182,656 B1 2/2001 Sagiv
6,210,345 B1 4/2001 Van Brunt
6,254,556 B1 7/2001 Hansen et al.
6,290,660 B1 9/2001 Epps et al.
6,340,025 B1 1/2002 Van Brunt
D453,560 S 2/2002 Van Brunt
6,361,512 B1 3/2002 Mackay et al.
6,379,316 B1 4/2002 Van Brunt et al.
6,390,790 B1 5/2002 Robertson et al.
6,415,791 B1 7/2002 Van Brunt
6,468,237 B1 10/2002 Lina
6,488,641 B2 12/2002 Hansen
6,544,202 B2 4/2003 McEwen et al.
6,547,749 B2 4/2003 Hansen
6,558,338 B1 5/2003 Wasserman
6,605,050 B2 8/2003 Hansen
6,676,614 B1 1/2004 Hansen et al.
6,708,690 B1 3/2004 Hete et al.
D504,945 S 5/2005 Van Brunt et al.
6,958,046 B2 10/2005 Warwick et al.
7,115,104 B2 10/2006 Van Brunt et al.
7,121,808 B2 10/2006 Van Brunt et al.
D531,728 S 11/2006 Helgeson
7,207,953 B1 * 4/2007 Goicaj .................. A61H 23/02 601/134
D547,718 S 7/2007 Helgeson et al.
7,278,978 B1 10/2007 Hansen et al.
7,316,658 B2 1/2008 Gagne
7,374,550 B2 5/2008 Hansen et al.
7,425,203 B2 9/2008 Van Brunt et al.
D585,991 S 2/2009 Helgeson et al.
7,491,182 B2 2/2009 Van Brunt
7,537,575 B2 5/2009 Hansen et al.
7,582,065 B2 9/2009 Van Brunt et al.
7,615,017 B2 11/2009 Van Brunt et al.
7,713,219 B2 5/2010 Helgeson et al.
7,736,324 B1 6/2010 Helgeson
7,762,967 B2 7/2010 Warwick et al.
7,770,479 B2 8/2010 Hansen et al.
D639,954 S 6/2011 Helgeson et al.
8,038,633 B2 10/2011 Van Brunt et al.
8,052,626 B2 * 11/2011 Huster ................ A61H 9/0078 601/149
8,087,316 B2 1/2012 Holtgraver
8,192,381 B2 6/2012 Nozzarella
8,197,428 B2 6/2012 Helgeson et al.
8,202,237 B2 6/2012 Helgeson et al.
8,257,287 B2 9/2012 Hanlon et al.
8,257,288 B2 9/2012 Hansen et al.
8,353,207 B2 1/2013 Hakansson
8,460,223 B2 * 6/2013 Huster .................. A61H 9/005 601/149
8,708,937 B2 4/2014 Van Brunt et al.
8,740,824 B2 6/2014 Hansen et al.
8,845,562 B2 9/2014 Receveur et al.
8,936,447 B2 1/2015 Abal
D742,013 S 10/2015 Helgeson et al.
9,222,818 B2 12/2015 Hakansson et al.
9,289,350 B2 3/2016 Helgeson et al.
9,316,249 B2 4/2016 Yoshizawa et al.
9,372,662 B2 6/2016 Hakansson et al.
9,901,510 B2 2/2018 Smith
9,968,511 B2 5/2018 Huster et al.
10,016,335 B2 7/2018 Hansen et al.
10,518,048 B2 12/2019 Bobey et al.
10,524,975 B2 1/2020 Clapp et al.
2001/0007928 A1 7/2001 Hansen
2001/0027791 A1 10/2001 Wallace et al.
2002/0016560 A1 2/2002 Hansen
2002/0042938 A1 4/2002 Hansen
2002/0111571 A1 * 8/2002 Warwick ........... A61M 16/0006 601/44
2004/0097849 A1 * 5/2004 Van Brunt ........... A61H 9/0078 601/44
2005/0172965 A1 8/2005 Thulin
2005/0234372 A1 10/2005 Hansen et al.
2005/0235988 A1 10/2005 Hansen et al.
2006/0036199 A1 2/2006 Warwick et al.
2006/0101581 A1 * 5/2006 Blanchard .......... A61G 7/05784 5/713
2007/0004992 A1 1/2007 Van Brunt et al.
2007/0093731 A1 4/2007 Warwick et al.
2007/0203433 A1 * 8/2007 Murphy ................. A61H 7/001 601/15
2008/0086062 A1 * 4/2008 Hansen ................. F04B 45/043 128/202.19
2008/0092884 A1 4/2008 Hansen et al.
2008/0108921 A1 5/2008 Helgeson et al.
2008/0294075 A1 11/2008 Nozzarella
2009/0093740 A1 4/2009 Helgeson et al.
2009/0234256 A1 9/2009 Helgeson et al.
2009/0306556 A1 12/2009 Hansen et al.
2010/0016770 A1 1/2010 Van Brunt et al.

(56) References Cited

U.S. PATENT DOCUMENTS

| | | | | |
|---|---|---|---|---|
| 2012/0022414 | A1* | 1/2012 | Receveur | A61H 9/0078 601/152 |
| 2013/0118175 | A1 | 5/2013 | Eisenmenger et al. | |
| 2013/0261518 | A1 | 10/2013 | Hansen et al. | |
| 2013/0289455 | A1 | 10/2013 | Clapp et al. | |
| 2013/0331747 | A1 | 12/2013 | Helgeson et al. | |
| 2014/0276271 | A1* | 9/2014 | Stryker | A61H 23/04 601/107 |
| 2014/0290659 | A1 | 10/2014 | Chen et al. | |
| 2016/0151232 | A1 | 6/2016 | Clapp et al. | |
| 2016/0184174 | A1 | 6/2016 | Hansen et al. | |
| 2017/0007494 | A1 | 1/2017 | Rock et al. | |
| 2017/0281460 | A1 | 10/2017 | Zgoda et al. | |
| 2019/0133873 | A1* | 5/2019 | Chase | A61F 13/00051 |
| 2019/0142686 | A1* | 5/2019 | Lee | A61H 31/00 601/44 |
| 2019/0274919 | A1* | 9/2019 | Lee | A61B 7/04 |
| 2021/0283008 | A1* | 9/2021 | Shockley, Jr. | A61B 5/4833 |
| 2022/0354736 | A1* | 11/2022 | Chen | A61H 23/02 |

FOREIGN PATENT DOCUMENTS

| | | | | |
|---|---|---|---|---|
| FR | 342256 | A | 9/1904 | |
| KR | 20130037636 | A * | 4/2013 | A61B 7/003 |
| SE | 143165 | C1 | 12/1953 | |
| WO | 0124698 | A1 | 4/2001 | |
| WO | 0206673 | A1 | 1/2002 | |
| WO | 2015171078 | A1 | 11/2015 | |
| WO | WO-2017081352 | A1 * | 5/2017 | A61H 23/02 |
| WO | WO-2021214769 | A1 * | 10/2021 | A61B 7/003 |

OTHER PUBLICATIONS

Partial Supplementary European Search Report for European Patent Application No. 20887273.9, dated Dec. 12, 2022 (13 pages).

Examination Report No. 2 issued by the Australian Patent Office on Sep. 26, 2023 for Australian Patent Application No. 2020382453; 3 pages.

Office Action issued in Japanese Patent Application No. 2022-526807 on Aug. 18, 2023, and its English translation (7 pages).

Decision of Refusal issued in Japanese Patent Application No. 2022-526807 dated Feb. 16, 2024, and its English translation (5 pages).

Examination Report No. 3 issued by the Australian Patent Office on Dec. 22, 2023; 3 pages.

Chinese Office Action issued by the Chinese Patent Office on Jan. 23, 2025, for Chinese Patent Application No. 202080078335.9 and its English translation (14 pages).

Chinese Office Action issued by the Chinese Patent Office on Aug. 6, 2025, for Chinese Patent Application No. 202080078335.9 and its English translation (11 pages).

* cited by examiner

ADAPTIVE HIGH FREQUENCY CHEST WALL OSCILLATION SYSTEM

FIELD

The present disclosure relates to devices, systems, and methods for chest wall therapy. More specifically, the present disclosure relates to devices, systems, and methods for high frequency chest wall oscillation (HFCWO) therapy.

High frequency oscillatory impact to a patient's chest wall can encourage freeing of mucus from the upper respiratory tract. For example, patients suffering from mucus build up, such as cystic fibrosis patients, can be successfully treated with HFCWO therapy. Yet, impact to the patient can be uncomfortable and/or can provide inefficient use of force to free mucus.

SUMMARY

The present application discloses one or more of the features recited in the appended claims and/or the following features which, alone or in any combination, may comprise patentable subject matter.

According to an aspect of the present disclosure, a chest wall oscillation therapy system may include a chest engagement device for communicating impact force to a patient's chest; a force generator arranged to generate successive force of impact as a therapy regime for the patient, the force generator arranged in communication with the chest engagement device to communicate force of impact from the force generator into impact force to the patient's chest to encourage airway clearance, and a therapy control system. The therapy control system may include at least one sensor arranged to detect an indication of a breathing pattern of the patient.

In some embodiments, the at least one sensor may include at least one micro electromechanical sensor. The at least one sensor may be arranged to provide at least nine-axis tracking of chest movement of the patient. The at least one sensor may include at least one accelerometer. The at least one sensor may include at least one gyroscope. The at least one sensor may include at least one magnetometer.

In some embodiments, the therapy control system may include at least one processor for providing construction of motion based on data received from the at least one sensor. The at least one sensor may be mounted to the chest engagement device to detect motion of the patient's chest. The therapy control system may be arranged in communication with a personal mobile device to communicate indication of the patient's chest.

In some embodiments, the therapy control system may be arranged to configure a therapy regime of the force generator according to data from the at least one sensor. The therapy control system may configure the therapy regime of the force generator to increase at least one of oscillation rate and intensity of the impact force while the patient exhales. The therapy control system may configure the therapy force generator to have an exhalation setting for at least one of oscillation frequency and intensity of the impact force during patient exhalation, the exhalation setting being greater than a predetermined nominal setting for the at least one of oscillation frequency and intensity of the impact force. The therapy control system may configure the therapy force generator to have an inhalation setting for least one of oscillation frequency and intensity of the impact force during patient inhalation, the inhalation setting being less than during patient exhalation. The inhalation setting may be less than or equal to the predetermined nominal setting.

In some embodiments, the therapy control system may configure the therapy regime of the force generator to decrease at least one of oscillation rate and intensity of the impact force while the patient inhales. The therapy control system may configure the therapy force generator to have an inhalation setting for at least one of oscillation frequency and intensity of the impact force during patient inhalation, the inhalation setting being less than a predetermined nominal setting for the at least one of oscillation frequency and intensity of the impact force. The therapy control system may configure the therapy force generator to have an exhalation setting for at least one of oscillation frequency and intensity of the impact force during patient exhalation, the exhalation setting being greater than during patient inhalation. The exhalation setting may be greater than or equal to the predetermined nominal setting.

In some embodiments, the therapy control system may include a graphical user interface for communicating with a user. The graphical user interface may be arranged to present selectable options for user selection. The selectable options for user selection may include an oscillation start button for initiating operation to provide impact force to the patient.

In some embodiments, responsive to user selection of the oscillation start button, the graphical user interface may present a pause button as a selectable option. The selectable options for user selection may include a new predetermined therapy regime button for user creation of a new predetermined therapy regime for implementation as the therapy regime. The selectable options for user selection may include an unlock button. Responsive to user selection of the unlock button at least one of frequency, intensity, and time buttons may be presented as selectable options for user selection to configure corresponding features.

In some embodiments, the selectable options for user selection may include a predetermined therapy regime tab for implementing a predetermined therapy regime as the therapy regime. Responsive to user selection of at least one of the predetermined therapy regime tab and an unlock button, a cough pause tab may be presented for user selection to configure cough pause settings of the predetermined therapy regime. Responsive to user selection of the cough pause tab at least one of a cough pause enable switch and/or auto-restart switch may be presented for user selection. In some embodiments, the selectable options may include a pull tab for user activation to present additional selectable options. The additional selectable options may include at least one of a home button, a cough pause settings button, and a delete therapy button.

In some embodiments, responsive to user selection of cough pause enable switch to affirm cough pause, at least one of a pause duration and pause frequency button may be presented for user selection to adjust the associated enable switch and auto-restart switch presented for user selection to configure corresponding features. The chest engagement device may comprise a wearable garment.

According to another aspect of the present disclosure, a chest wall oscillation therapy system may include a chest engagement device for communicating impact force to a patient's chest; a force generator arranged to generate successive force of impact as a therapy regime for the patient, the force generator arranged in communication with the chest engagement device to communicate force of impact from the force generator into impact force to the patient's chest to encourage airway clearance; and at least one force connection line. The at least one force connection line may include a first end configured for connection with the chest engagement device and a second end, opposite the first end for connection with the force generator. The at least one force connection line may include a connector system for selectively securing at least one of the first and second ends with the force generator.

In some embodiments, the connector system may include a connector terminal secured with one of the force generator and the at least one force connection line. The connector terminal may include a connector base having a flow pathway defined therethrough and at least one engagement tab extending radially from the connector base. The at least one engagement tab may form a resilient member positionable between an extended position outward from the connector base and a contracted position closer to the connector base than the extended position.

In some embodiments, the at least one engagement tab may include a latch body and at least one latch tab projecting radially from the latch body for engagement with a catch of another one of the force generator and the at least one force connection line. The latch body may extend cantilevered from a fulcrum connected with the connector base.

In some embodiments, the latch body may be connected on one end with the fulcrum. The latch tab may be arranged near a free end of the latch body opposite the one end. The latch body may define an engagement portion arranged between the one end and the free end for engagement with a user's hand to operate the engagement tab between the extended and contracted positions.

In some embodiments, the latch body may be connected on one end with the fulcrum. The latch body may define a free end opposite the one end. The latch tab may be arranged between the one end and the free end. In some embodiments, an engagement portion may be defined near the free end for engagement with a user's hand to operate the engagement tab between the extended and contracted positions.

In some embodiments, the connector system may include a connector receiver secured with another one of the force generator and the at least one force connection line. The connector receiver may be arranged for selectively receiving the connector terminal to provide communication of force of impact from the force generator.

In some embodiments, the connector receiver may include a flow pathway for communication with the flow pathway of the connector terminal and a latch receiver for receiving selective engagement with the at least one engagement tab to selectively secure the connector terminal and the connector receiver together.

The latch receiver may be arranged radially outward of the flow pathway. The flow pathway of the connector receiver may be defined at least partially by a receiver base configured for engagement with the connector base to provide communication of the flow pathways.

In some embodiments, the latch receiver may be arranged to receive the at least one engagement tab therein. The receiver base may be engaged with the connector base. One of the connector receiver and the connector terminal may include a catch for receiving selective engagement of at least one latch tab of another one of the connector receiver and the connector terminal to block against disengagement of the receiver base and connector base.

In some embodiments, the connector receiver may include the catch. The connector terminal may include the at least one latch tab.

In some embodiments, the connector system may include a connector terminal secured with one of the at least one force connection line and the force generator. The connector system may include a connector receiver secured with another one of the at least one force connection line and the force generator. One of the connector terminal and the connector receiver may include a connector base formed as a male engagement member for reception into a female engagement member of another one of the connector terminal and the connector receiver to provide a flow path connection between the connector terminal and the connector receiver. The male engagement member may be tapered.

In some embodiments, the male engagement member may be configured for selective expansive to form a pressfit with the female engagement member, responsive to threshold pressure in the flow path connection from the force generator. At least one of the connector terminal and the connector receiver may include at least one magnet. At least another one of the connector terminal and the connector receiver may include at least one magnetic member having magnetic susceptibility to block against disengagement of the connector terminal and the connector receiver.

In some embodiments, the at least one magnet may be an electromagnet. The at least one magnet may include a permanent magnet. The at least one magnetic member may be arranged near an engagement face of the at least another one of the connector terminal and connector receiver. In some embodiments, the at least one magnet may be arranged near an engagement face of the at least one of the connector terminal and connector receiver.

In some embodiments, the at least one magnet may be arranged near the engagement face. The at least one magnet may include a ferromagnetic ring arranged on a side of a radial wall from the magnet. In some embodiments, the he chest engagement device comprises a wearable garment.

According to another aspect of the present disclosure, a chest wall oscillation therapy force generator for generating successive force of impact as a therapy regime for a patient to encourage airway clearance may include a piston pump assembly comprising at least two pistons each disposed within corresponding piston wells, each piston arranged for reciprocating movement with the corresponding piston well to generate pressure for chest wall oscillation therapy according to the therapy regime; a drive shaft arranged for connection with a drive motor to provide reciprocating drive for the at least two pistons; and a drive linkage operably connected with each of the at least two pistons and the drive shaft to transfer rotational drive of the drive shaft into reciprocating motion of the pistons.

In some embodiments, the drive linkage may include at least one cam member coupled between the drive shaft and each one of the at least two pistons to transfer rotation drive of the driveshaft into reciprocating motion of the piston. The at least one cam members may be arranged eccentric relative to the drive shaft.

In some embodiments, the drive linkage may include a linkage strut. The linkage strut may be pivotably coupled with the corresponding piston on one end. The linkage strut may define a cylindrical yoke on another end for receiving the at least one cam member. Eccentric rotation of the at least one cam member within the cylindrical yoke may drive the one end of the linkage strut for reciprocating motion for transfer to the corresponding piston.

In some embodiments, the drive linkage may include a number of radial links. The radial links may each be fixed with the drive shaft on one end to receive rotational drive. The radial links may each be coupled with a corresponding one of the pistons on the opposite end. Each of the radial links may include the at least one cam member arranged on the opposite end.

In some embodiments, each piston may include a yoke track. Each yoke track may have a length defined perpendicularly to a direction of reciprocal motion of the piston. Each yoke track may be adapted to receive the corresponding at least one cam member for travel along the length of the yoke track to translate rotational motion of the drive linkage into reciprocal motion of the corresponding piston.

In some embodiments, each radial link may include a section of a strut. The radial links may extend in opposite directions from connection with the drive shaft.

In some embodiments, the generator may include the drive motor comprising a stepper motor. The drive motor may be configured to drive rotation of the drive shaft in a first rotational direction and in a second rotational direction opposite to the first rotational direction.

In some embodiments, a therapy control system may be arranged to govern operation of the force generator. The therapy control system may be adapted to receive indication of breathing motion of a patient's chest and to determine a breathing pattern of the patient. The therapy control system may be adapted to configure the therapy regime based on the breathing pattern.

In some embodiments, the therapy control system may configure the therapy regime to increase at least one of force oscillation rate and intensity while the patient exhales. Increasing at least one of force oscillation rate and intensity while the patient exhales may include increasing at least one of force oscillation rate and intensity from a first value to a second value greater than the first value for a period of time in which the patient is exhaling. The period of time in which the patient is exhaling may be determined according to the breathing pattern.

In some embodiments, after completion of the period of time, the therapy control system may configure the therapy regime to decrease at least one of force oscillation rate and intensity for another period of time. The another period of time may comprise time when the patient is inhaling. The therapy control system may configure the therapy regime to decrease at least one of force oscillation rate and intensity while the patient inhales.

In some embodiments, decreasing at least one of force oscillation rate and intensity while the patient inhales may include decreasing at least one of force oscillation rate and intensity from a first value to a second value less than the first value for a period of time in which the patient is inhaling. The period of time in which the patient is inhaling may be determined according to the breathing pattern. After completion of the period of time, the therapy control system may configure the therapy regime to increase at least one of force oscillation rate and intensity for another period of time. In some embodiments, the another period of time may include time when the patient is exhaling.

According to another aspect of the present disclosure, a chest wall oscillation therapy system may include a chest engagement device for communicating impact force to a patient's chest as a therapy regime for the patient to encourage airway clearance; a pump assembly for generating pressure for the chest engagement device to provide impact force of impact as, the pump assembly including at least one pressurization bank comprising at least one positive port for providing positive pressure and at least one negative port for providing negative pressure; and a pressure control assembly connected with the pump assembly to communicate pressure with the chest engagement device. The pressure control assembly may include a casing defining a first flow path and a second flow path, and a control body assembly including a first body arranged within the first flow path to regulate flow through the first flow path and a second body arranged within the second flow path to regulate flow through the second flow path. The first flow path may have a pump side connected with the positive port of the pump assembly. The second flow path may have a pump side connected with the negative port of the pump assembly. Each of the first and second bodies may be selectively operable between open flow and closed flow position.

In some embodiments, the control bodies may each include a flow channel adapted for selective arrangement in communication with the corresponding flow path in the open flow position to allow communication of pressure through the corresponding flow path and for selective arrangement out of communication with the corresponding flow path in the closed flow position to block communication of pressure through the corresponding flow path. The first and second control bodies may each include at least two angular positions comprising the open flow position. The open flow position of each of the first and second bodies may include arrangement of the flow channel in communication with the corresponding flow path to allow communication of pressure through the corresponding flow path from one end of the flow channel to another end of the flow channel.

In some embodiments, the open flow position of each of the first and second bodies may include arrangement of the flow channel in communication with the corresponding flow path to allow communication of pressure through the corresponding flow path from the another end of the flow channel to the one end of the flow channel. Each of the first and second control bodies may be adapted to rotate within its corresponding flow path to alternate between open flow and closed flow position. The first and second control bodies may each be adapted to rotate within their corresponding flow path such that only one of the first and second control bodies is arranged to have open flow position at any moment of time.

In some embodiments, the first and second control bodies may be arranged such that the flow channel of the first control body and the flow channel of the second body are positioned perpendicularly to each other during rotation. The first and second control bodies may each be formed to have spherical shape. The first and second control bodies may each be formed as an oblate spheroid.

In some embodiments, the flow channel of each of the first and second control bodies may extend through the control body along a longitudinal dimension. In some embodiments, the first and second control bodies may be connected with a drive shaft for rotation within the respective flow paths. The drive shaft may be driven for rotation by a drive motor governed for operation by a therapy control system. In some embodiments, the chest engagement device may include a wearable garment.

According to another aspect of the present disclosure, a chest wall oscillation therapy system may comprise a chest engagement device for communicating impact force to a patient's chest; a force generator arranged to generate successive force of impact as a therapy regime for the patient, the force generator arranged in communication with the chest engagement device to communicate force of impact from the force generator into impact force to the patient's chest to encourage airway clearance, and a therapy control system. The therapy control system may comprise a graphical user interface for communicating with a user.

In some embodiments, the graphical user interface may be arranged to present selectable options. The selectable options may include a therapy initiation button for initiating operation to provide impact force to the patient. Responsive to user activation of the therapy initiation button, the graphical user interface may present a pause button as a selectable option.

In some embodiments, the selectable options may include a pull tab for user activation to present additional selectable options. The additional selectable options may include at least one of a home button, a cough pause settings button, and a delete therapy button. The selectable options may include a new predetermined therapy regime button for user creation of a new predetermined therapy regime for implementation as the therapy regime. The new predetermined therapy regime button may be accessible by user activation of a pull tab for expansion.

In some embodiments, the selectable options may include an unlock button. Responsive to user activation of the unlock button at least one of frequency, intensity, and time buttons may be presented as selectable options for user activation to configure corresponding features. User activation of the unlock button may include dragging the unlock button to a predetermined extent. The selectable options may include a predetermined therapy regime tab for implementing a predetermined therapy regime as the therapy regime.

In some embodiments, responsive to user activation of at least one of the predetermined therapy regime tab and an unlock button, a cough pause tab may be presented for user activation to configure cough pause settings of the predetermined therapy regime. Responsive to user activation of the cough pause tab, at least one of a cough pause enable switch and auto-restart switch may be presented for user selection. Responsive to user activation of cough pause enable switch to affirm cough pause, at least one of a pause duration and pause frequency interval button may be presented for user activation to adjust the associated features.

In some embodiments, the chest engagement device may comprise a wearable garment. In some embodiments, the therapy control system may include a garment size toggle switch. The garment size toggle switch may be operable for user selection between an on position in which the therapy control system adapts configuration of the force generator to account for the size of the wearable garment, and an off position in which the therapy control system does not adapt configuration of the force generator to account for the size of the wearable garment.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION

Figure 1:
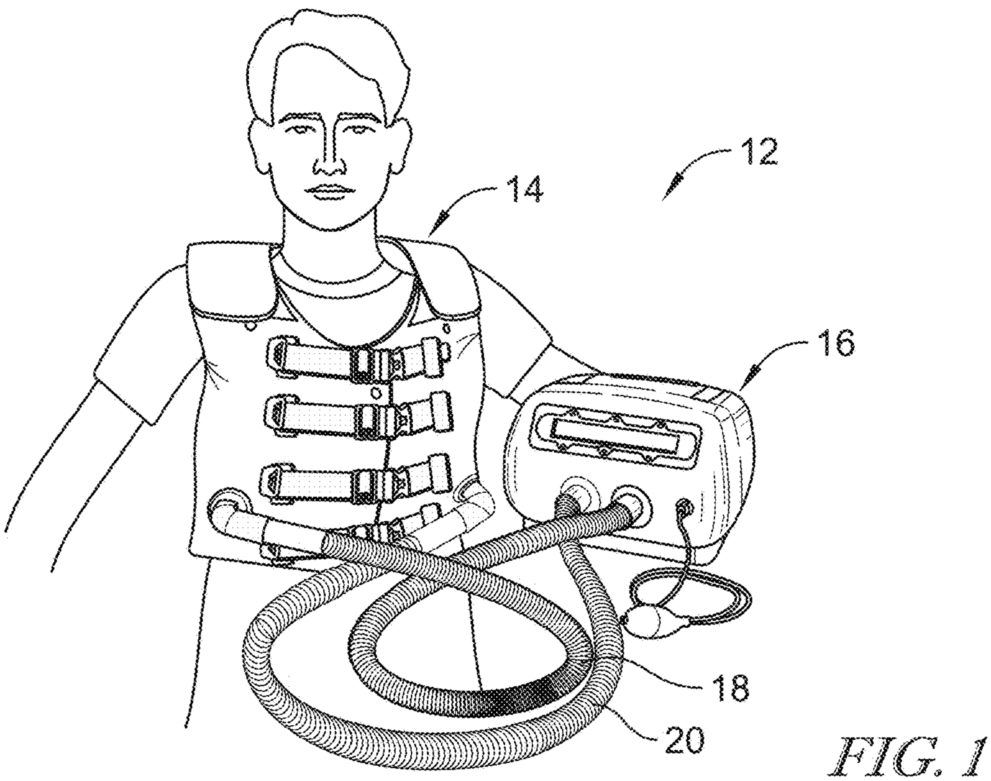
FIG. 1 is a perspective view of a high frequency chest wall oscillation system including a chest engagement device (vest) and force generator.

For the purposes of promoting an understanding of the principles of the disclosure, reference will now be made to a number of illustrative embodiments illustrated in the drawings and specific language will be used to describe the same.

Build-up within the upper respiratory system, for example, mucus build-up in cystic fibrosis patients, can be effectively treated by encouraging expectoration. High Frequency Chest Wall Oscillation (HFCWO) can assist in loosening build-up.

Referring now to FIG. 1, a chest wall therapy system 12 is shown including a chest engagement device 14 embodied as a wearable garment vest, a therapeutic force generator 16 in communication with the vest 14 via a pair of hoses 18,20 to provide force of impact for communication by the vest 14 to the patient's torso region to provide impact force to the chest walls. The application of successive impact force to impose high frequency oscillation on the chest wall as a therapy regime can assist in dislodging mucus from the upper respiratory tract.

Figure 2:
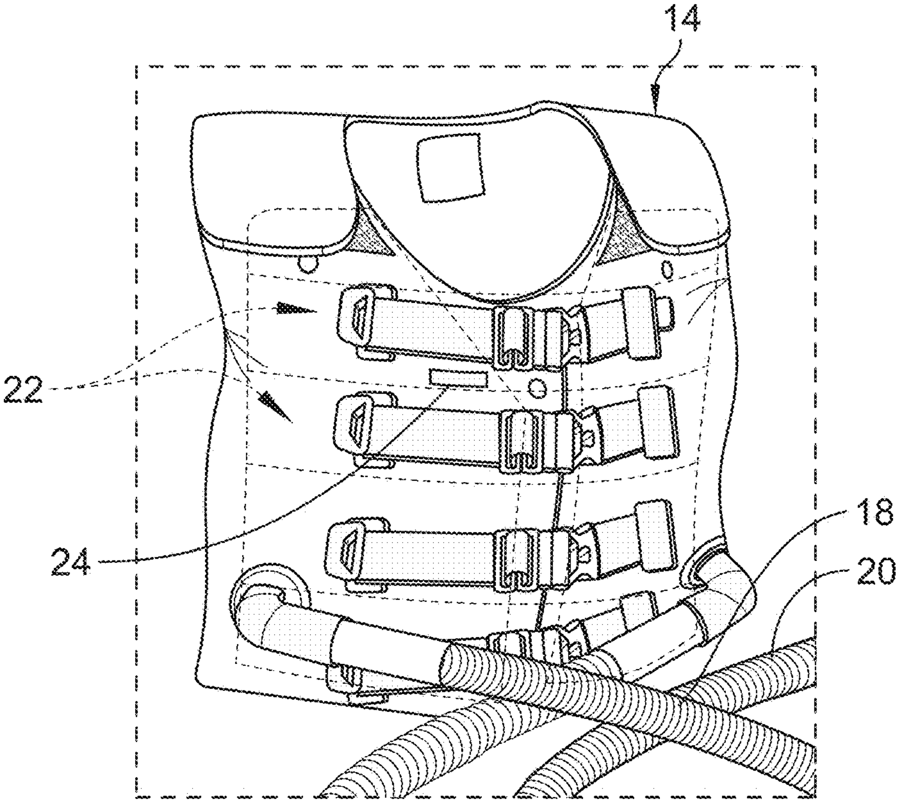
FIG. 2 is a closer perspective view of the chest engagement device of FIG. 1.

The force generator 16 is illustratively embodied to include an air pump assembly adapted to provide positive pressure and negative pressure through the respective hoses 18,20 to the vest 14. In some embodiments, arrangements may include only a positive pressure hose or hoses, for example, to provide positive pressure force, while exhaust of pressurized fluid may occur without return to the force generator. Referring to FIG. 2, the vest 14 includes a number of pressurizable chambers 22, shown in broken line, defined within the garment. The pressurizable chambers 22 are arranged in communication with the hoses 18,20 to receive successive pressurization and depressurization to inflate and deflate successively, imposing an oscillating impact force on the patient.

The vest 14 includes a sensor 24 arranged to detect motion of the patient's chest wall to determine breathing pattern. The sensor 24 is secured with the vest 14, illustratively internal to the garment. The sensor 24 is illustratively positioned near the sternum section of the vest 14 but in some embodiments may have any suitable arrangement for facilitating determination of breathing information.

Figure 3:
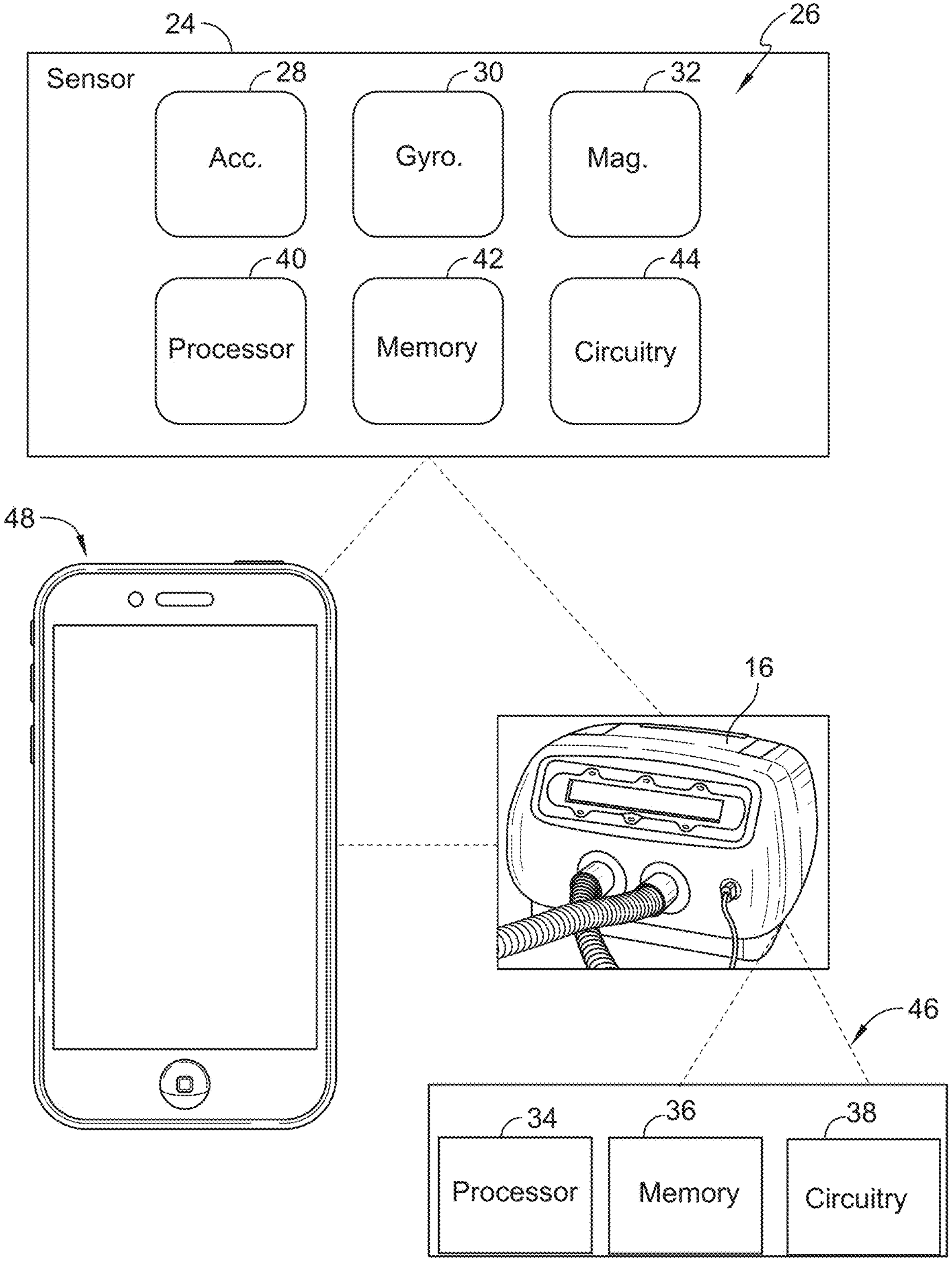
FIG. 3 is a diagrammatic view of a sensor which can be secured to the chest engagement device to communicate motion and/or position information of the patient's chest.

Referring to FIG. 3, the sensor 24 includes a number of sensor features 26. The sensor features 26 are illustratively embodied as micro-electromechanical sensors including three accelerometers 28, three gyroscopes 30, and three magnetometers 32. The sensor 24 is arranged in communication with the force generator 16 to provide sensor data as indication of patient breathing. In the illustrative embodiment, the sensor features 26 communicate indication of their respective detected motion activity to the force generator 16. The force generator 16 includes a processor 34, memory storage 36 storing instructions for execution by the processor 34, and communications circuitry 38 arranged to communicate signals, including to send and receive signals, according to direction by the processor 34. The processor 34, memory storage 36, and circuitry 38 comprise a therapy control system 46 for governing operation of the force generator 16 to provide pressure as force of impact for communication by the vest 14. In some embodiments, the sensor 24 may be included within the therapy control system.

In the illustrative embodiment, the sensor 24 is hardwired to the force generator 16 to communicate indication of patient breathing activity. In some embodiments, the sensor 24 may communicate wirelessly with the force generator, such as by Bluetooth, Wi-Fi, and/or other suitable local wireless communications, and may include processor 40, memory storage 42 for storing instructions for execution by the processor 40, and communication circuitry 44 for communicating signals under direction by the processor 40. In some embodiments, the sensor 24 and/or the force generator 16 may communicate sensor data and/or force generator operational information with a user's personal mobile device 48, directly and/or indirectly, via wireless connection, such as by Bluetooth, Wi-Fi, and/or other suitable local wireless communications.

The therapy control system 46 governs generation of pressure of the force generator 16. In the illustrative embodiment, the therapy control system 46 governs the initiation and cessation of therapy, the pressure and/or or flow rate of the positive and negative pressure provided, and the frequency of oscillation between the positive and negative pressure provided. As discussed in additional detail herein, the therapy control system 46 includes a user interface for communicating with the user.

Figure 4:
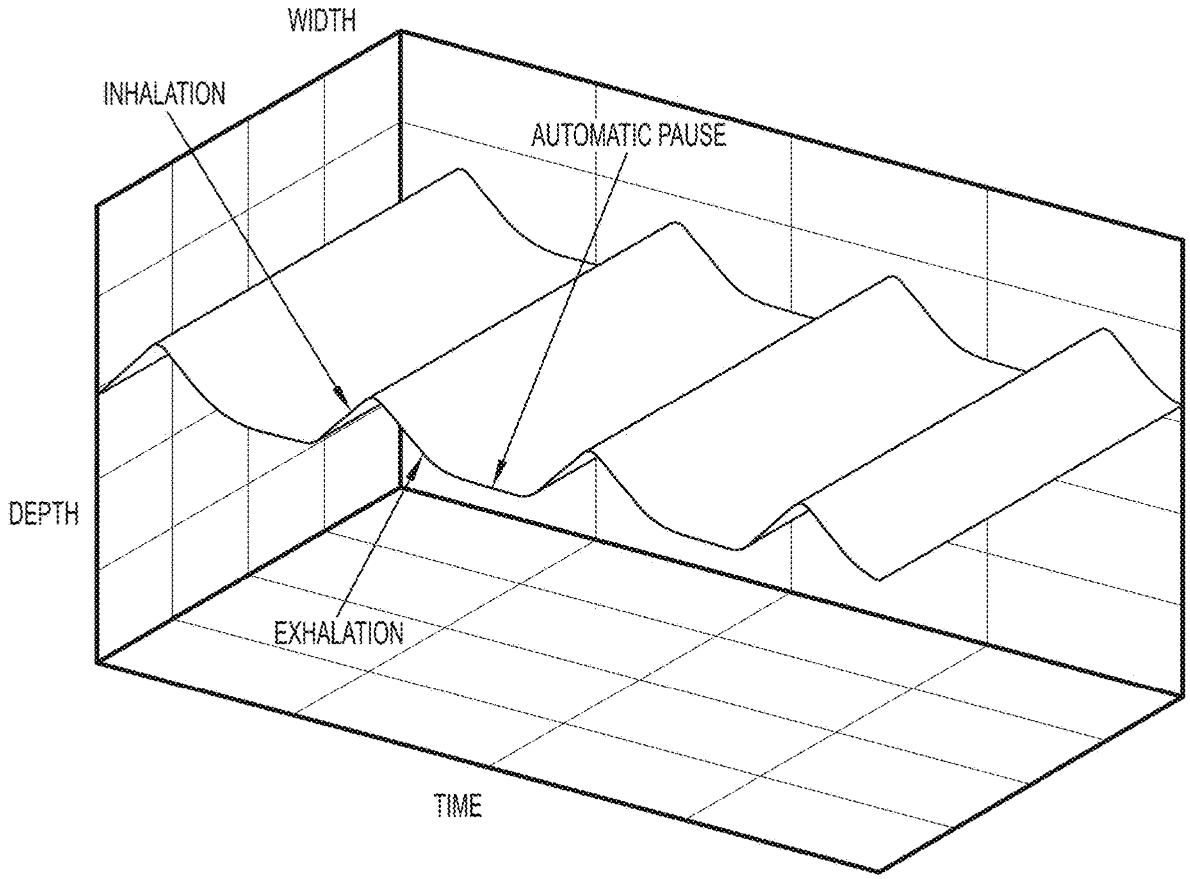
FIG. 4 is pictorial view of breathing pattern determined from sensor data of the sensor in FIG. 3.

Referring to FIG. 4, the therapy control system 46 illustratively determines the breathing pattern of the patient based on the sensor data. The therapy control system 46 illustratively determines a patient breathing pattern by computational analysis of the sensor data to provide a motion construction of the patient's breathing. In the illustrative embodiment, the motion construction includes three dimensional motion construction. Based on the motion construction, the therapy control system 46 can configure the therapy regime.

As shown in FIG. 4, the therapy control system 46 can determine when the patient is inhaling and/or exhaling based on the breath pattern. By configuring the therapy regime according to the timing of the patient's inhaling and/or exhaling, the effectiveness and/or comfort of the therapy can be improved. For example, preferred therapeutic results can be obtained by providing desirably high intensity and/or frequency of oscillation during exhalation. However, during inhalation, the effectiveness of HFCWO can be reduced and/or discomfort can be experienced by the patient. Thus, by applying less intensity and/or frequency of oscillation during inhalation, the comfort to the patient can be increased, while maintaining effectiveness of therapy by application of increased intensity and/or frequency of oscillation during exhalation.

Figure 5:
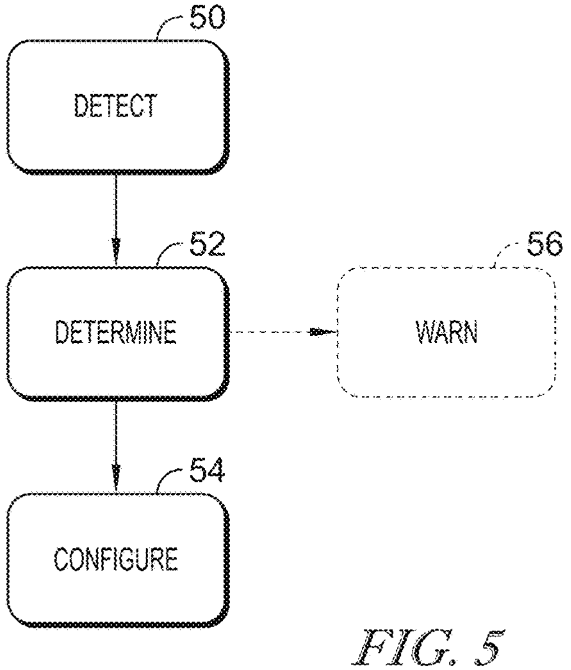
FIG. 5 is flow diagram indicating operation of a therapy control system of the system of FIG. 1.

Referring now to FIG. 5, operation of the therapy control system 46 to configure the therapy regime is illustrated. An initial therapy regime can include predetermined settings for intensity, frequency, and/or duration of HFCWO therapy. During therapy, in box 50, the therapy control system 46 can detect breathing pattern of the patient. The sensor 24 illustratively senses motion imposed by the patient's breathing and communicates indication of the sensor data for determining the breathing pattern.

In box 52, the therapy control system 46 can determine the breathing pattern and can determine configuration of the therapy regime based on the breathing pattern. In box 54, the therapy control system 46 can perform configuration of the therapy regime according to the breathing pattern. Performing configuration of the therapy regime can include adjusting one or more of the intensity, frequency, and timing of oscillation therapy.

The therapy control system 46 can optionally consider adverse respiratory factors. Sensor data from sensor 24 can be analyzed by the therapy control system 46 to identify risk factors for respiratory issues. For example, in box 52, the therapy control system 46 can determine respiratory rate and/or tidal volume based on sensor data, and may determine that a risk exists concerning ventilator function of the patient's lung. In response to determination that a risk exists, the therapy control system 56 can issue a warning in box 56. Issuance of a warning can include activating a warning light, issuing a warning message on the user interface, and/or communication of an indication of warning to a remote system.

Figure 6:
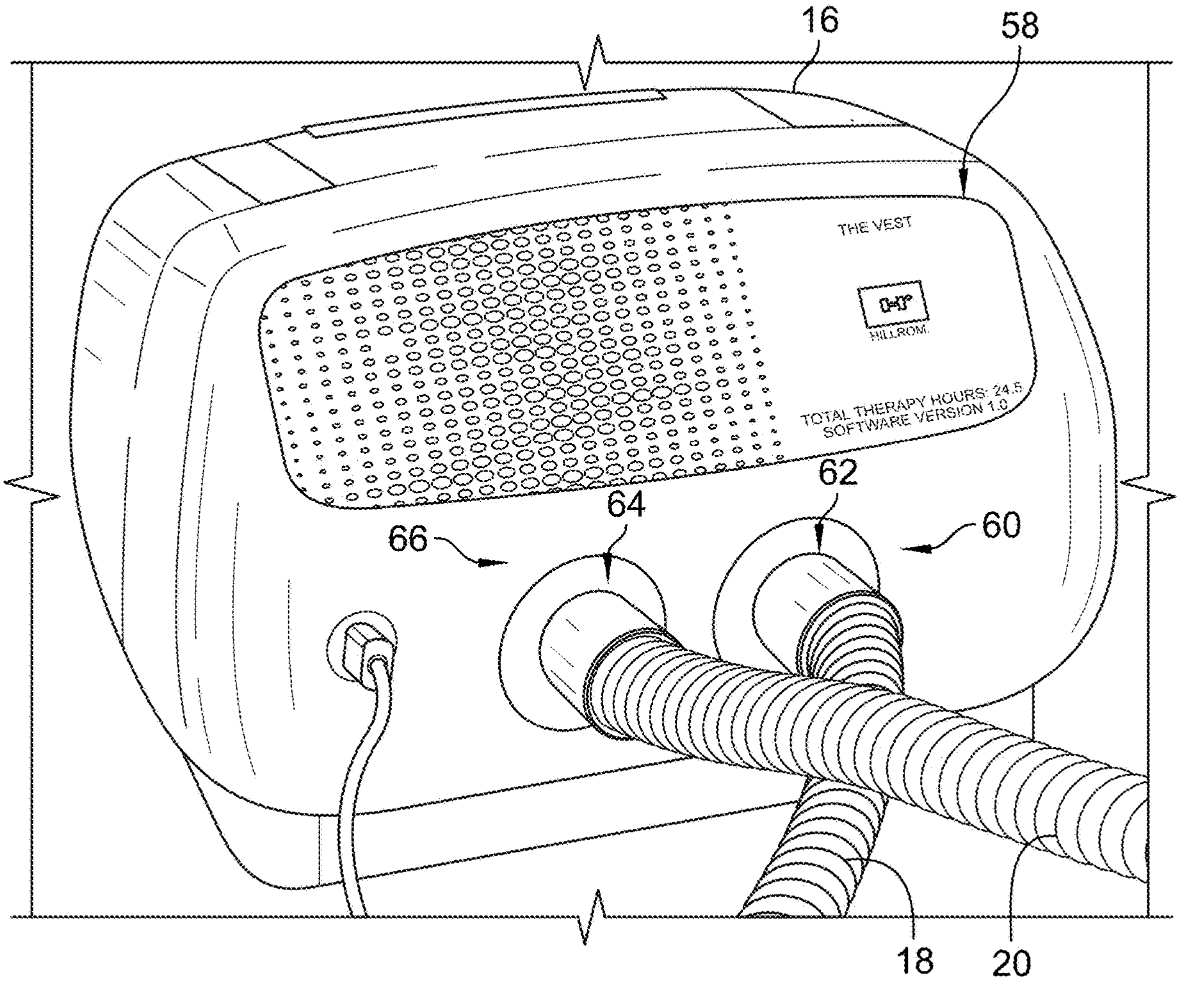
FIG. 6 is perspective view of the force generator of FIG. 1 showing a graphical user interface for user communication, and connector system for connecting hoses.

Referring now to FIG. 6, the force generator 16 illustratively includes a user interface, embodied as graphical user interface (GUI) 58. The GUI 58 is embodied as a touch screen display available to present graphical images including user interaction buttons for user selection to provide user input.

As shown in FIG. 6, the force generator 16 includes a pressurization bank 60 including a positive pressure port 62 and a negative pressure port 64 for communicating force of impact to the vest 14. The positive pressure port 62 is arranged to receive connection of the hose 18, and the negative pressure port 64 is arranged to receive connection of the hose 20. The hoses 18, 20 are connected with the corresponding ports 62, 64 as a connection system 66 permitting selective connection of the hoses 18,20 with the ports 62,64.

Figure 7:
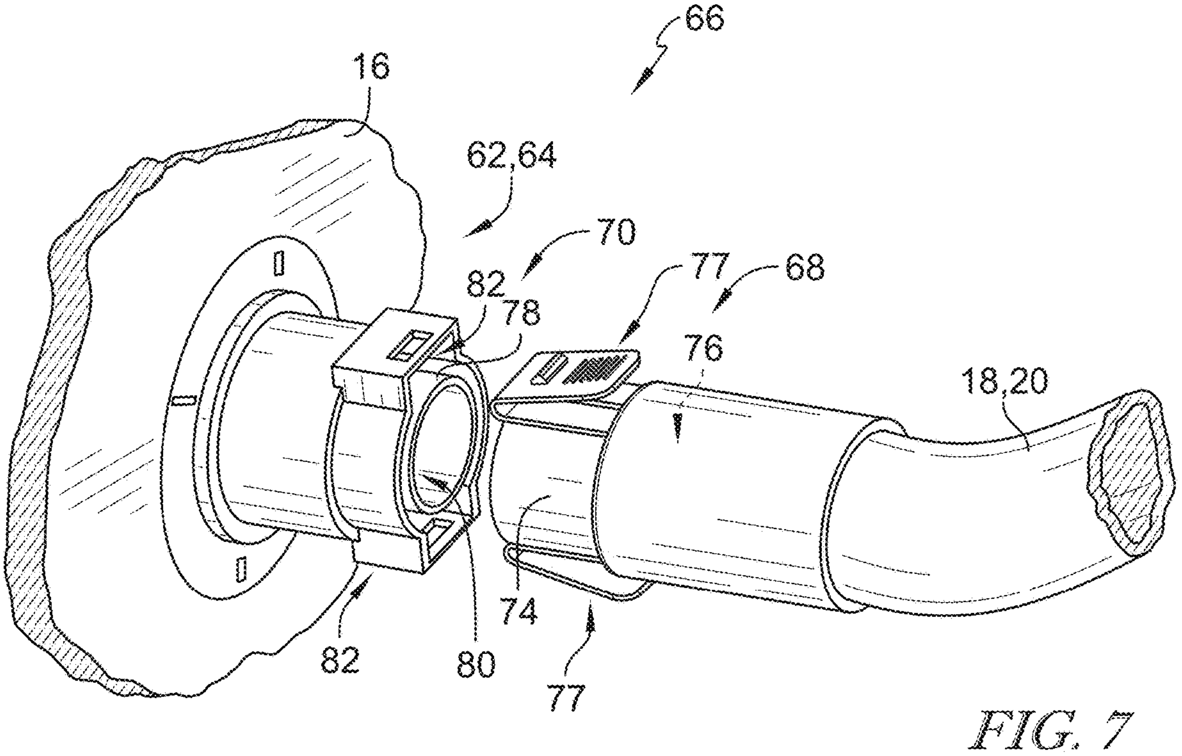
FIG. 7 is perspective view of one embodiment of the connector system of FIG. 6.

Referring now to FIG. 7, the connection system 66 is shown in additional detail. The connector system 66 includes a connector terminal 68 secured with the hose 18,20 as an end connector. The connector system 66 includes a connector receiver 70 secured with the force generator 16 as an end terminal of the port 62,64. The connector terminal 68 and connector receiver 70 are configured for conforming engagement to allow pressure communication between the force generator 16 and the vest 14 via the hoses 18,20. In the illustrative disclosure, the connector terminal 68 is secured with the hose 18,20 and the connector receiver 70 is secured with the force generator 16, however, in some embodiments, the connector receiver 70 may be secured with the hose 18,20 and the connector terminal 68 may be secured with the force generator 16.

The connector terminal 68 includes a connector base 74 having a flow path 76 defined therethrough. The connector terminal 68 includes engagement tabs 77 extending radially from the connector base 74. The connector base 74 is illustratively formed as a tubular member for conforming engagement with the connector receiver 70 to provide pressurized flow connection. The engagement tabs 77 are illustratively formed as resilient members positionable between an extended position to latch the connector terminal 68 with the connector receiver 70 to block against disengagement, and a contracted position to release latching between the connector terminal 68 and the connector receiver 70.

Referring still to FIG. 7, the connector receiver 70 includes receiver base 78 defining a flow path 80 therethrough. The receiver base 78 is configured for conforming engagement with the connector base 74 to provide pressurized flow connection. The connector receiver 70 includes a latch receiver 82 configured for selectively receiving the connector terminal 68 to provide communication of force of impact.

Figure 8:
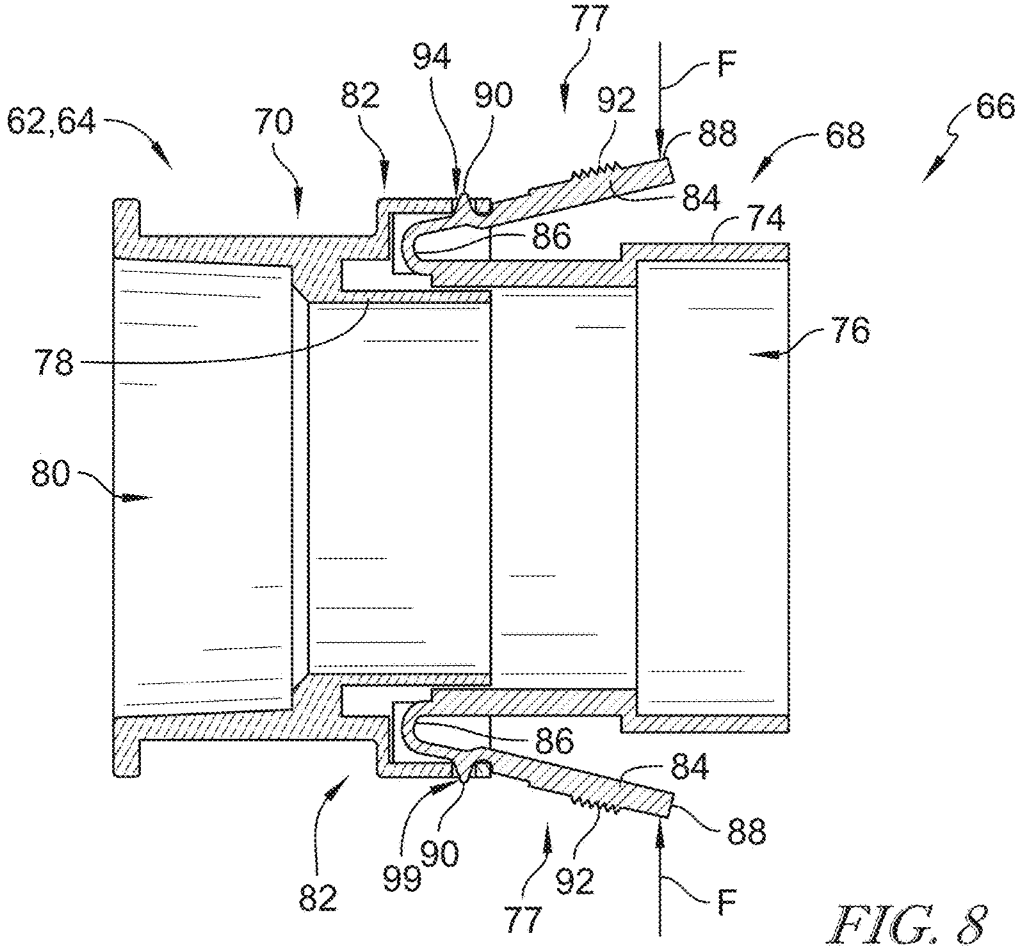
FIG. 8 is a cross-sectional view of the connector system of FIG. 7.

Referring now to FIG. 8, the connector terminal 68 is received within the connector receiver 70. The connector base 74 is engaged with the receiver base 78 to provide communication between the flow paths 76, 80. The engagement tabs 77 are received within the latch receiver 82 and are shown arranged in the extended position latching the connector terminal 68 with the connector receiver 70.

The engagement tabs 77 are each formed to include a latch body 84 embodied as an elongated member. The latch body 84 is connected with the connector base 74 at a fulcrum 86 and extends cantilevered out from the fulcrum 86 to a free end 88. Each latch body 84 includes a latch tab 90 extending outward for selective engagement with the latch receiver 82 of the connector receiver 70.

Each latch body 84 include an engagement portion 92 for engagement with a user's hand to selectively operate the engagement tabs 77 between the extended and contracted positions. The engagement portion is illustratively embodied as a number of teeth projecting from the latch body 84 to promote a grip surface for engagement with the user's hand. The user can engage the engagement portion to apply and release inward force F on the latch body to pivot the latch body 84 about the fulcrum 86 to the contracted position to disengage the latch tab from the latch receiver 82 to allow disengagement between the connector terminal 68 and the connector receiver 70.

Each latch receiver 82 includes a latch opening 94 for receiving engagement of the latch tab 90 when the corresponding engagement tabs 77 are in the extended position to block against disengagement between the connector terminal 68 and the connector receiver 70. The user can depress the engagement tabs 77 into the contracted position to disengage the latch tabs 90 from the latch openings 94 to allow disengagement of the connector terminal 68 from the connector receiver 70.

Figure 9:
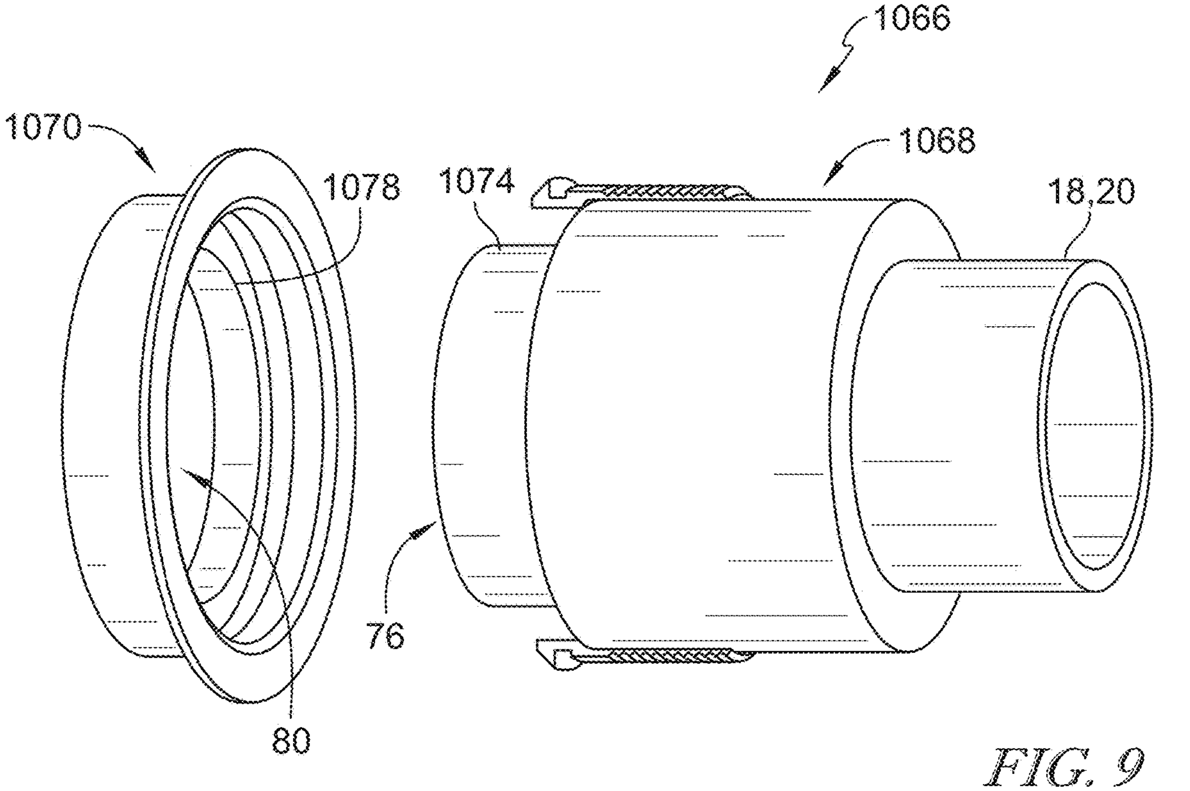
FIG. 9 is perspective view of another embodiment of the connector system of FIG. 6.
Figure 10:
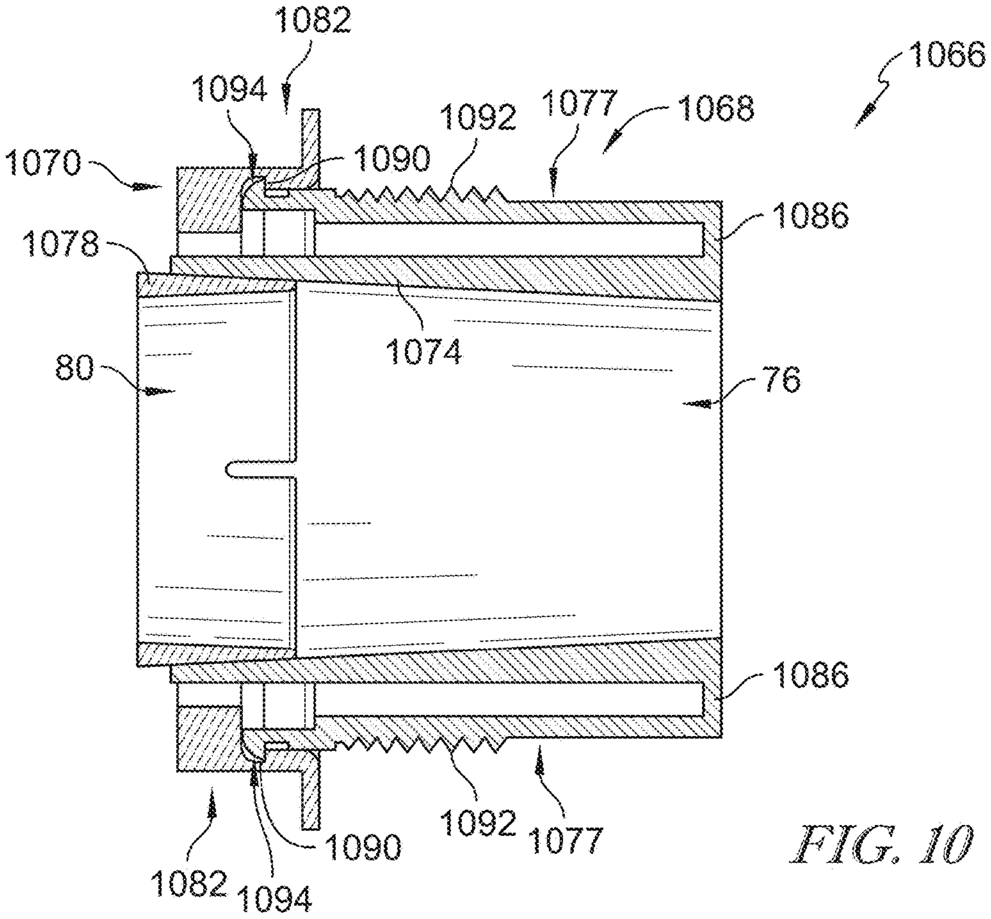
FIG. 10 is a cross-sectional view of the connector system of FIG. 9.
Figure 11:
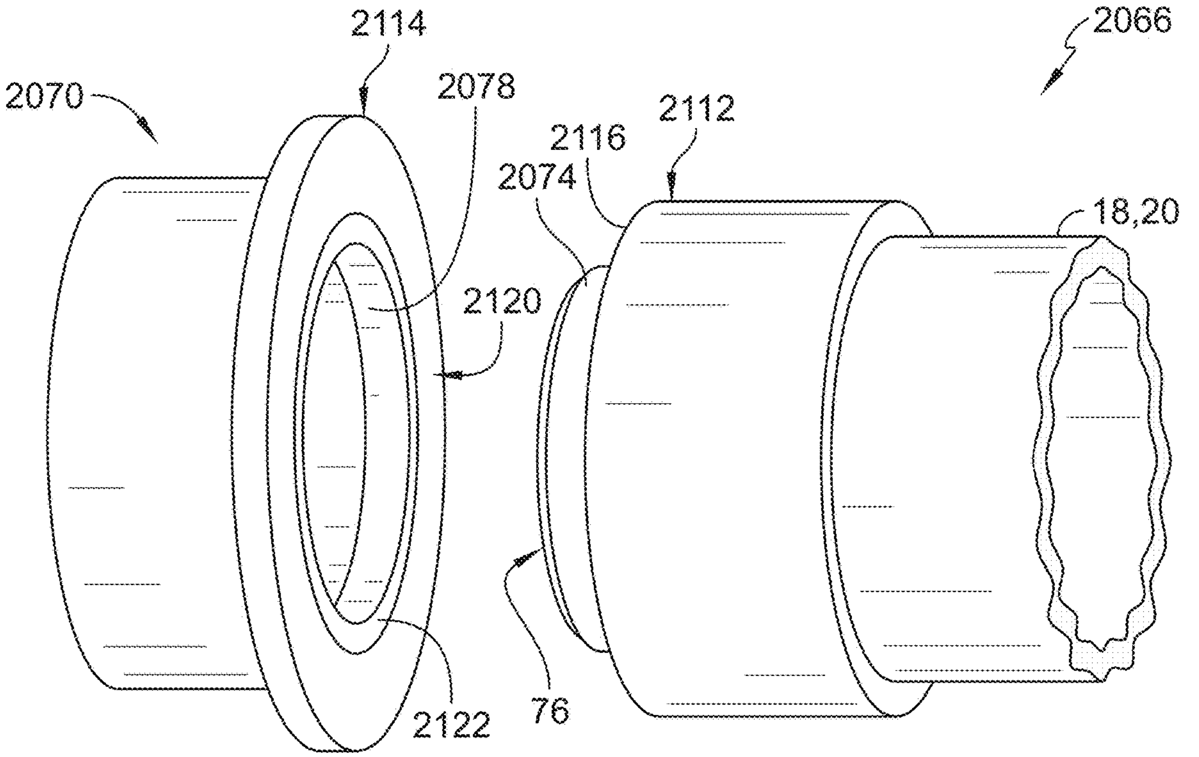
FIG. 11 is perspective view of another embodiment of the connector system of FIG. 6.

As shown in FIGS. 9 and 10, another embodiment of a connector system 1066 is shown, similar to the connector system 66. The disclosure of connector system 66 applies equally to the connector system 1066 except in instances of conflict with the specific disclosure of connector system 1066. The connector system 1066 includes a connector terminal 1068 and connector receiver 1070 adapted for conforming engagement to communicate pressurized flow. In the illustrative embodiment, the connector terminal 1068 is secured with the hose 18,20 and the connector receiver 1070 is secured with the port 62,64 of the force generator 16, but in some embodiments, either one of the connector terminal 1068 and connector receiver 1070 may be secured with the hose 18,20 and the other may be secured with the corresponding port 62,64.

The connector terminal 1068 includes a connector base 1074 defines the flow path 76, and the receiver base 1078 defines the flow path 80. The connector base 1074 and receiver base 1078 are configured for conforming engagement to communicate their flow paths 76, 80. The connector terminal 1068 includes engagement tabs 1077 for selective engagement with a latch receiver 1082 of the connector receiver 1070 to block against disengagement between the connector terminal 1068 and the connector receiver 1070.

The engagement tabs 1077 each include a latch body 1084 having one end connected with the connector base 1074 by a fulcrum 1086. Each latch body 1084 extends from the corresponding fulcrum 1086 to a free end 1088. The engagement tabs 1077 each include a latch tab 1090 configured for selective engagement with a latch opening 1094 of the latch receiver 1082 to block against disengagement between the connector terminal 1068 and the connector receiver 1070.

Unlike the connection system 66, the latch tabs 1090 arrange on the latch body 1084 near the free end 1088, and the free end 1088 is received within the latch receiver 1082 during engagement between the connector terminal 1068 and the connector receiver 1070. Also unlike the connection system 66, the latch receiver 1082 is formed as a uniform annular member.

The engagement tabs 1077 include an engagement portion 1092 for engagement with a user's hand to operate the engagement tabs 1077 between extended and contracted positions. In the extend position, as shown in FIG. 10, the latch tabs 1090 are engaged with the latch openings 1094 of the latch receiver 1080 to block against disengagement between the connector terminal 1068 and the connector receiver 1070. When a user depressed the engagement tabs 1077 into the contracted position, the latch tabs 1090 are disengaged from the latch openings, permitting disengagement of the connector terminal 1068 with the connector receiver 1070.

Referring now to FIGS. 11-14, another connector system 2066 is shown. The disclosure of connector systems 66, 1066 apply equally to the connector system 2066 except in instances of conflict with the specific disclosure of connector system 2066. The connector system 2066 includes a connector terminal 2068 and connector receiver 2070 arranged for conforming engagement to communicate their flow paths 76,80. In the illustrative embodiment, the connector terminal 2068 is secured with the hose 18,20 and the connector receiver 2070 is secured with the port 62,64 of the force generator 16, but in some embodiments, either one of the connector terminal 2068 and connector receiver 2070 may be secured with the hose 18,20 and the other may be secured with the corresponding port 62,64.

The connector terminal 2068 includes a connector base 2074 defining the flow path 76. The connector receiver 2070 includes a receiver base 2078 defining the flow path 80. The connector base 2074 and receiver base 2078 are arranged for conforming engagement to communicate their flow paths 76, 80. The connector terminal 2068 includes an engagement flange 2112 for engagement with an engagement flange 2114 of the connector receiver 2070.

The engagement flange 2112 of the connector terminal 2068 illustratively projects from the connector base 2074 to define an engagement face 2116. The engagement face 2116 of the connector terminal 2068 includes a magnetizable member 2118 having high magnetic susceptibility, sufficiently high to selectively form a magnetic connection when placed in a magnetic field to block against disengagement of the connector terminal 2068. The magnetizable member 2118 is illustratively formed as an annular member having ferrous material for attraction by magnets, although in some embodiments, the magnetizable member 2118 may comprise any suitable shape and/or materials to permit selective connection with the connector receiver 2070.

The engagement flange of the connector receiver 2070 extends from the receiver base 2078. The engagement flange 2114 defines an engagement face 2120 for selective engagement with the engagement face 2116 of the connector terminal 2068. The engagement face 2120 of the connector receiver 2070 includes a magnetic member 2122 for attracting connection with the engagement face 2116 of the connector terminal 2068. The magnetic member 2122 illustrative comprises a permanent magnet having sufficient magnetic field to selectively secure the connector terminal 2068 and connector receiver 2070 together.

When the connector terminal 2068 and the connector receiver 2070 are arranged sufficiently close together to magnetize the magnetizable member 2118 under the magnetic field of the magnetic member 2122, the connector terminal 2068 and the connector receiver 2070 can be drawn together by magnetic force to block against disengagement of the connector base 2074 and the receiver base 2078. Accordingly, the engagement flanges 2112, 2114 collectively define a magnetic coupling for selective connection between the connector terminal 2068 and the connector receiver 2070. In the illustrative embodiment, the connector terminal 2068 comprises the magnetizable member 2118 and the connector receiver 2070 comprises the magnetic member 2122, however, in some embodiments, the connector terminal 2068 comprise the magnetic member 2122 and the connector receiver 2070 may comprise the magnetizable member 2118.

The magnetic coupling is illustratively adapted to create audible click sound and/or haptic magnetic attraction during engagement by arranging the engagement flanges 2112, 2114 in proximity to impose magnetic attraction and allowing the magnetic attraction to freely draw the engagement faces together. The user can appreciate connection of the connector terminal 2068 with the connector receiver 2070 by audible and/or haptic feedback.

Figure 12:
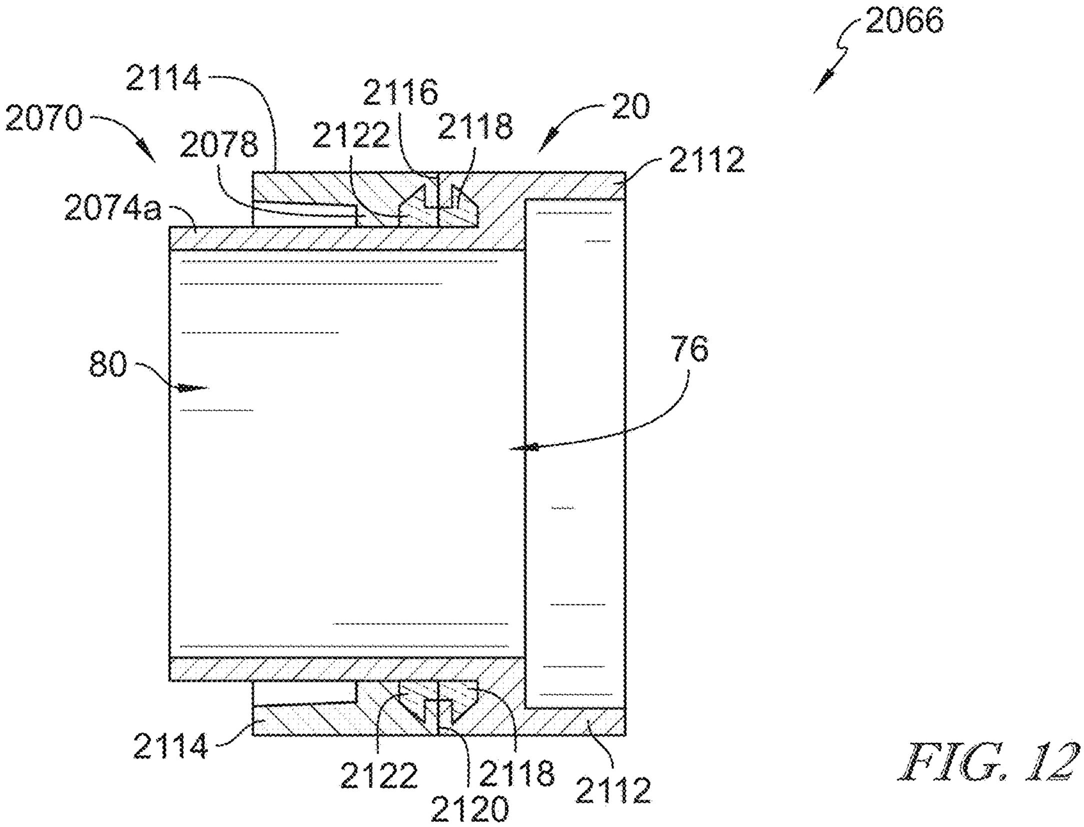
FIG. 12 is a cross-sectional view of the connector system of FIG. 11.
Figure 13:
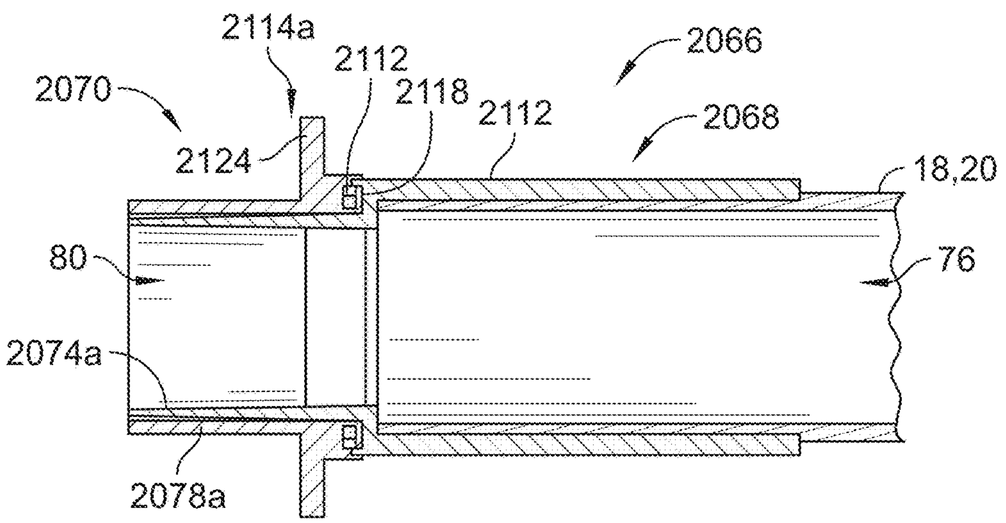
FIG. 13 is a cross-sectional view of another embodiment of the connector system of FIG. 6.
Figure 14:
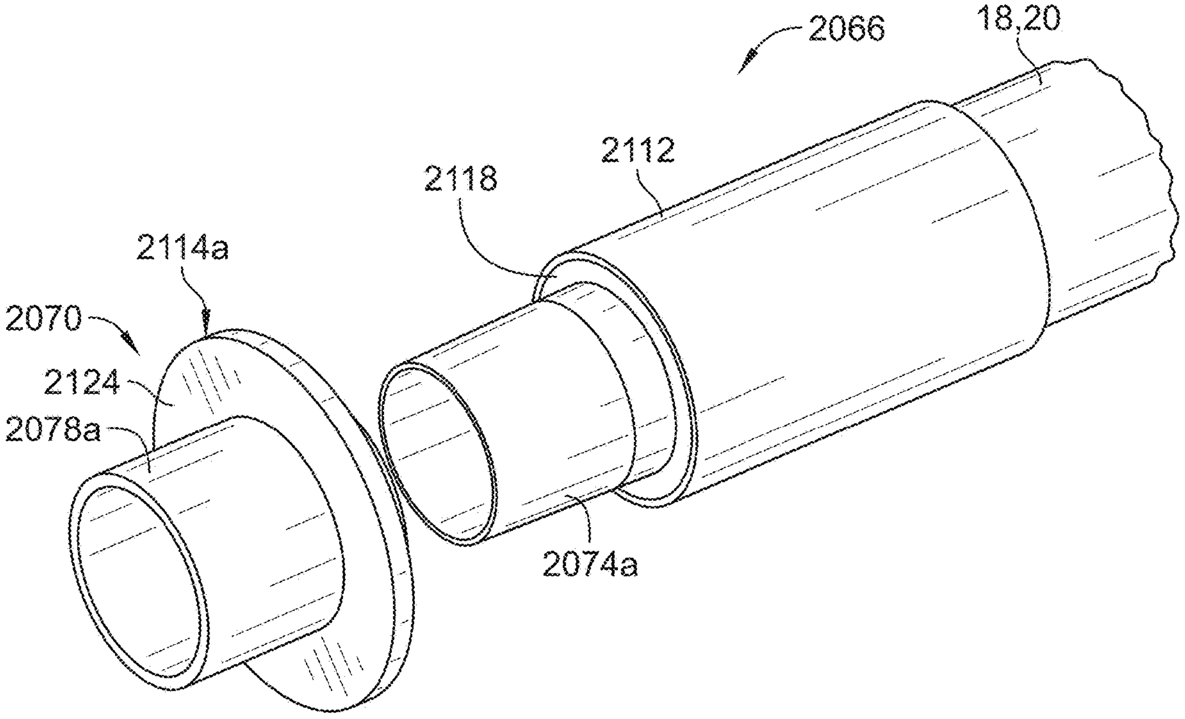
FIG. 14 is a perspective view of the connector system of FIG. 13.

Referring now to FIG. 12, the connector system 2066 is shown in which the connector base **2074*a* is formed with a tapered thickness extending away from the engagement face 2116 to foster ease in engagement between the connector base 2074*a* and receiver base 2078*a*. The receiver base 2078*a* is shown having elongation to engage the connector base 2074*a*. The engagement flange 2114 is shown to include a receiver extension 2124** extending radially outward.

Figure 15:
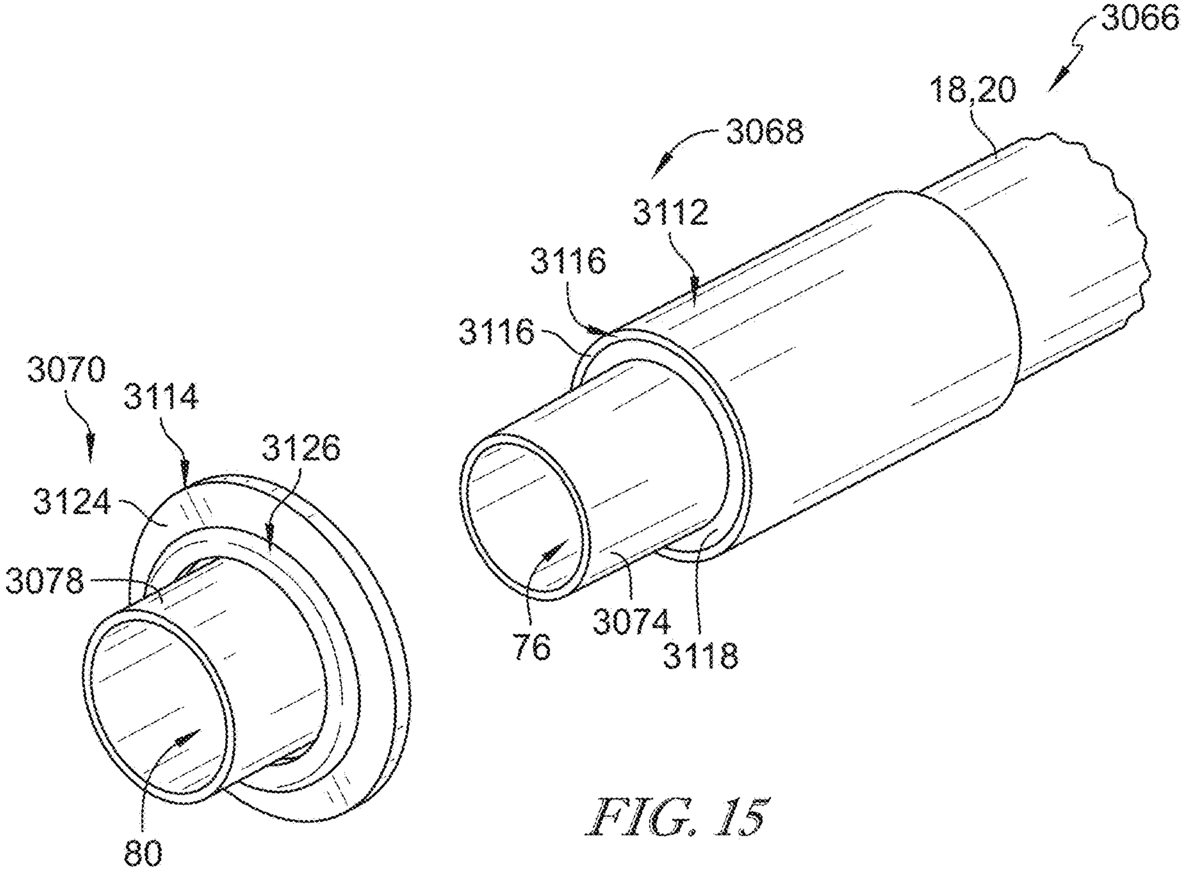
FIG. 15 is perspective view of another embodiment of the connector system of FIG. 6.
Figure 16:
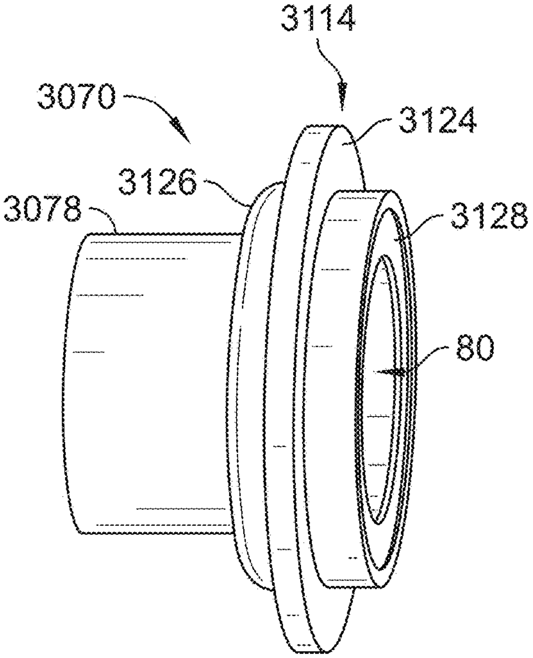
FIG. 16 is another perspective view of a connector receiver of the connector system of FIG. 15.
Figure 17:
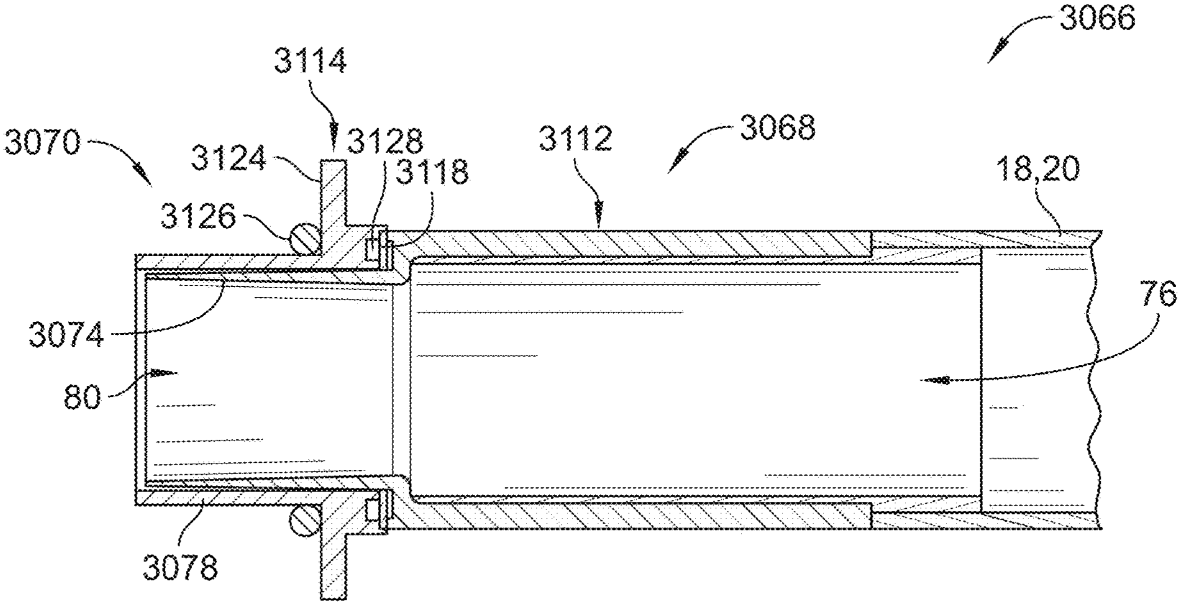
FIG. 17 is a cross-sectional view of the connector system of FIG. 15.

Referring now to FIGS. 15-17, another connector system 3066 is shown. The disclosure of connector systems 66, 1066, 2066 apply equally to the connector system 3066 except in instances of conflict with the specific disclosure of connector system 3066. The connector system 3066 includes a connector terminal 3068 and connector receiver 3070 arranged for conforming engagement to communicate their flow paths 76,80. In the illustrative embodiment, the connector terminal 2068 is secured with the hose 18,20 and the connector receiver 3070 is secured with the port 62,64 of the force generator 16, but in some embodiments, either one of the connector terminal 3068 and connector receiver 3070 may be secured with the hose 18,20 and the other may be secured with the corresponding port 62,64.

Similar to the connector system 2066, the connector system 3066 is shown to include a magnetic coupling for selectively coupling the connector terminal 3068 and connector receiver 3070. However, unlike the connector system 2066, the connector receiver 3070 of the connector system 3066 is formed to include an electromagnet 3126 for selectively imposing magnetic field to attract the connector terminal 3068. The electromagnet 3126 is illustratively activated in response to activation of a therapy regime to block against disengagement between the connector terminal 3068 and connector receiver 3070 during a therapy regime. In some embodiments, the magnetic force of the electromagnet may be cumulative to a permanent magnetic arranged to lightly maintain coupling between the connector terminal 3068 and connector receiver 3070 when a therapy regime is not presently operating.

The electromagnet 3126 is illustratively arranged on a rear side of the receiver extension 3124, extending circumferentially about the receiver base 3078. The connector receiver 3070 includes a magnetization member 3128 arranged within the engagement flange 3114 on the opposite side of the receiver extension 3124, in proximity with the electromagnet 3126 to become magnetized under operation of the electromagnet. The magnetization member 3118 has high magnetic susceptibility to become magnetized under the magnetic field of the electromagnet 3126 to magnetically couple with the magnetization member 3118 of the connector terminal 3068 when arranged in proximity with each other.

Figure 18:
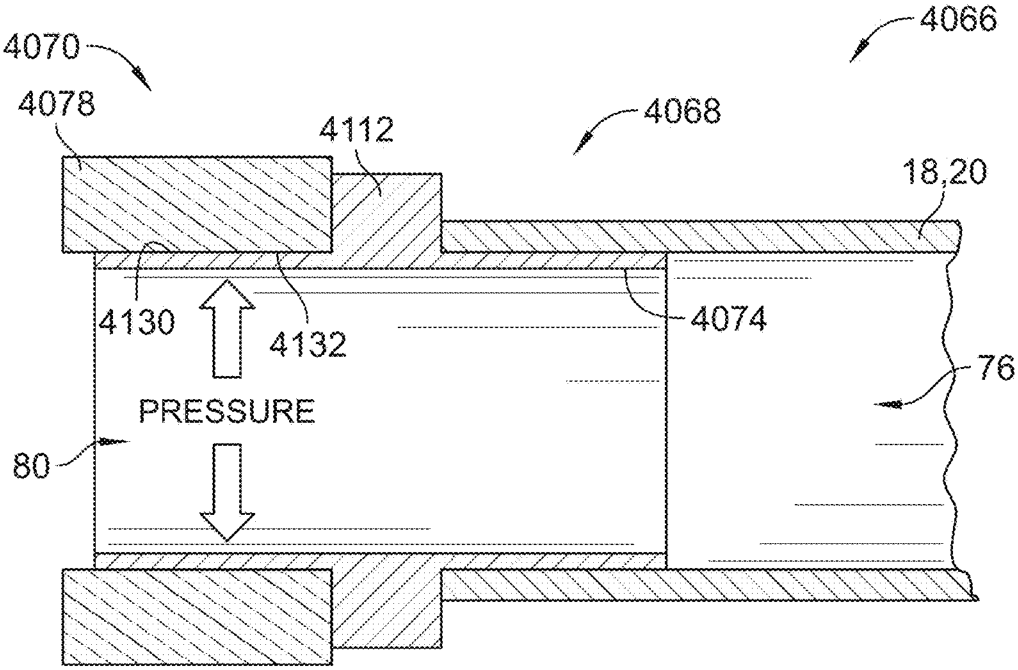
FIG. 18 is a cross-sectional view of another embodiment of the connector system of FIG. 6.

Referring now to FIG. 18, another connector system 4066 is shown. The disclosure of connector systems 66, 1066, 2066, 3066 apply equally to the connector system 4066 except in instances of conflict with the specific disclosure of connector system 4066. The connector system 4066 is shown including a connector terminal 4068 and connector receiver 4070 engaged with each other to communicate their flow paths 76,80. The connector terminal 4068 includes a connector base 4074 extending for engagement with a receiver base 4078 of the connector receiver 4070. In the illustrative embodiment, the connector base 4074 extends into the receiver base 4078 such that an exterior surface 4130 of the connector base 4074 engages an interior surface 4132 of the receiver base 4078.

The connector base 4074 and receiver base 4078 are illustratively formed to have conforming fit such that, without operation of the force generator 16 to provide pressure, the connector terminal 4068 and the connector receiver 4070 are lightly coupled together by friction fit. When the force generator 16 is operated pressurizing the flow path 76,80, the connector terminal 4068 and the connector receiver 4070 are more tightly coupled together imposing a strong friction fit. In the illustrative embodiment, under baseline pressure, the connector base 4074 of the connector terminal 4068 is slightly expanded such that the exterior surface 4130 is slightly greater in circumference that when no pressure is provided. Accordingly, disengagement between the connector terminal 4068 and the connector receiver 3079 can be selectively blocked during operation of the force generator 16 to provide the therapy regime.

Figure 19:
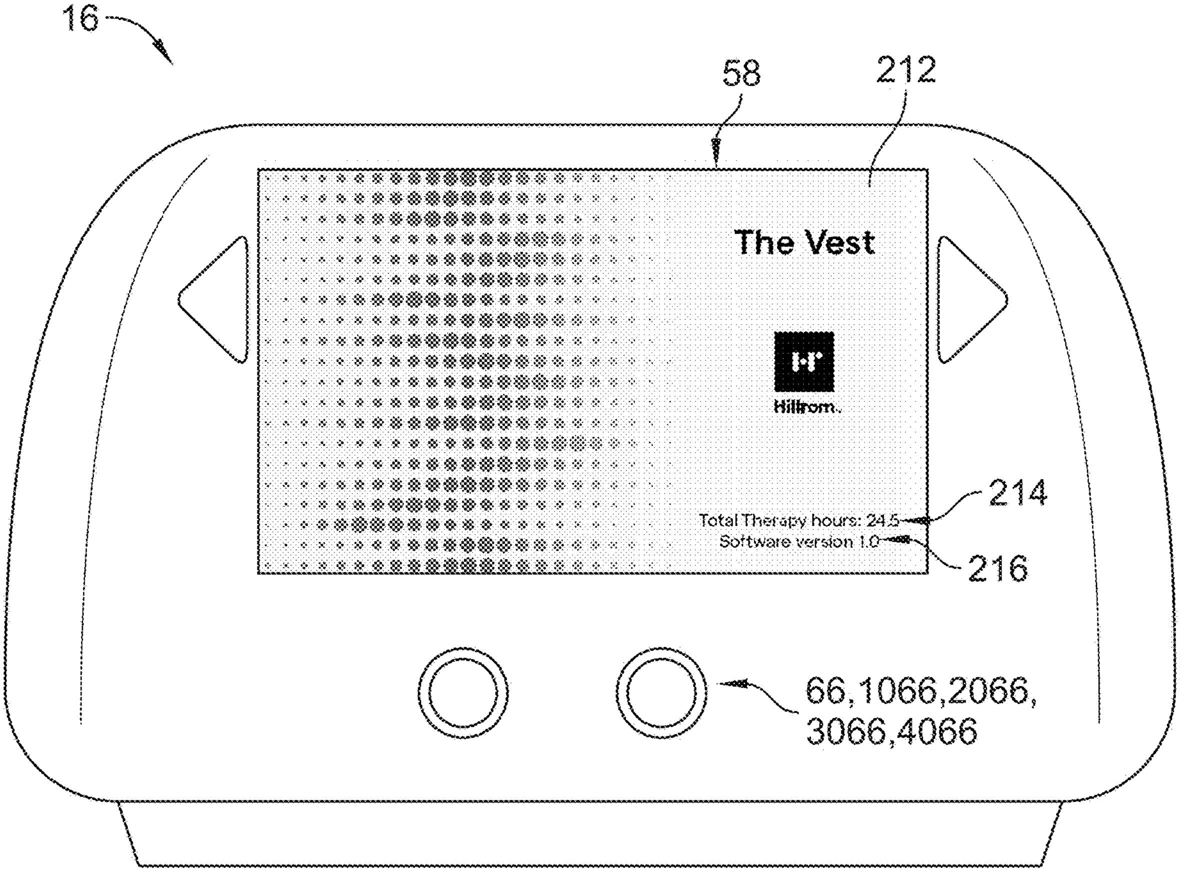
FIG. 19 is a front elevation view of the force generator of FIG. 1.

Referring now to FIG. 19, the force generator 19 is shown including the graphic user interface (GUI) 58. The GUI 58 illustratively presents an introduction screen 212 identifying the product name, provider, and/or graphical design elements. The introduction screen 212 illustratively includes an indication of total therapy hours (214) representing the operational total of hours for which therapy has been provided. The introduction screen 212 includes an indication of the software version 216 available on the force generator 16, presently indicated as version 1.0.

Figure 20:
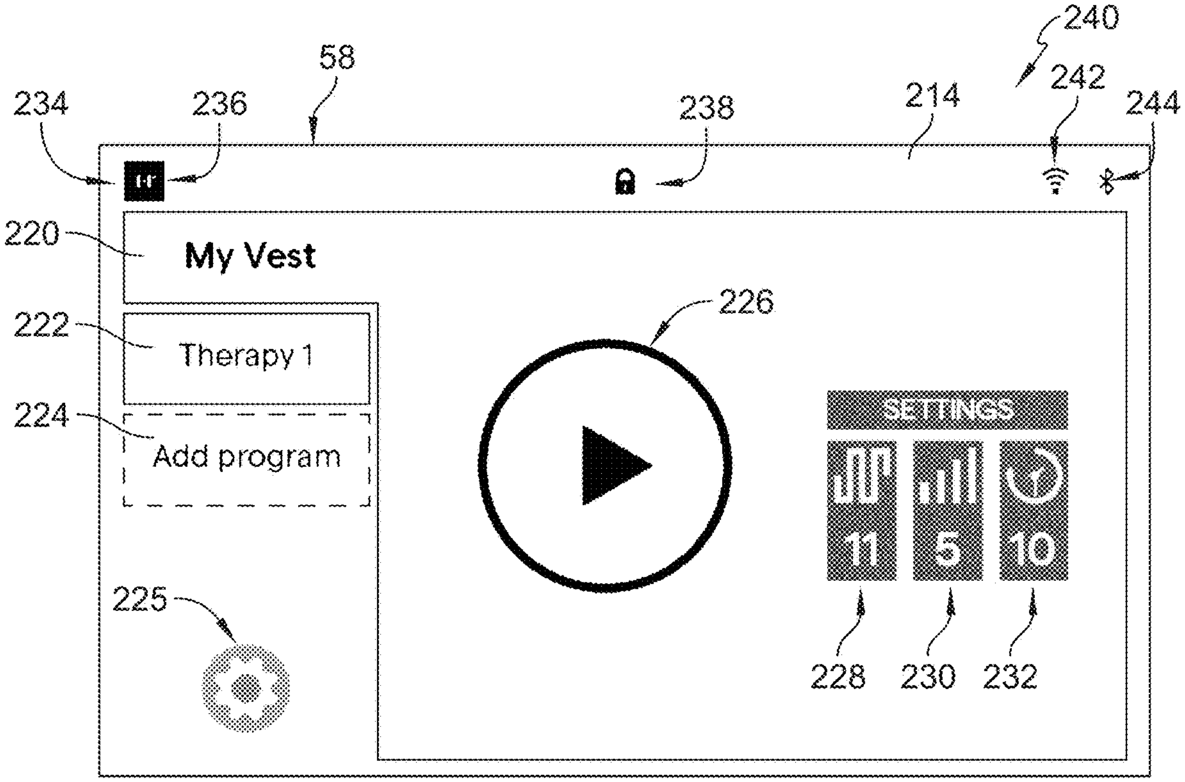
FIGS. 20-41 are display screens presented on the GUI of the force generator of FIG. 18 indicating various operations of the force generator.

As shown in FIG. 20, responsive to time out of the introduction screen 212, the GUI 58 advances to screen 214. On screen 214, the GUI 58 presents a number of selection tab options including tabs 220, 222, 224, the tab 220 being presently selected as indicated by its continuous connection with the remainder of the screen 214 (right-side portion). The presently selected tab 220 presents a number of selection button options, including a therapy initiation button 226, and setting options buttons 228, 230, 232.

Buttons 228, 230, 232 are presently unavailable for selection (in a locked state as discussed in additional detail herein) and can be indicated as unavailable by graying out. Buttons 228, 230, 232 indicate their presently selected values for settings such as frequency, intensity, and duration of therapy conditions as the therapy regime. The presently selected settings values for HFCWO therapy are illustratively applied as the default settings for the presently selected therapy regime, and in arrangements in which the HFCWO system determines settings values dynamically during the therapy, for example, determines dynamic changes to the settings to lessen frequency and/or intensity values during inhale and/or to increase frequency and/or intensity values during exhale, according to determination of the user's breathing as discussed above, the presently selected settings values are embodied as maximum settings from which dynamic adjustment can be effected by dynamically adjusting the settings lower; however, in some embodiments, the presently selected settings values may be average values or minimum values from which dynamic adjustments may be made to increase and/or decrease according to control system determination. The settings values may be directly tied to recognized units, such as the duration values are embodied as minutes, but in some embodiments may have any suitable units, including non-standard units and/or weighted units. On screen 214, the buttons 228, 230, 232 are indicated to be presently unavailable for selection (grayed out, as represented by their dark background with white text). A settings button 225 is presented but is indicated to be presently unavailable for selection (grayed out, as represented by un-bolded depiction).

The GUI 58 presents a header bar 234 visible on several screens. The header bar 234 illustratively includes a provider icon 236, system lock button 238 indicating present lock arrangement by graphical illustration of a closed pad lock, and wireless communications indication 240. The wireless communications indication 240 illustratively includes a Wi-Fi indicator 242 and Bluetooth indicator 244 each for indicating availability of their respective connection type.

Figure 21:
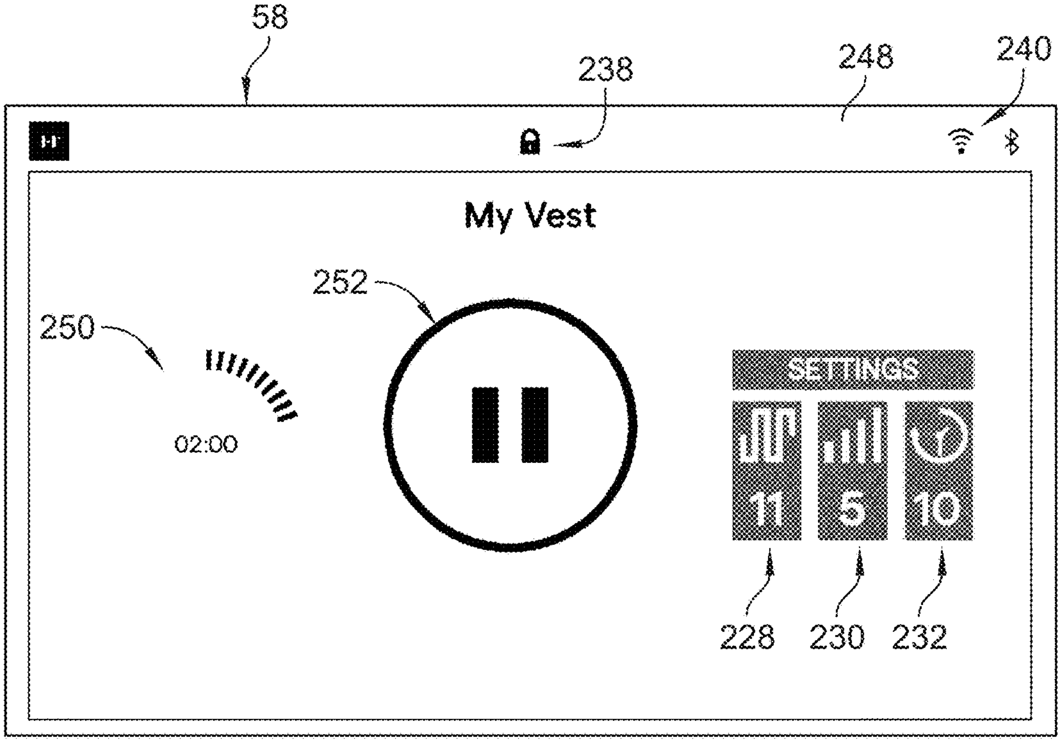

From screen 214, user selection of the therapy initiation button 226 initiates the force generator 16 to provide the presently set therapy conditions as the therapy regime, and advances GUI 58 to screen 248 as shown in FIG. 21. On screen 248, a timer 250 indicates the duration of the therapy presently provided, embodied as both a numerical and graphical indication (2 minutes and 0 seconds, and semi-circle of bars indicating 2 out of 10 minutes). Responsive to initiation of therapy, the therapy initiation button 226 is replaced by a therapy pause button 252. As the presently set duration for therapy is ten minutes (as indicated by button 232) at expiration of ten minutes of therapy run time, an indication that therapy has been completed is responsively presented on the GUI 58. In the illustrative embodiment, the indication that therapy has been completed includes a message on the GUI 58. Responsive to time out of the message and/or user tap anywhere on the GUI 58, the GUI 58 returns to screen 214.

Figure 22:
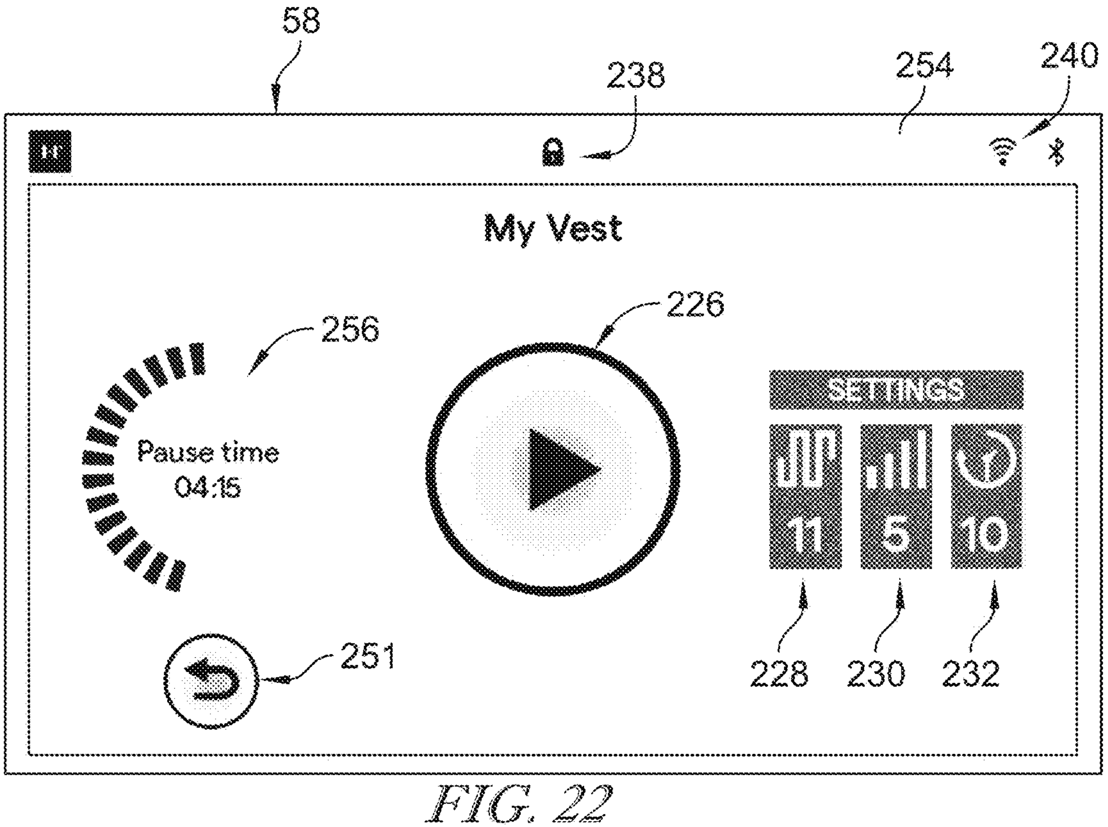

Responsive to user selection of the therapy pause button 252, oscillation therapy is paused by cessation of pressure oscillation from the force generator 16, and the GUI 58 advances to screen 254 as shown in FIG. 22. On screen 254, the therapy initiation button 226 replaces the therapy pause button 252, and a return button 251 is presented to allow return to a previous screen. A pause timer 256 is presented indicating an elapsed time of pause out of a predetermined pause maximum time of 8 minutes, embodied as both a numerical and graphical indication (4 minutes 15 seconds, and semi-circle of bars indicating 4:15 out of 8 minutes).

In the illustrative embodiment, if the pause timer reaches 6 minutes, a warning indication is presented indicating that therapy will terminate if not restarted, the warning indication including a countdown timer indicating the remaining time until therapy termination, and presenting continue therapy and end therapy buttons for user selection. If therapy is not continued (unpaused) with the predetermined maximum or the user selects the therapy termination button, an indication of incomplete therapy is presented and timeout of the indication of incomplete therapy and/or user tap anywhere on the GUI 58 returns to screen 214. If the user continues (unpauses) therapy by selection of the continue therapy button within the maximum pause time, therapy continues and the GUI returns to screen 248.

Figure 23:
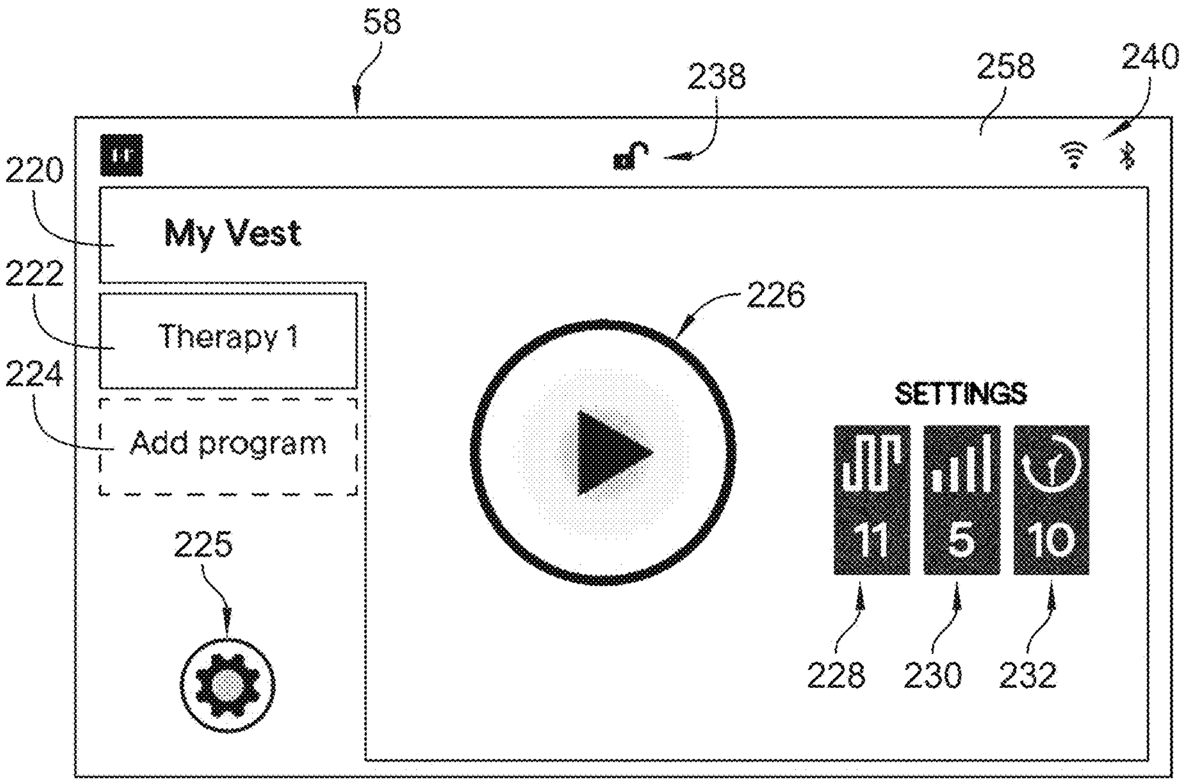

Referring now to FIG. 23, from any screen 214, 248, 254 on which the lock button 238 is available, user selection of the lock button 238 provides an unlocked state and advances to screen 258. Selection of the lock button 238 to unlock is embodied to require a long press (e.g., 2 sec press). Screen 258 is similar to screen 214, however, the lock button 238 now indicates that unlock has been selected by graphical illustration of an open pad lock and the settings button 225 has now been activated as indicated by its bold depiction. The user can select the lock button 238 to return to the locked state without availability of the settings button 225, and/or timeout (>30 seconds without any touch) returns to the locked state.

Figure 24:
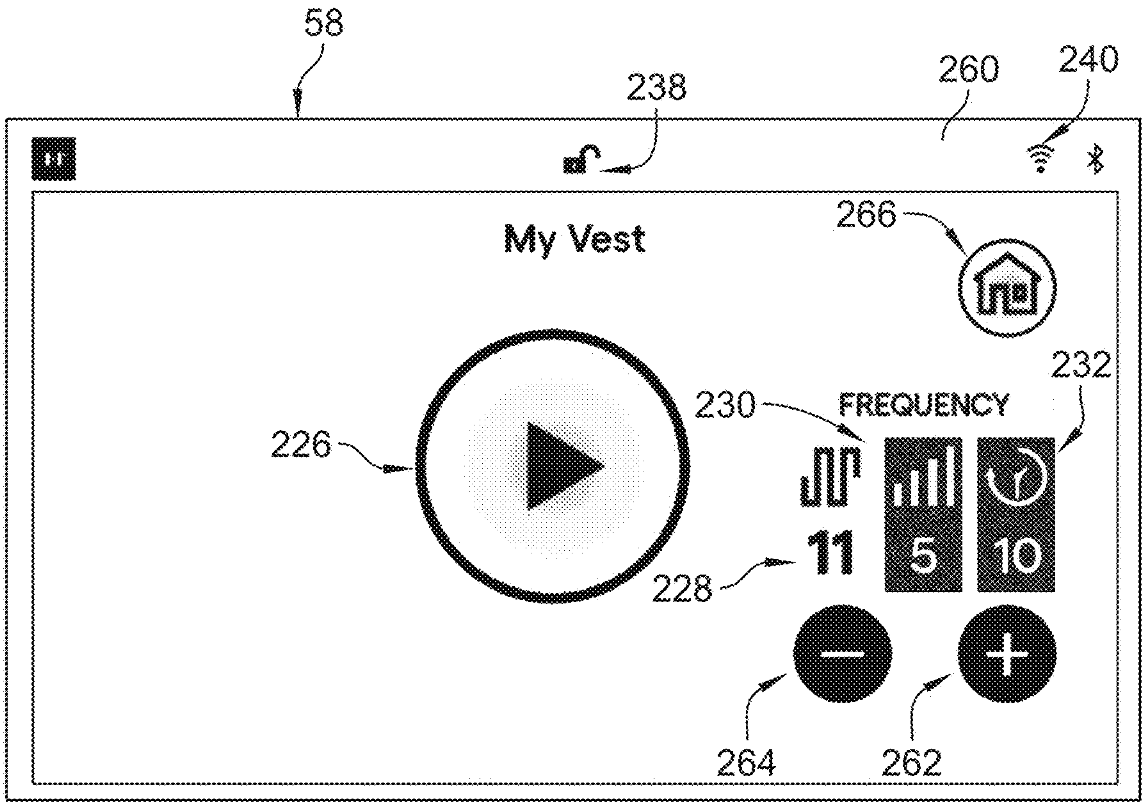

In the unlocked state, the buttons 228, 230, 232 are activated for available user selection which can be indicated by boldening their appearance from their grayed indication in the locked state. User selection of the button 228 advances to screen 260 as shown in FIG. 24. Present selection of the button 228 is indicated by highlighting the button 228 (inverting colors in FIG. 24) and indicating "Frequency" in the script above the button 228. Responsive to user selection of the button 228, the increase button 262 and the decrease button 264 are presented for user selection to change the present value (11 Hz) of the frequency as indicated by the button 228 itself. A home button 266 is presented for user selection to navigate to screen 214.

Figure 25:
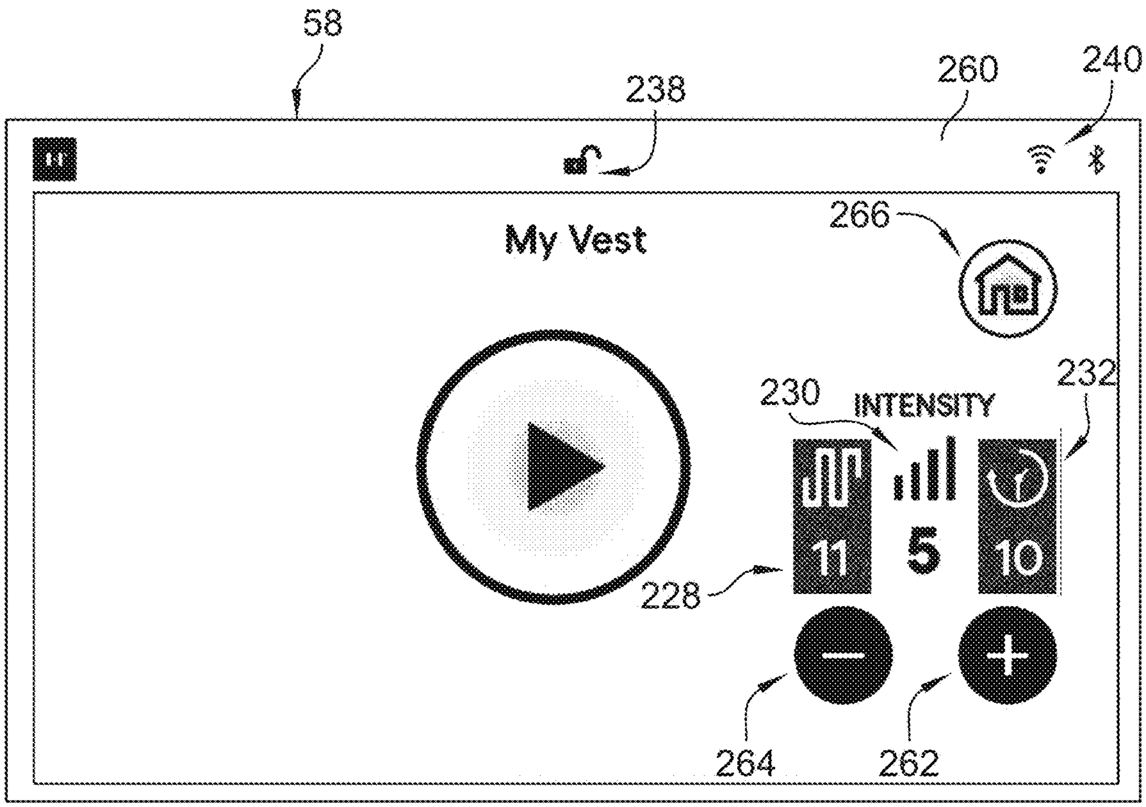

Referring to FIG. 25, responsive to user selection of the intensity button 230, the button 230 is highlighted and the script above the button 230 indicates that intensity is presently selected. The buttons 262,264 are presented for user selection to change the present value (5/10) of the intensity of force to the patient as indicated by the button 230 itself.

Figure 26:
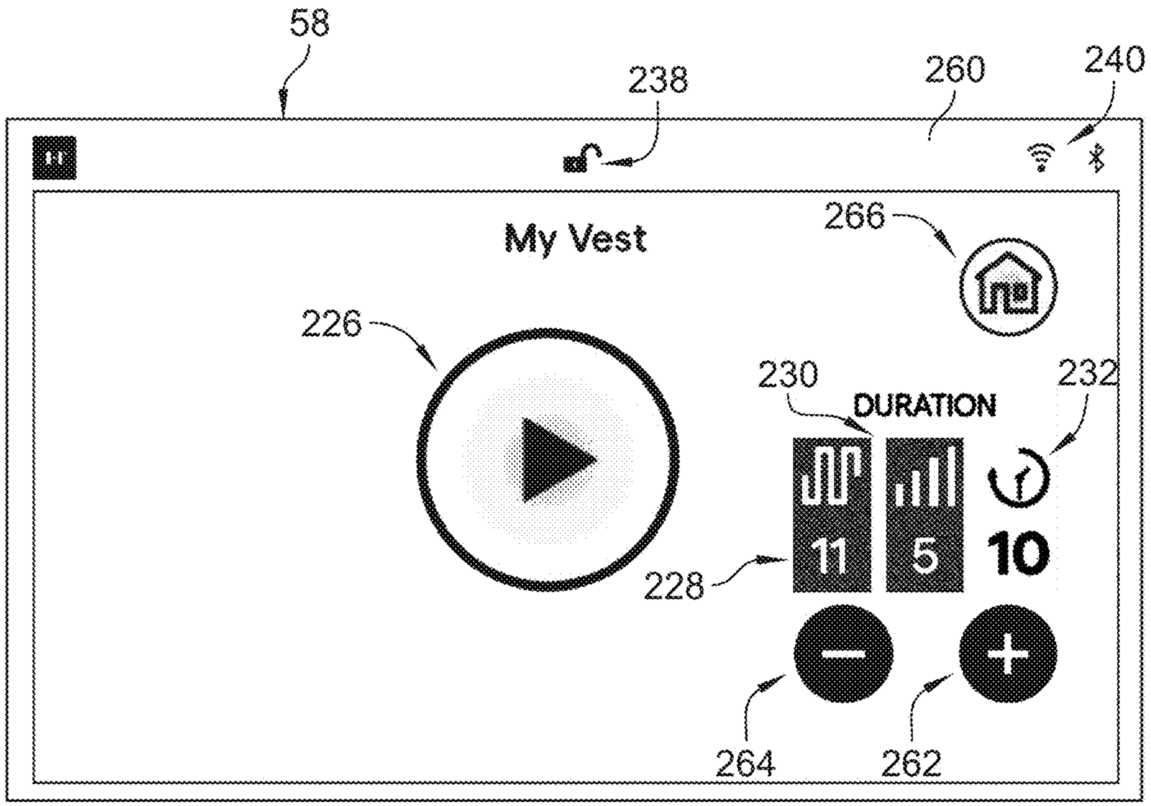

Referring to FIG. 26, responsive to user selection of the duration button 232, the button 232 is highlighted and the script above the button 232 indicates that duration is presently selected. The buttons 262,264 are presented for user selection to change the present value (10 min) of the duration of therapy as indicated by the button 232 itself.

Figure 27:
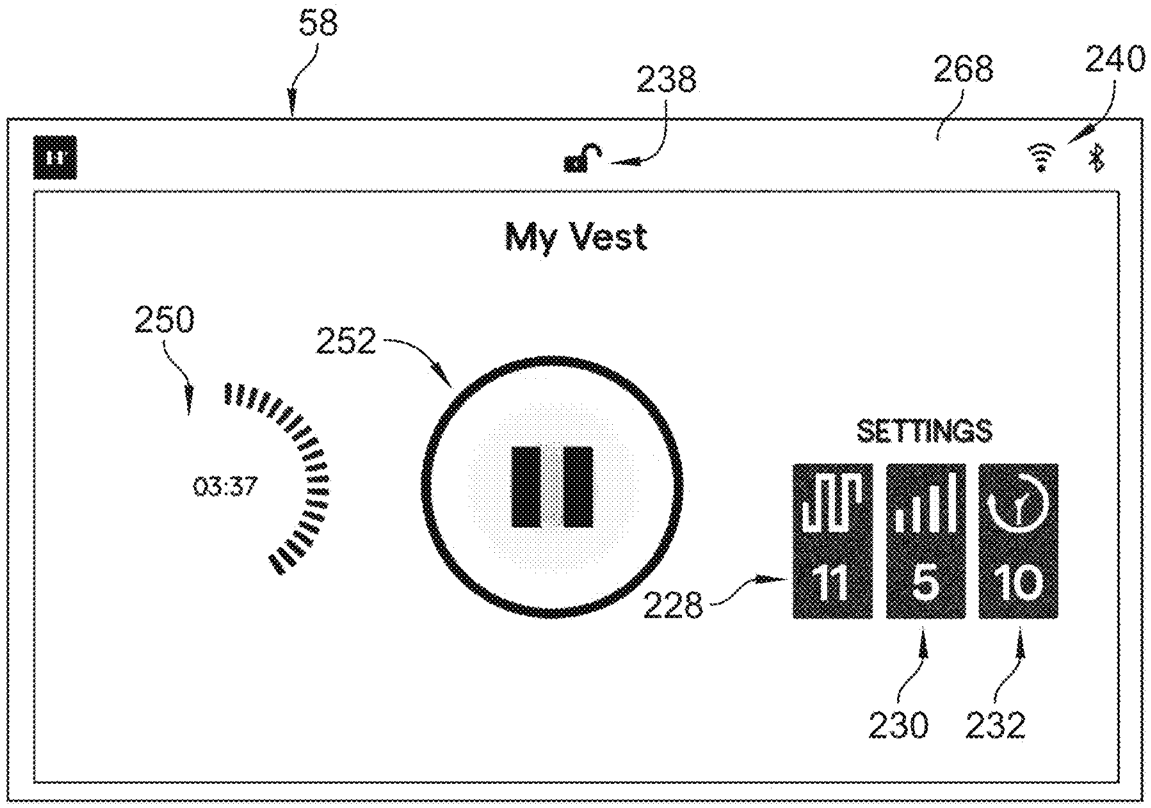

From the screen 260, selection of the therapy initiation button 226 initiates the force generator 16 to provide the presently set therapy conditions as the therapy regime and advances to GUI 58 to screen 268 as shown in FIG. 27. On screen 268, the therapy pause button 252 replaces the therapy initiation button 226 and the therapy timer 250 is presented. Completion of the therapy duration responsively prompts an indication that therapy has been completed and an indication of the amount of time of the therapy completed before returning to screen 214. User selection of the pause button 252 presents pause timer 256, replaces pause button 252 with therapy initiation button 226, and proceeds for pause control operation as discussed above regarding screen 254.

Figure 28:
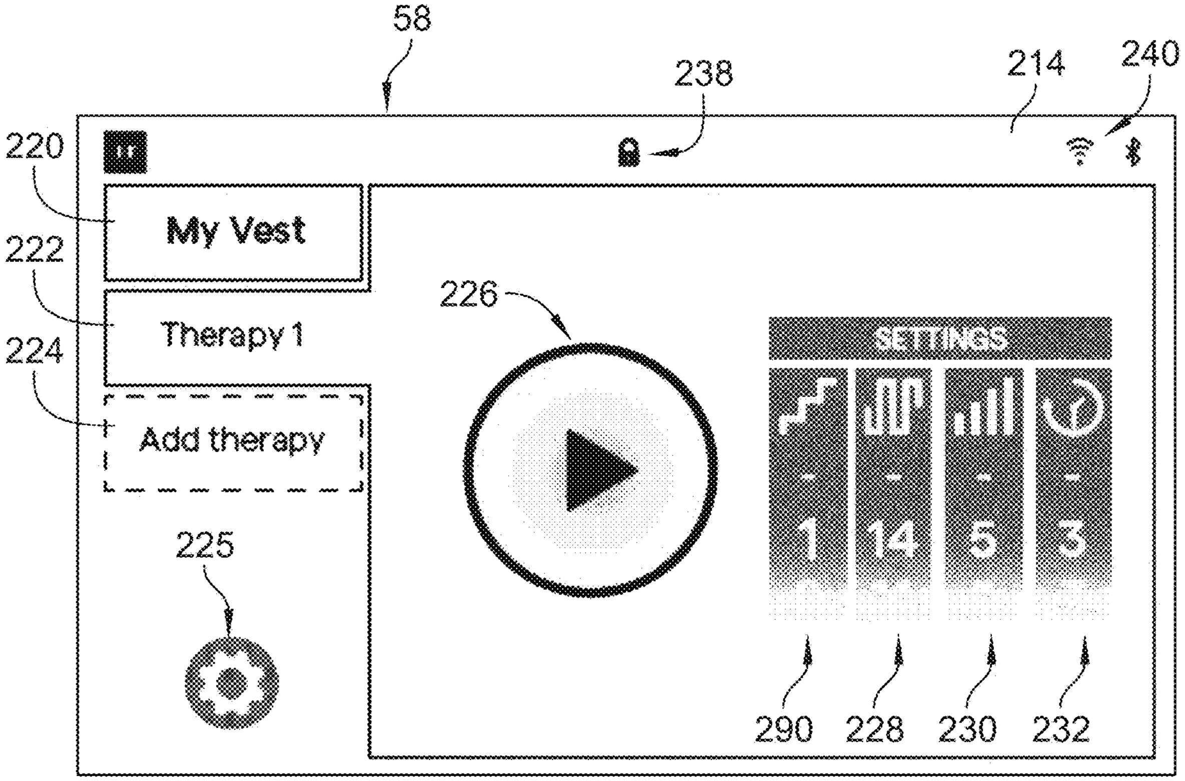

Referring now to FIG. 28, the user has selected the therapy tab 222 as indicated by connection of the tab 222 with the other selectable options on the right hand side. The therapy initiation button 226 is presented together with therapy settings button including interval button 290, frequency button 228, intensity button 230, and duration button 232. The buttons 290, 228, 230, 232 are initially unavailable for selection, and can be grayed out to indicate the same to the user.

Figure 29:
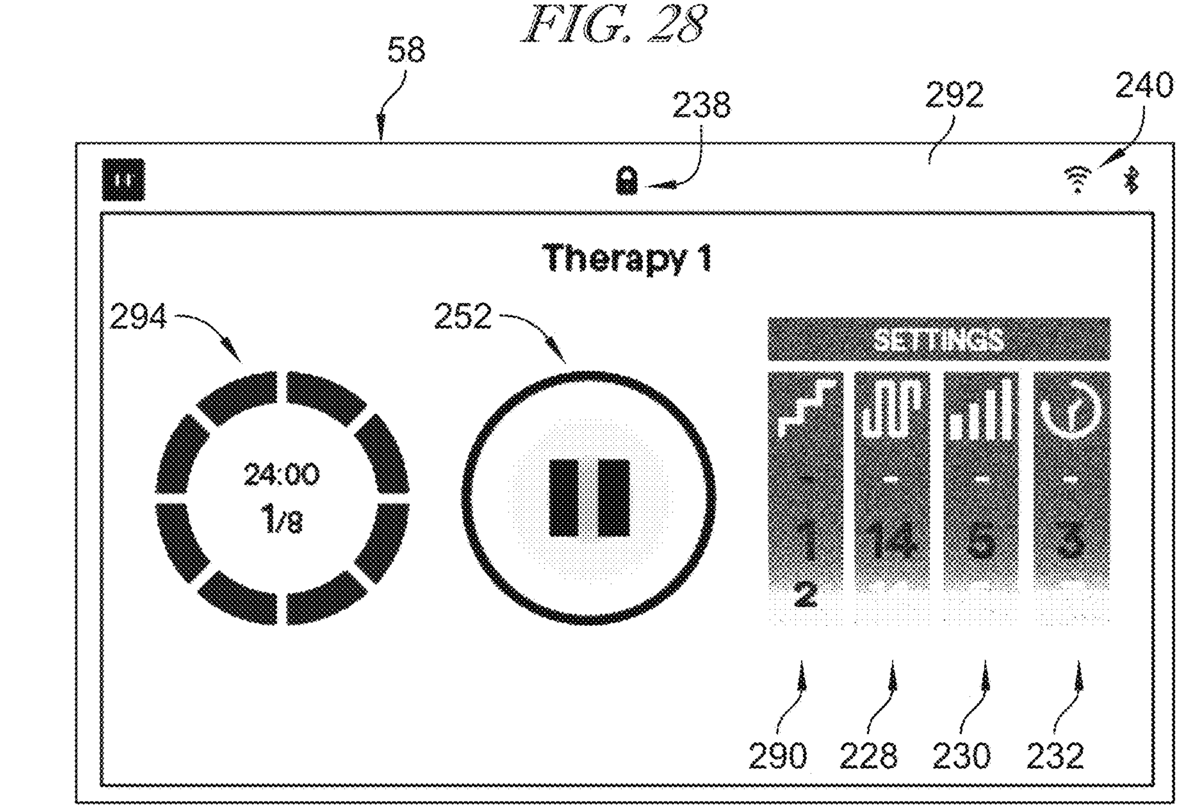

Referring to FIG. 29, user selection of the therapy initiation button 226 initiates the force generator 16 to provide the presently set therapy conditions as the therapy regime and advances to GUI 58 to screen 292. On screen 292, the buttons 290, 228, 230, 232 become available and can be indicated by boldening compared to their grayed out depiction when unavailable. The buttons 290, 228, 230, 232 each indicate the corresponding present values, for example, the interval button 290 presently indicates "1" indicating that a first interval is activated. A therapy interval timer 294 is shown including a numerical depiction of the remaining time of the entire therapy regime (24 minutes), and the present interval (1/8).

Figure 30:
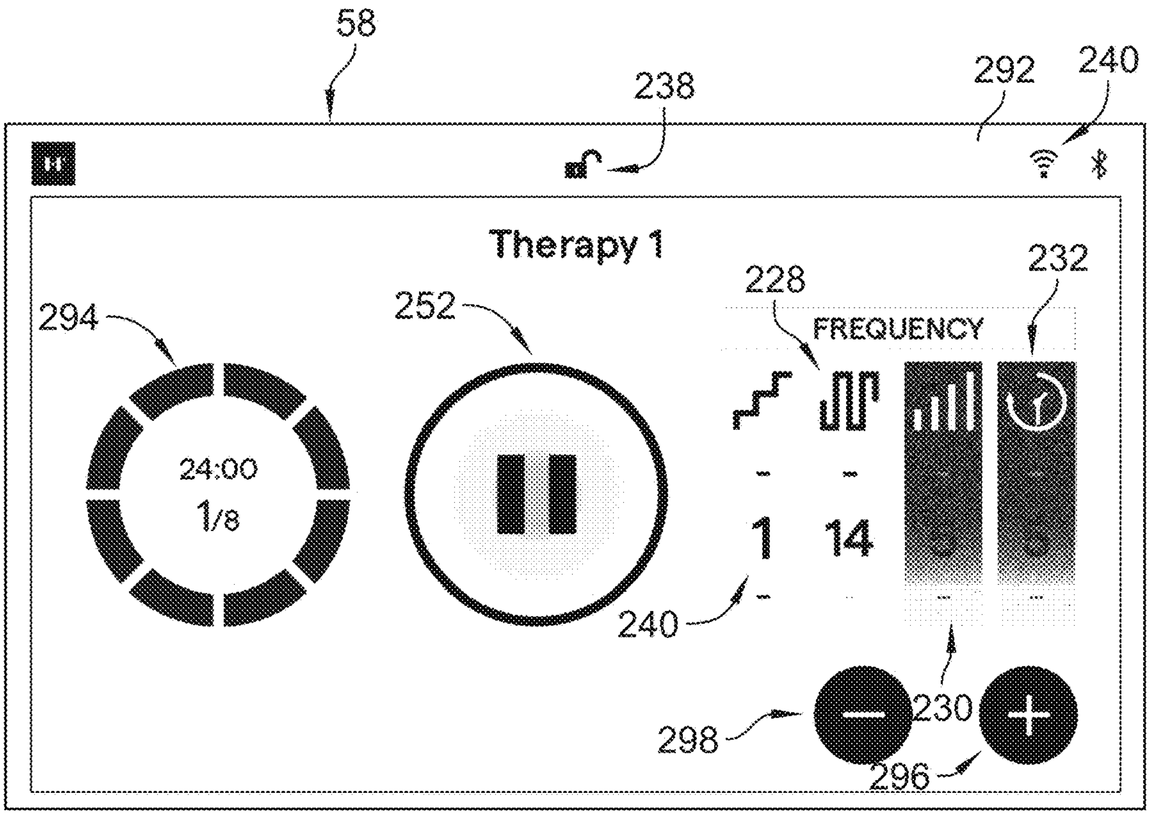

In FIG. 30, the user has activated unlocking to permit adjustment of HFCWO settings while the therapy regime is running. The frequency button 228 is presently selected and the increase and decrease buttons 296, 298 are active for user selection to increase or decrease the frequency of the first step of therapy.

Figure 31:
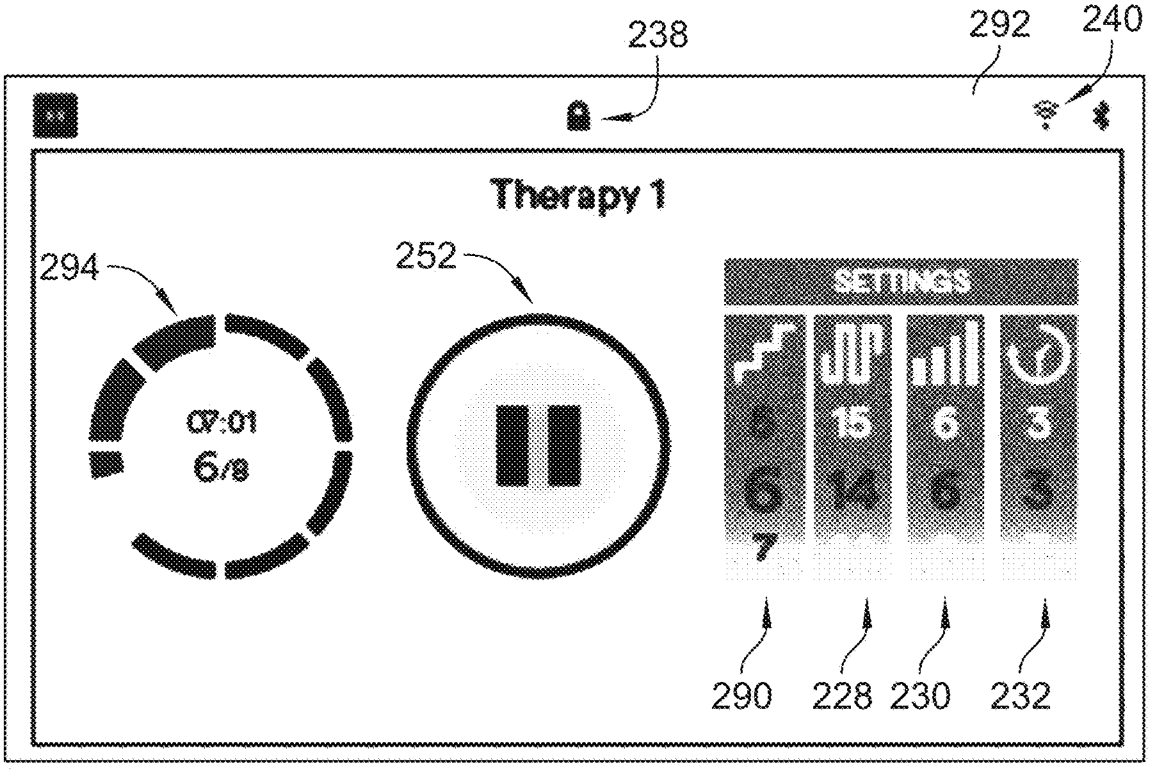

Referring to FIG. 31, an example of screen 292 during operation is shown. The interval timer 294 indicates that 7 minutes 1 second remain of the entire therapy regime in numerical script and by graphical representation of 5 expended bars appearing thin, and remaining three and one partial bars appearing thickened to indicate that they remain. The interval timer 294 indicates by numerical script that interval 6 of 8 is presently executing and the interval button 290 likewise indicates interval 6. Complete execution of the entire therapy regime, including all intervals, responsively presents an indication of therapy has been completed, and timeout and/or user touch of any area on the GUI 58 returns to screen 214.

Figure 32:
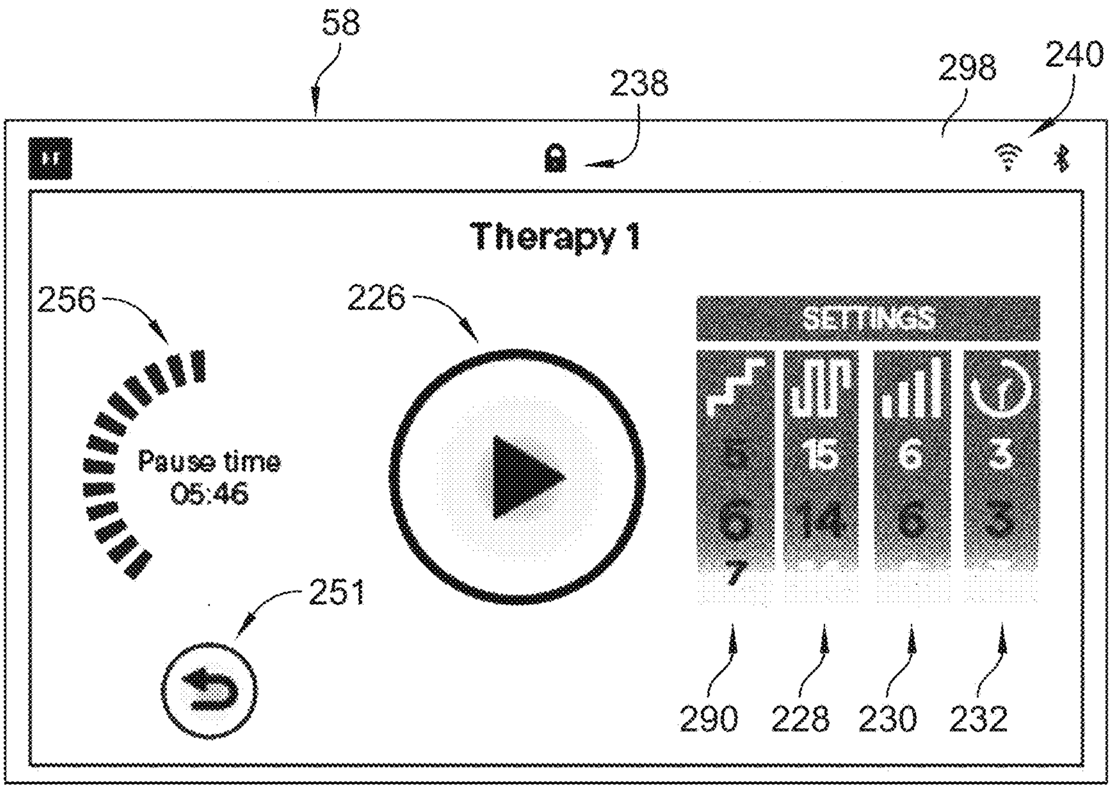

From screen 292, user selection of the pause button 252 pauses oscillation therapy and advances to screen 298. On screen 298, in FIG. 32, the therapy initiation button 226 replaces the pause button 252 and presents the pause timer 256 indicating the amount of pause time (presently accumulated to 5 minutes and 46 seconds). If pause continues to within 2 minutes of the predetermined maximum pause time (illustratively 8 minutes), an indication of 2 minute warning is presented indicating that therapy will be canceled if not resumed before reaching the predetermined maximum pause time, and presenting resume and terminate buttons for user selection. Termination of the therapy during pause, either by expiration of the predetermined pause maximum and/or by user selection of the terminate button responsively presents an indication that therapy has been terminated, and timeout and/or user touch anywhere on the GUI 58 during indication that therapy has been terminated returns to screen 214. If the user selects the termination button, a confirmation of the termination is requested by presentation of confirm and cancel of termination buttons.

Figure 33:
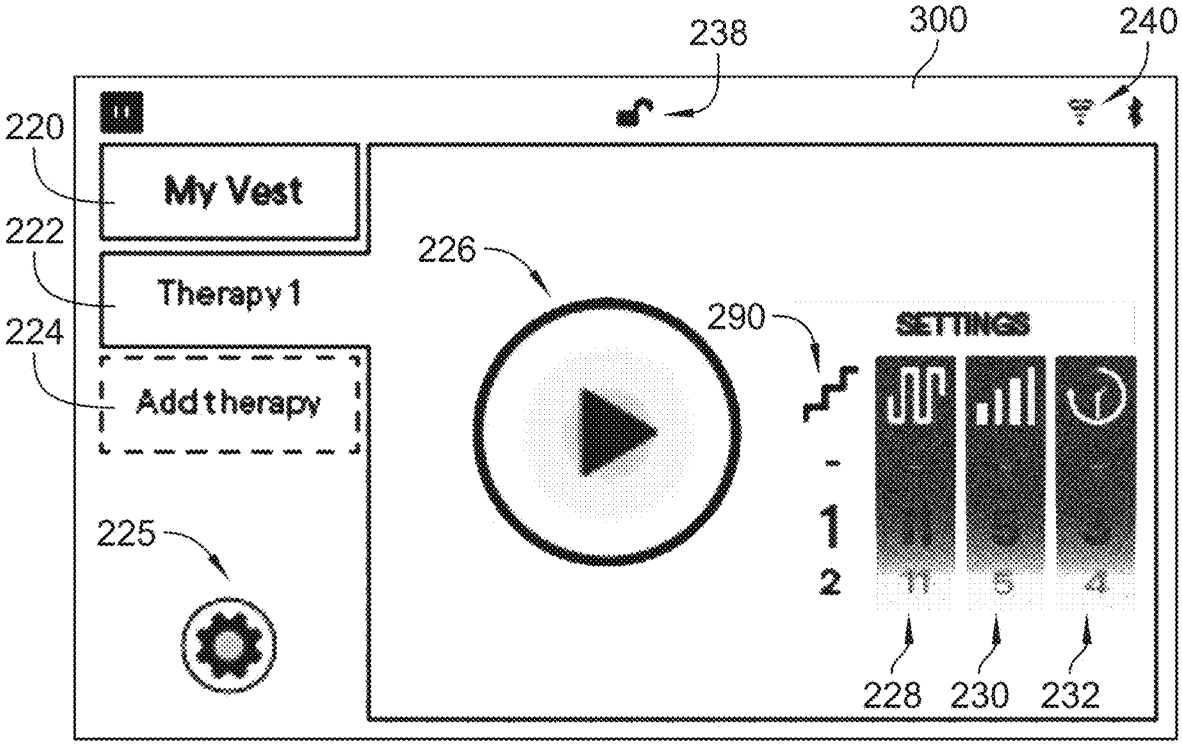

Referring now to FIG. 33, from any of the screens in which selection/activation of the lock button 238 is available to unlock the settings while the therapy tab 222 is selected (e.g., screens 214, 292, 298), user selection/activation of the lock button 238 by long press unlocks the settings control and advances to screen 300. Unlocking the settings control makes available the settings button 225 to adjust the preset therapy conditions for the therapy tab 222.

Figure 34:
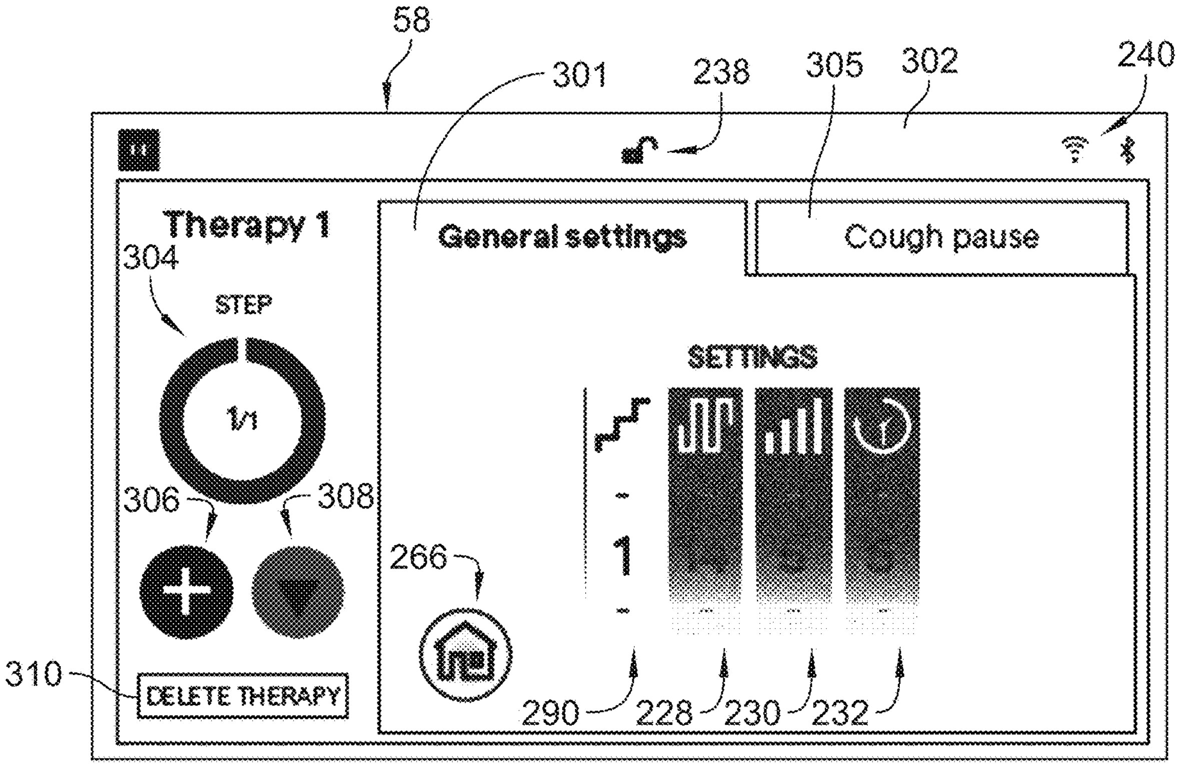

From screen 300, user selection of the settings button 225 opens a preset therapy conditions control interface for the selection therapy tab 222, presently indicating a preset therapy one (1), as indicated in screen 302 as shown in FIG. 34. On screen 300, a general settings tab 301 and cough pause settings tab 305 are presented, the general settings tab 301 indicated as presently selected in FIG. 34. With present selection of the general settings tab for the selected therapy tab 222 (indicated as Therapy 1), therapy buttons 290, 228, 230, 232 are presented for selection to adjust their preset individual values.

On the left hand side, the presently selected therapy tab 222 is indicated by script "Therapy 1". In the illustrative example of FIG. 34, interval button 290 is presently selected and an indication of the interval 304 is presented on the left hand side of the screen 302 indicating selection of the first step of one total interval "1/1" by numerical script and by single circular bar. Add step and return-to-previous-step buttons 306, 308 are presented to allow user selection to add an additional step and to return to the immediately previous step which is presently unavailable in screen 302 due to only one interval step being presently set, as indicated by the button 308 being grayed out. A delete step button 310 is presented for user selection to remove the presently selected step interval.

Figure 35:
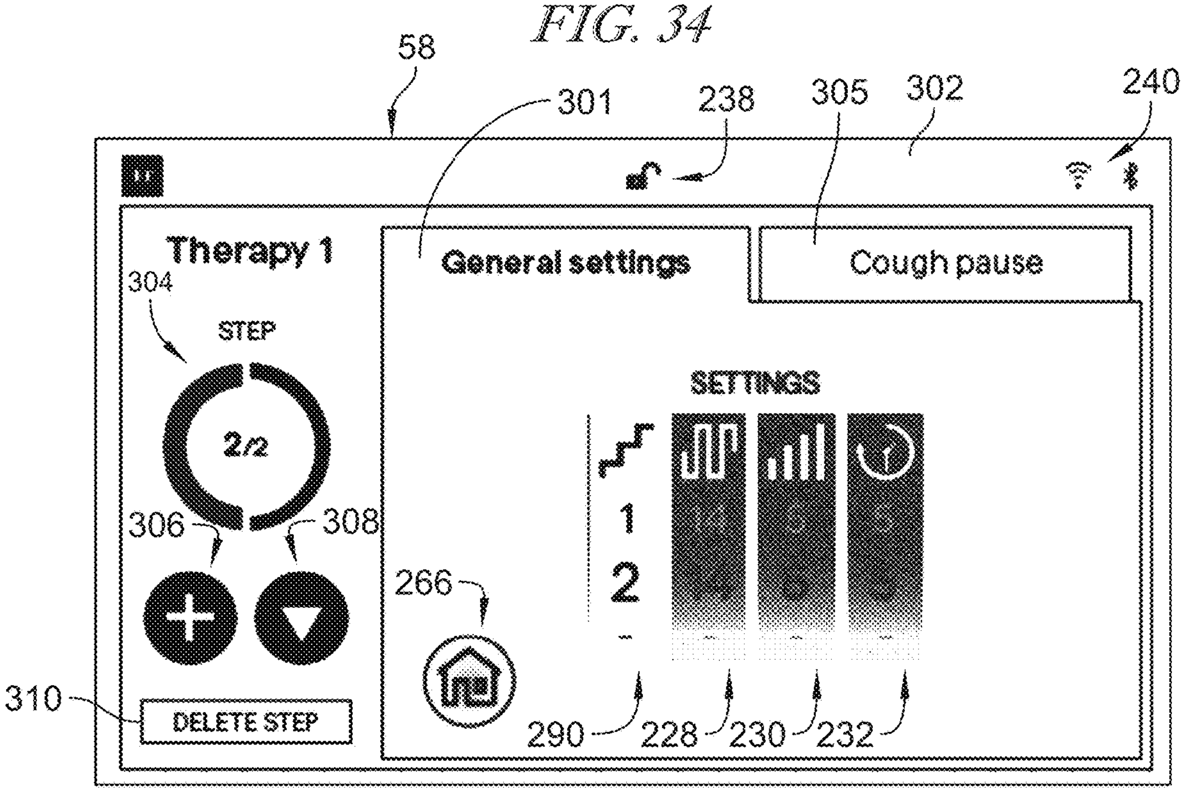
Figure 36:
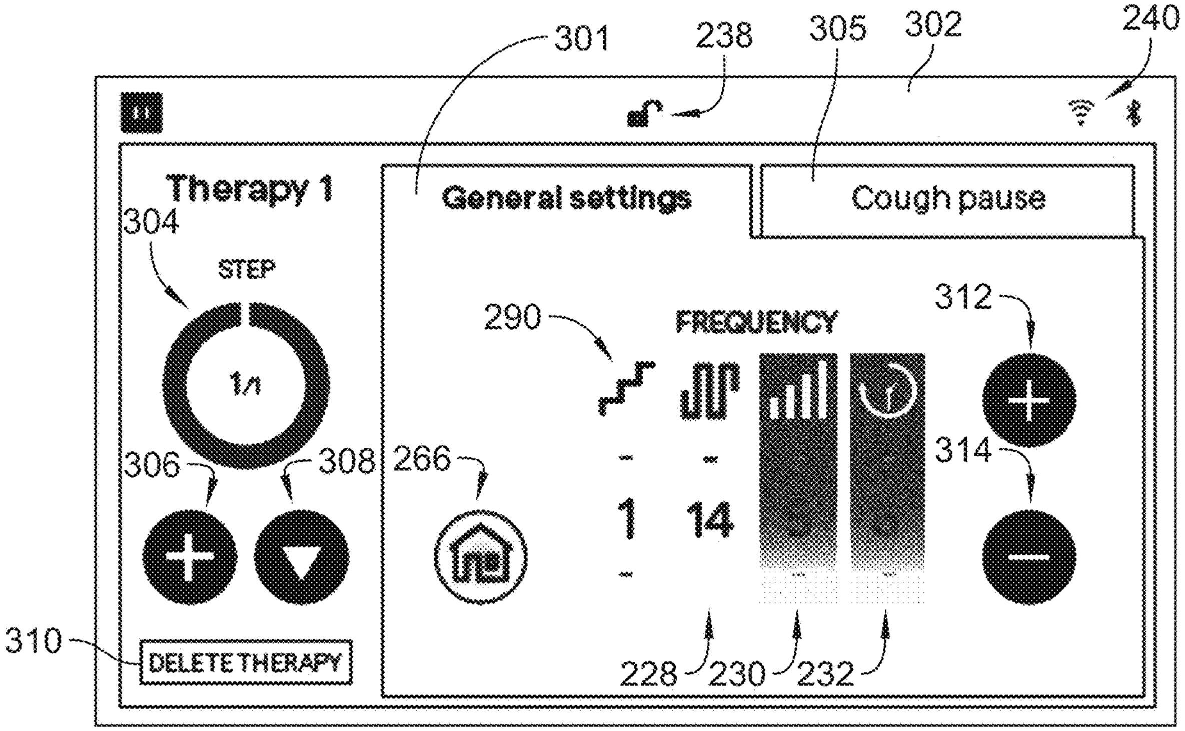

As shown in FIG. 35, the user has selected the add step button 306 which responsively changes the indication of the interval 304 to indicate step 2 of 2 to be presently selected by text script and by depiction of the circle bar segments to have two segments. Selection of the add step button changes the interval button 290 to indicate that step 2 is selected by scrolling the depicted dial to the value 2, with 1 indicated above the dial number 2 and a dash "-" indicated below dial number 2 to indicate that only two intervals currently exist. When more than one interval exists, and the user navigates to intermediate steps using the return-to-previous-step button 308, the add step button 306 is replaced by an advance-to-next step button. In FIG. 35, user selection of the add button 306 continues to add interval steps in similar manner.

From the screen 300, user selection of the frequency button 228 for a presently selected interval step permits user adjustment of the frequency for that interval step as shown on screen 302. The frequency button 228 is highlighted indicating its selection, and increase and decrease buttons 312, 314 are presented for user selection to increase or decrease the frequency for the selected interval step, respectively. User selection of the add step or return-to-previous-step buttons 306, 308 maintains the present buttons selection 228, 230, 232 allowing the user to navigate the settings conditions to adjust the selected conditions. Similarly, user selection of another settings condition buttons 228, 230, 232 allows the increase and decrease buttons 312,314 to control the presently selected setting condition (i.e., frequency, intensity, duration) for the presently selected interval step. In the illustrative embodiment, the user can select the lock button 238 to save and complete preset therapy programming. In some embodiments, a save button may be presented to save and end the preset therapy programming.

Figure 37:
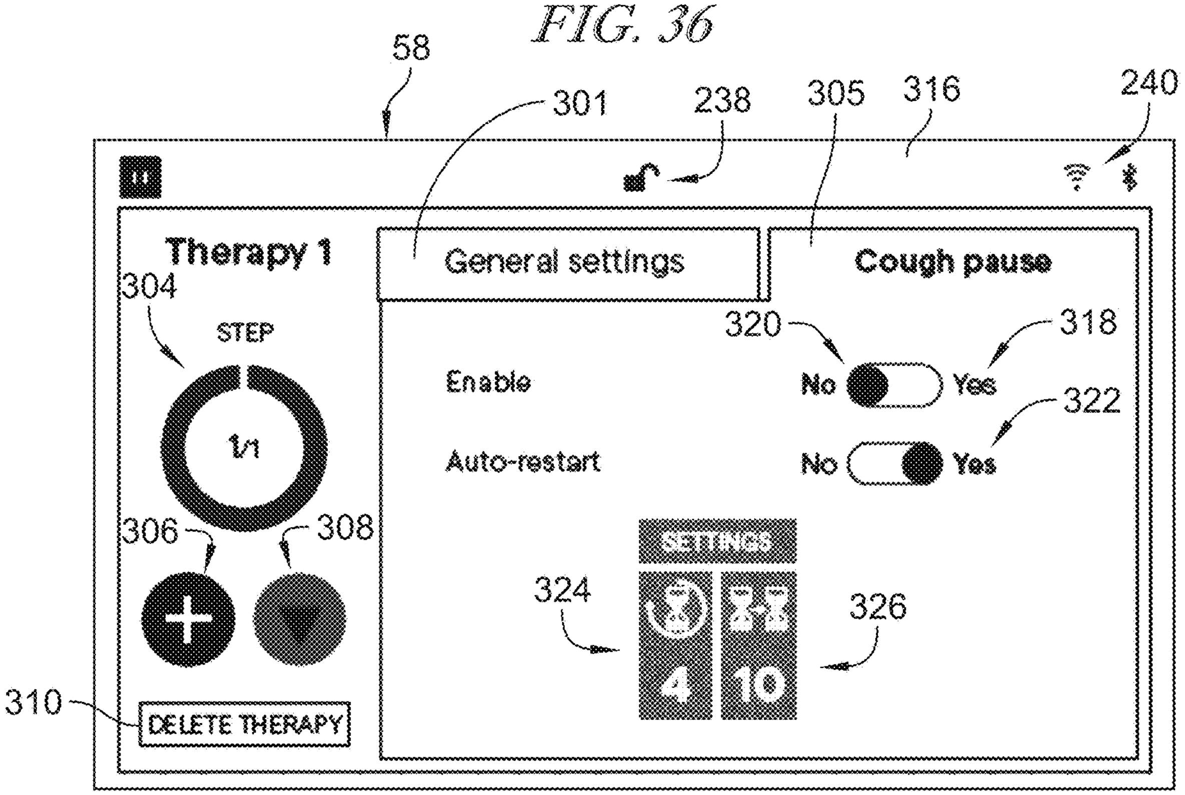

Referring now to FIG. 37, from screen 302, user selection of the cough pause tab 305 advances to screen 316 and presents cough pause options 318 for the presently selected interval step. The cough pause options 318 include cough pause enable toggle 320 to enable automatic pausing of the therapy regime for cough intervals during the interval step, and an automatic restart toggle 322 for enabling therapy to automatically restart (resume) after a cough pause without user input when enabled or requiring user input to resume the therapy regime when disabled.

The cough pause options 318 include a cough pause duration setting 324 and cough pause interval setting 326 for the presently selected interval step. When the cough pause enable toggle 320 is disabled (as shown in FIG. 37), the cough pause duration setting 324 and cough pause interval setting 326 are unavailable and can be indicated as such by being grayed out.

Figure 38:
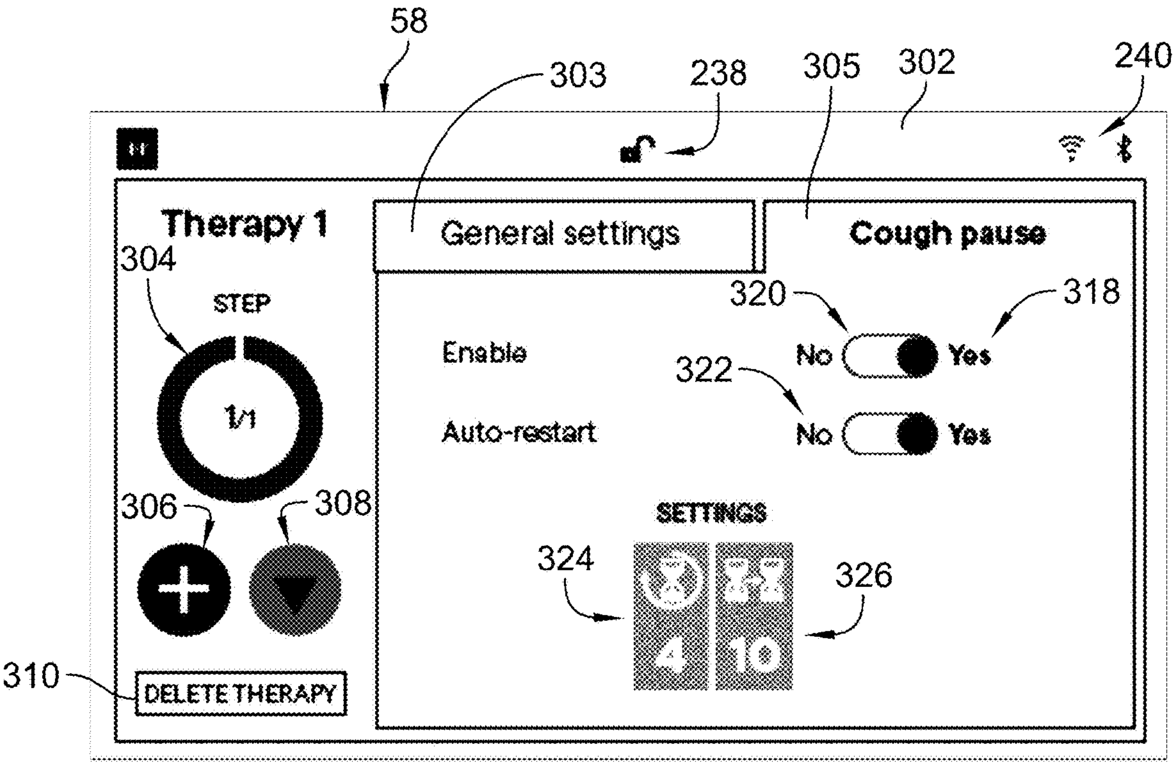
Figure 39:
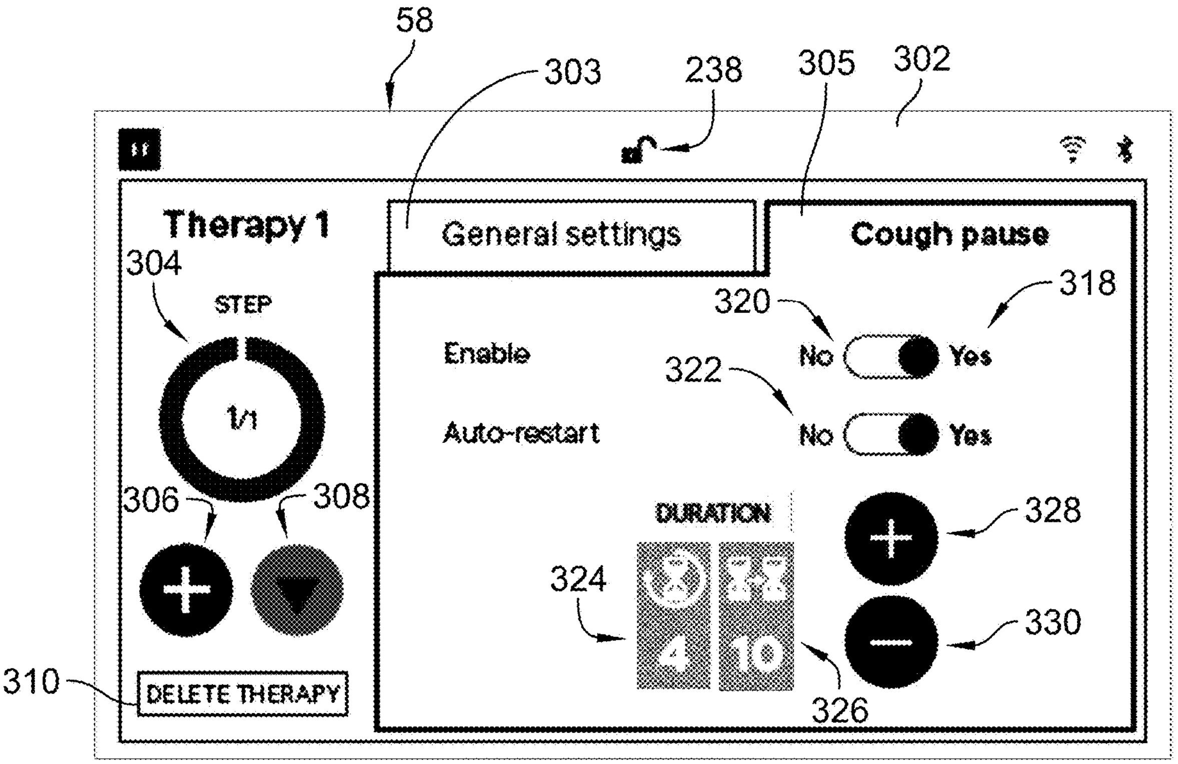

Enabling the cough pause enable toggle 320 enables the cough pause duration setting 324 and cough pause interval settings 326 for available selection as shown in FIG. 38. User selection of the cough pause duration setting 324 can be indicated by highlighting the setting button 324 and indicating in script "Duration" above the setting button 324. Responsive to selection of the cough pause duration setting 324, increase and decrease buttons 328, 330 are presented for user selection to adjust the value of the present cough duration condition (presently set for 4 minutes) for the presently selected interval step. User selection of the cough pause interval setting can be indicated by highlighting the setting button 326 and indicating in script "Interval" above the setting button 326. Responsive to selection of the cough pause interval setting 326, increase and decrease buttons 328, 330 are presented for user selection to adjust the present cough interval condition (presently set for 10 minutes) for the presently selected interval step. FIGS. 38 and 39 indicate that the user has toggled the enable and automatic restart toggles 320, 322 to the on position to enable their features.

Figure 40:
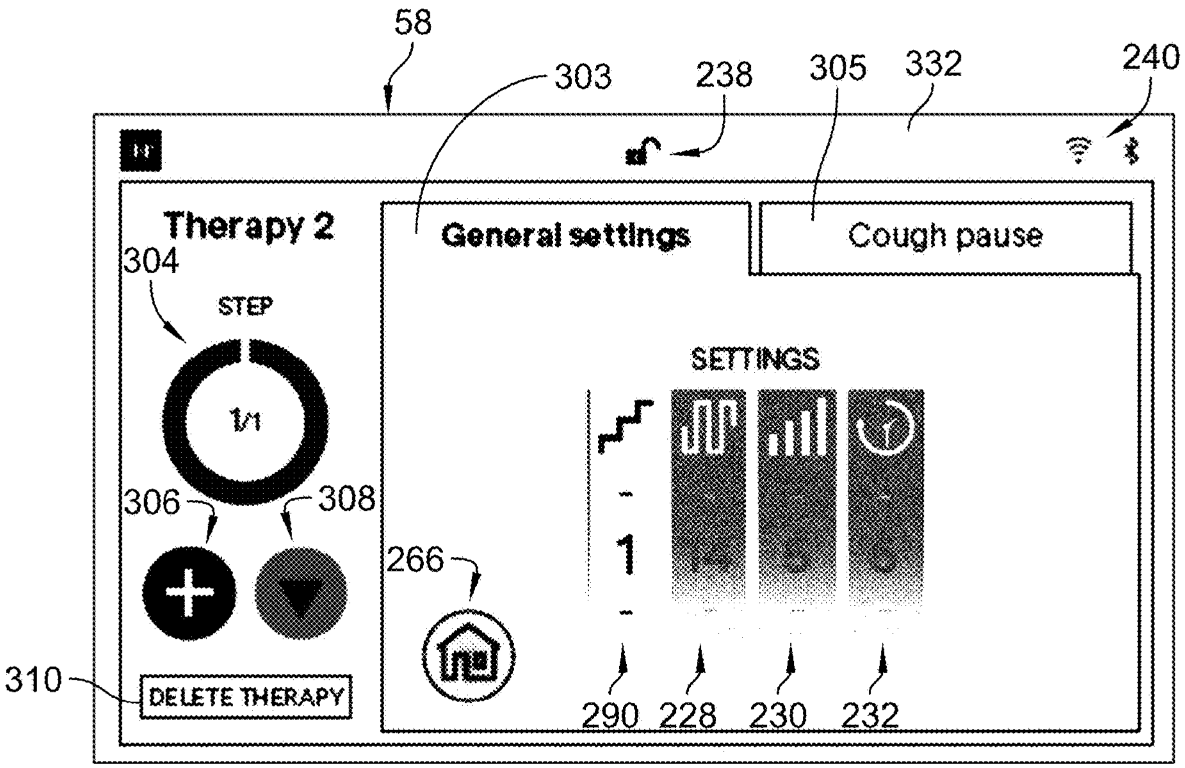

Referring now to FIG. 40, the user has selected the add program tab 224, for example, from any of screens 214, 258, 300 to add a new preset therapy opens a preset therapy conditions control interface (indicated as Therapy 2). In the illustrative embodiment, user selection of the add program tab 224 automatically advances to the unlocked settings state, although in some embodiments, selection of the add program tab 224 may require confirmation to unlock settings and/or may be unavailable without unlocked settings.

Responsive to user selection of the add program tab 224, screen 332 is presented to open a preset therapy conditions control interface for the new present therapy to allow user configuration of an additional present therapy, shown by example as "Therapy 2" as the next available numerical series of preset therapy settings. The user can select and adjust the preset therapy settings for therapy 2, for example, for intervals, frequency, intensity, duration, cough pause, etc. in similar manner as discussed above regarding therapy 1. Upon successful creation of a new present therapy, an additional therapy tab is added between the tab 222 and the tab 224 allowing user selection of the therapy 2 tab in the corresponding screens. Accordingly, a number of preset therapy regimes can be preset for user selection and/or modification.

Figure 41:
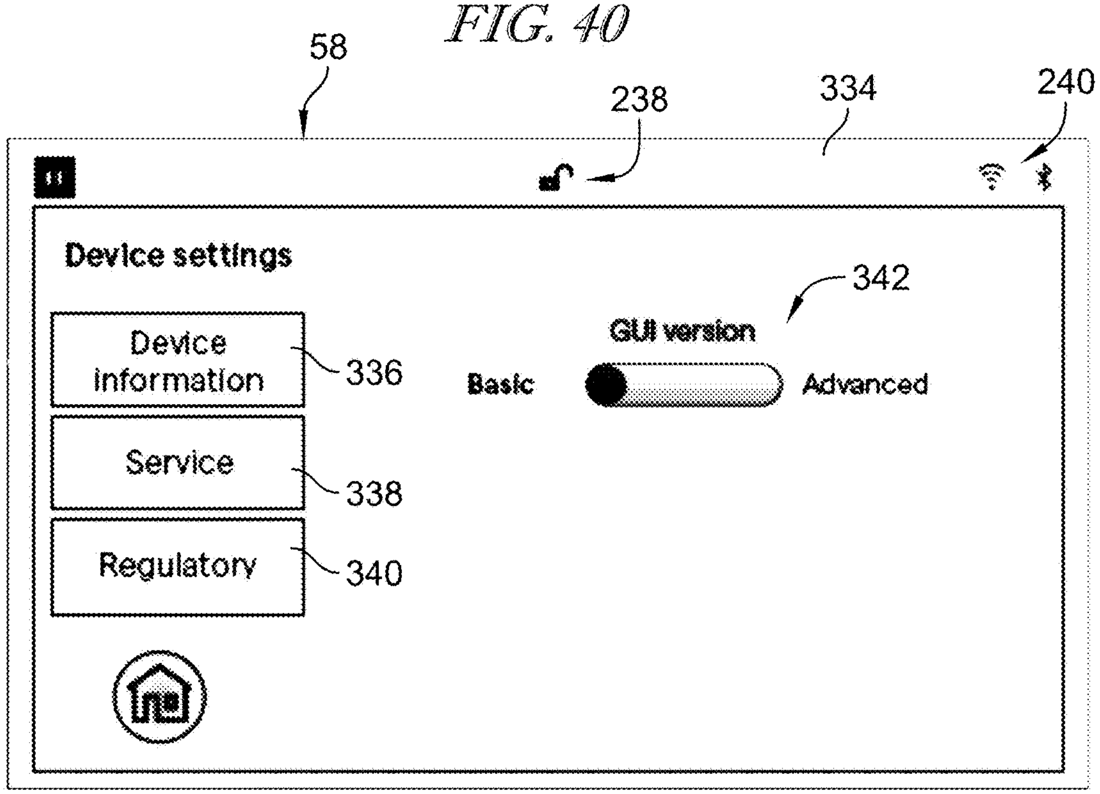

Referring now to FIG. 41, the user has selected the settings button 225, as available, for example, in screen 258. Responsive to user selection of the settings button 225, the GUI 58 advances to a device settings screen 334. The device settings screen 334 presents settings tabs 336, 338, 340 and GUI version toggle 342. The settings tabs include a device information tab 336 for presenting information regarding the force generator 16, for example but without limitation, model identification information, performance information, software/firmware information (e.g., version and/or date of latest update), and/or user-device registration information. The settings tabs include a service tab 338 for user selection to present service information regarding the force generator 16, for example but without limitation, information regarding service history, recommended service, and/or service facility identification and/or contact information. The settings tabs include a regulatory tab 340 for user selection to present regulatory information regarding the force generator 16, for example, application governing regulation, compliance, and/or resource information.

The GUI version toggle 342 includes two modes comprising a basic mode as shown and described hereinabove, and an advance mode. The advanced mode is illustratively embodied as additionally sophisticated mode having additional and/or more granular options for selective adjustment, including wireless communications configurations, power control options, and/or related operations less commonly required for patient operation. User toggling of the GUI version toggle 342 presents the advanced mode and allows return to the basic mode by re-toggling the GUI version toggle 342.

Figure 42:
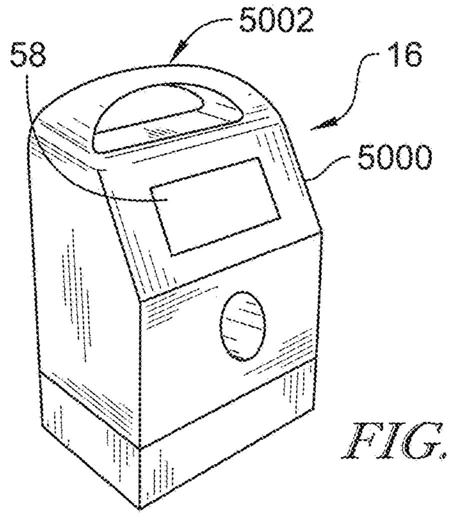
FIGS. 42-44 are perspective view of various embodiments of casings of the force generator including handles for portage.
Figure 43:
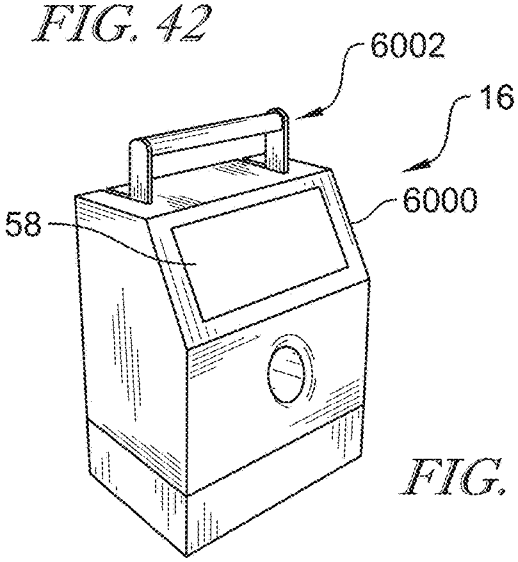
Figure 44:
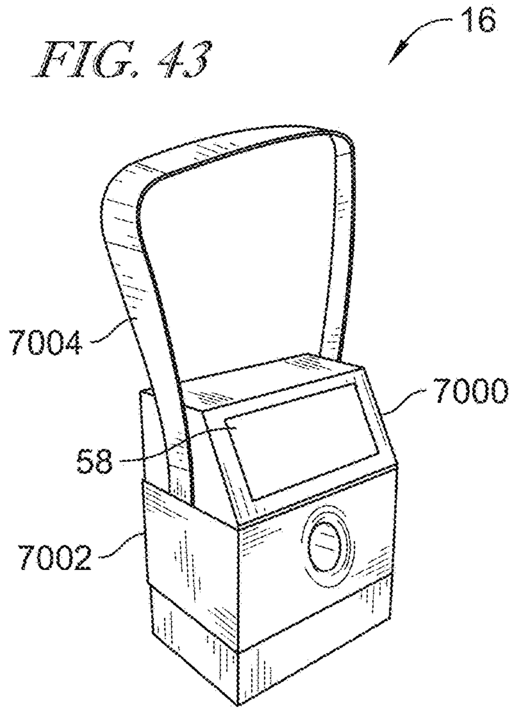

Referring now to FIGS. 42-44, exemplary arrangements of the force generator 16 are shown. In FIG. 42, the force generator 16 is shown having a casing 5000 and a top-mounted handle 5002 integral with the casing 5000. The handle 5002 is illustratively fixed with the casing 5000. Referring to FIG. 43, the force generator 16 is shown having a casing 6000 similar to the casing 5000, but having a collapsible handle 6002 secured on top. The handle 6002 is collapsible by pivoting to the rear side of the casing 6000. In FIG. 44, the force generator 16 is shown having another casing 7000 and a covering 7002 having a handle 7004 extending across the top of the casing 7000. The covering 7002 is embodied as a sleeve wrapping around the exterior of the casing 7000 having the handle 7004 integrally formed therewith. The covering 7002 and handle 7004 are illustratively formed of a resiliently flexible material. The handle 7004 can be shaped to provide a shoulder strap for carrying the force generator 16.

Figure 45:
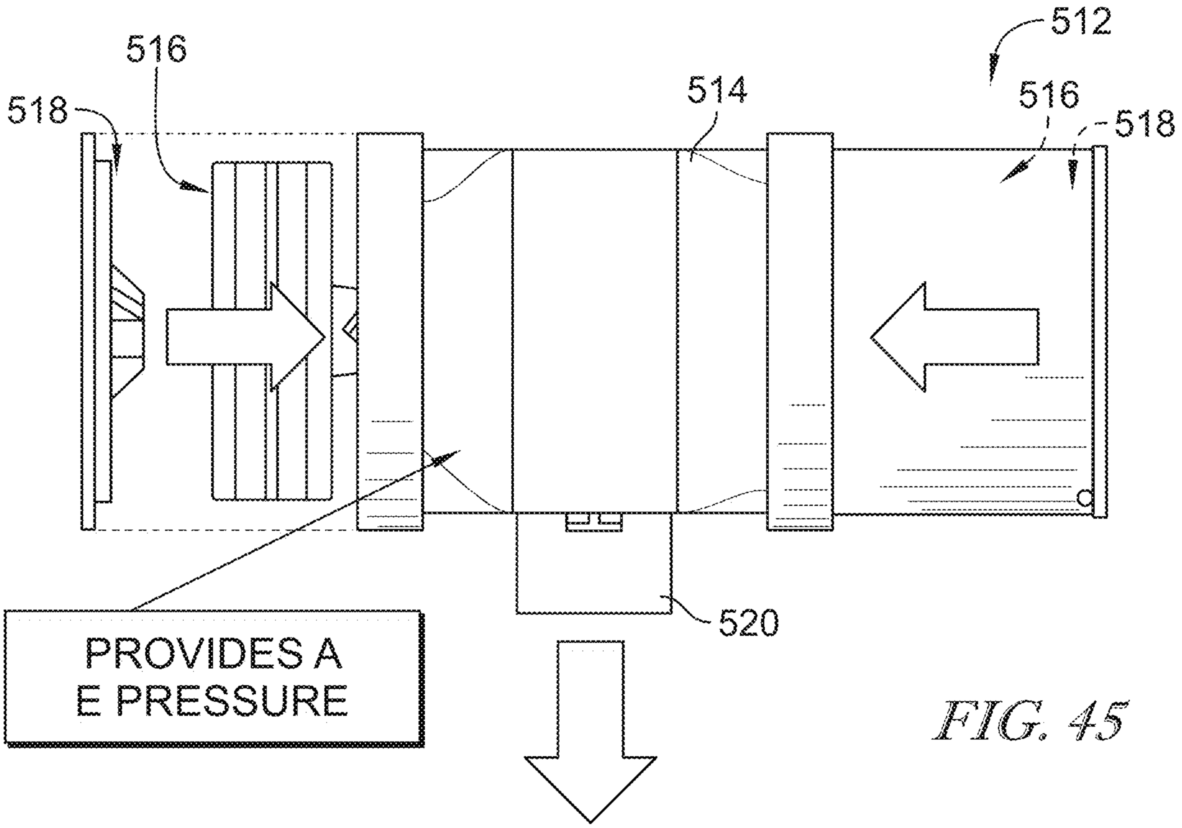
FIG. 45 is a plan view of a pump assembly of the force generator of FIG. 1.
Figure 46:
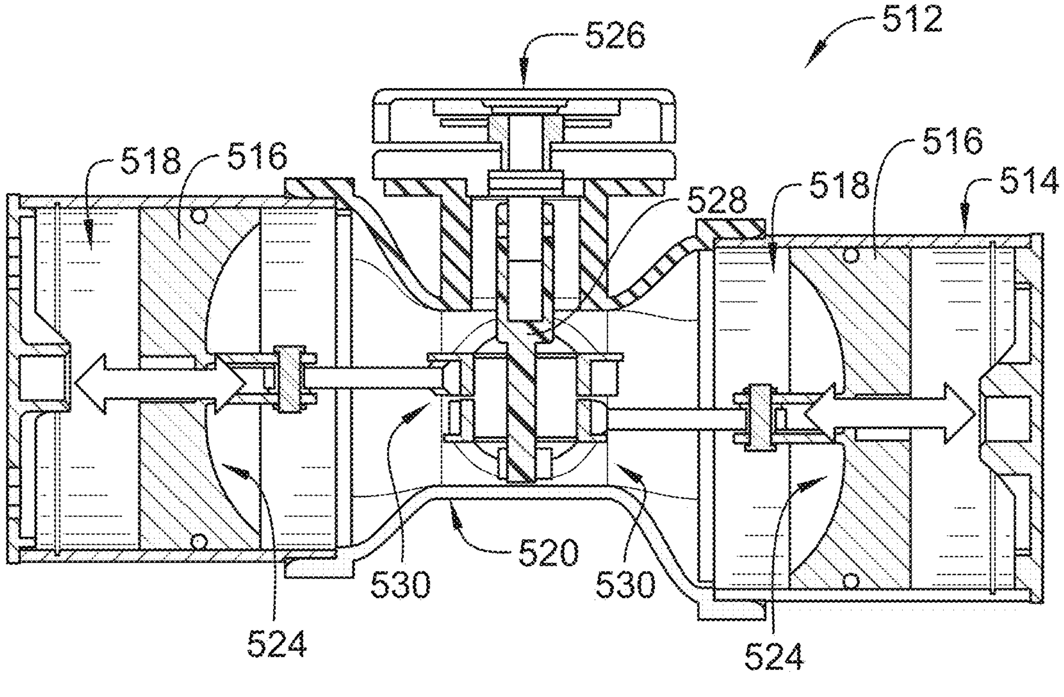
FIG. 46 is a cross-section view of the pump assembly of FIG. 45.

Referring now to FIGS. 45 and 46, a pump assembly 512 of the force generator 16 is shown having exterior portions of the force generator 16 removed for ease of disclosure. The pump assembly 512 illustratively includes a pressurization housing 514 and piston assembly arranged within the pressurization housing 514 to generate pressure. The pressurization housing 514 includes piston chambers 518 for receiving the pistons 516 to generate pressure and pressurization outlet 520 for communicating pressure to the garment 14.

The piston chamber 518 are illustratively arranged on opposite lateral sides of the pressurization housing 514 extending longitudinally parallel for parallel piston travel. Each piston 516 is arranged in its corresponding piston chamber 518 for reciprocating motion to generate pressure. Each piston 516 is tightly spaced from the wall 522 (and may include piston rings to tightly control the spacing) defining the corresponding piston chamber 518 to generate pressure on a pressure side 524 as it reciprocates (laterally in the orientation of FIGS. 45 and 46. The pressure side 524 of each piston chamber 518 is arranged in communication with the outlet 520 for communication to the garment 14.

Referring to FIG. 46, a drive motor 526 is coupled with both pistons 516 to drive reciprocal motion. The drive motor 526 includes a rotating drive shaft 528 for providing rotational drive. The pistons 516 are each coupled to the drive shaft 528 via a corresponding linkage 530.

Figure 47:
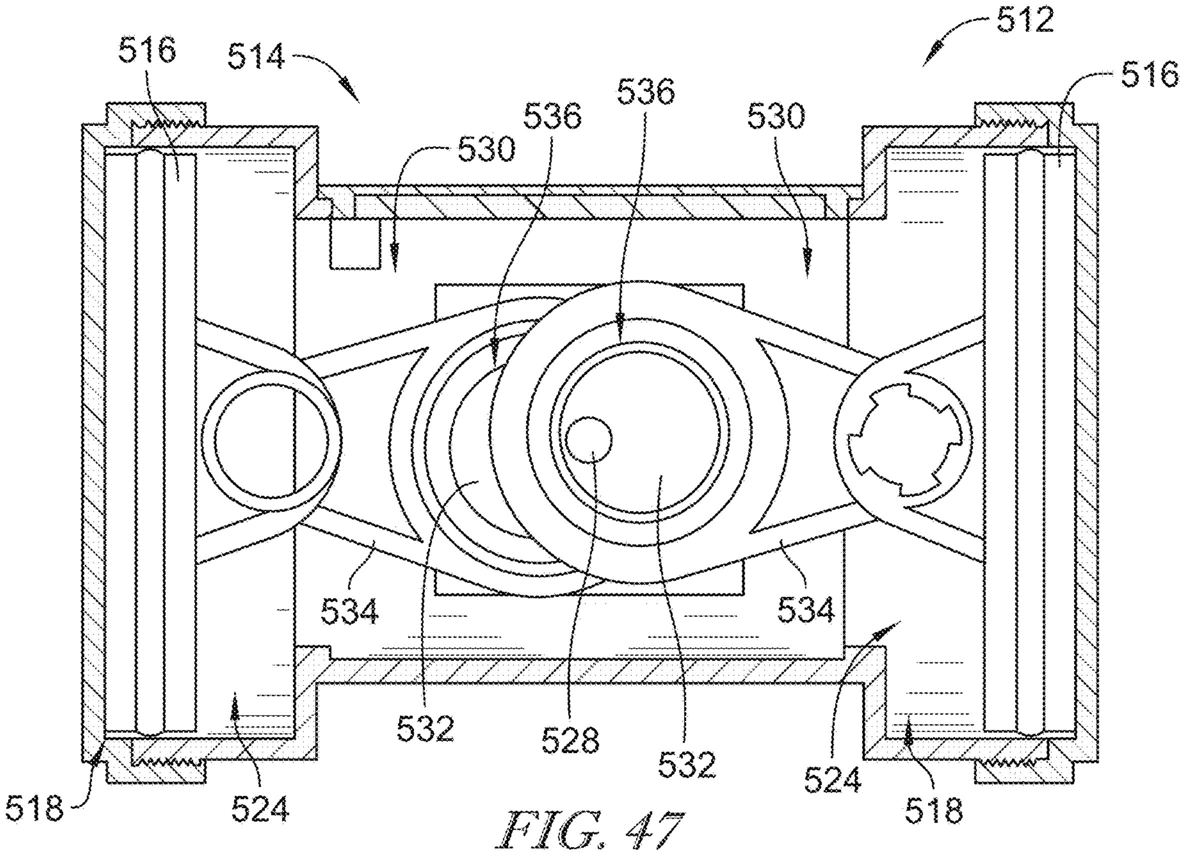
FIG. 47 is another cross-sectional view of the pump assembly of FIG. 45.

Referring now to FIG. 47, each linkage 530 is operatively connected with the drive shaft 528 to transfer rotational drive of the drive shaft 528 into reciprocal motion of the corresponding piston 516. Each linkage 530 includes an eccentric cam member 532 coupled with the drive shaft 528 for rotation therewith. Each drive linkage 530 includes a linkage strut 534 pivotably connected with the corresponding piston 516 on one end and coupled with the corresponding cam member 532 to transferring reciprocal motion for transfer without rotational movement from the cam member 532.

In the illustrative embodiment, each linkage strut 534 is coupled with the corresponding cam member 532 by a cylindrical yoke 536 formed on an end of the linkage strut 534 opposite the connected with the corresponding piston 516. The cylindrical yoke 536 of each linkage strut 534 receives the corresponding cam member 532 therein, illustratively with a plain bearing arrangement to transfer rotational cam motion into reciprocal piston drive. The cam members 532 are arranged offset from each other in rotational position relative to the drive shaft 528 so that the pistons 516 travel in coordinated manner away from and towards the drive shaft 528.

On each outward stroke of the pistons 516, a negative pressure is created for communication through the outlet 520 to the vest 14, and on each inward stroke of the pistons 516 a positive pressure is created for communication through the outlet 520 to the vest 14. The positive and negative pressure from the piston operation can be controlled for communication with the vest by pressure valves, such as through check valves for appropriate routing.

Figure 48:
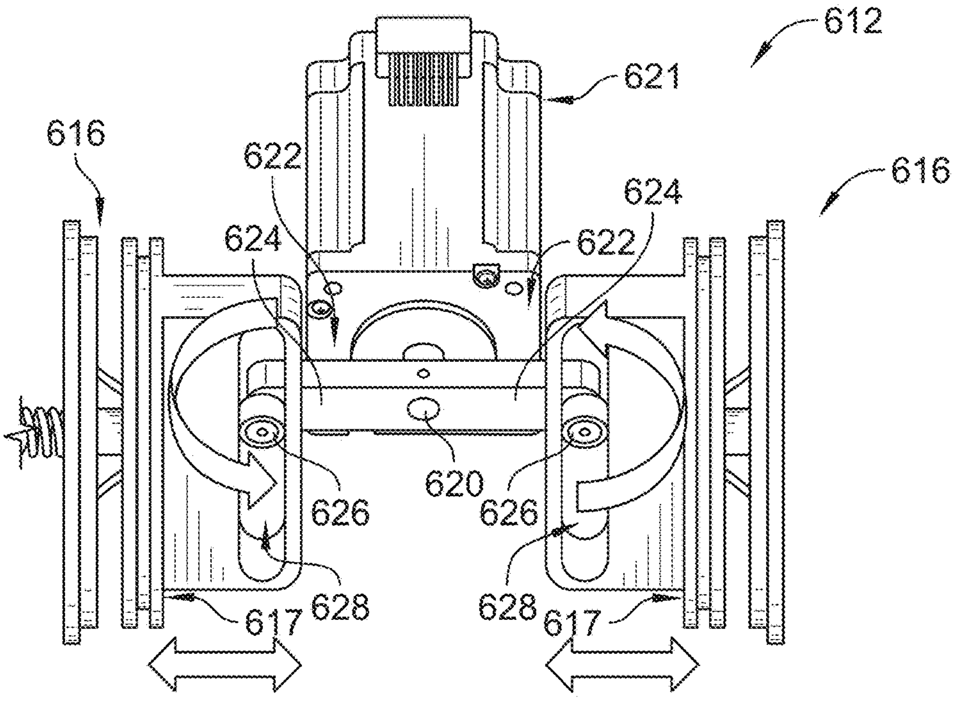
FIG. 48 is perspective view of another embodiment of portions of a pump assembly of the force generator of FIG. 1.

Referring now to FIG. 48, another illustrative pump assembly 612 of the force (pressure) generator 16. The pump assembly 612 is similar to the pump assembly 512, and the disclosure of pump assembly 512 applies equally to pump assembly 612, except in instances of conflict with the specific disclosure of pump assembly 612. Similar to pump assembly 512, the pump assembly 612 includes a pressurization housing including piston chambers, and two pistons 616 each arranged within a corresponding piston chamber for reciprocal movement to generate pressure on a pressure side 617 of the piston 616 for communication to the vest 14.

The pump assembly 612 includes a drive shaft 620 arranged for rotational drive by a drive motor 621 to provide drive to the pistons 616. Each piston 616 is coupled with the drive shaft 620 by a drive linkage 622. Each drive linkage 622 includes a radial link 624 secured with the drive shaft 620 on one end and coupled with the corresponding piston 616 on an opposite end. In the illustrative embodiment, the radial links 624 are each formed by a single member joined with the drive shaft 620 near its center. Each radial link 624 includes a cam member 626 arranged on the opposite end for engagement with the corresponding piston 616 to drive reciprocal motion.

The cam member 626 of each radial link 624 is arranged within a yoke track 628 of the corresponding piston 616. The cam member 626 of each radial link 624 is arranged to travel along the corresponding yolk track 628 under rotation of the drive shaft 620 to transfer rotational motion of the drive shaft 620 into reciprocal motion to drive the corresponding piston 616. The drive shaft 620 is operated for rotation in a first direction to drive the pistons 616 outward from each other to generate negative pressure, and in a second direction opposite to the first rotation direction to drive the pistons 616 inward to create positive pressure. To provide bi-directional rotation of the drive shaft 620, as stepper motor may be applied having positional feedback for the drive shaft 620.

Figure 49:
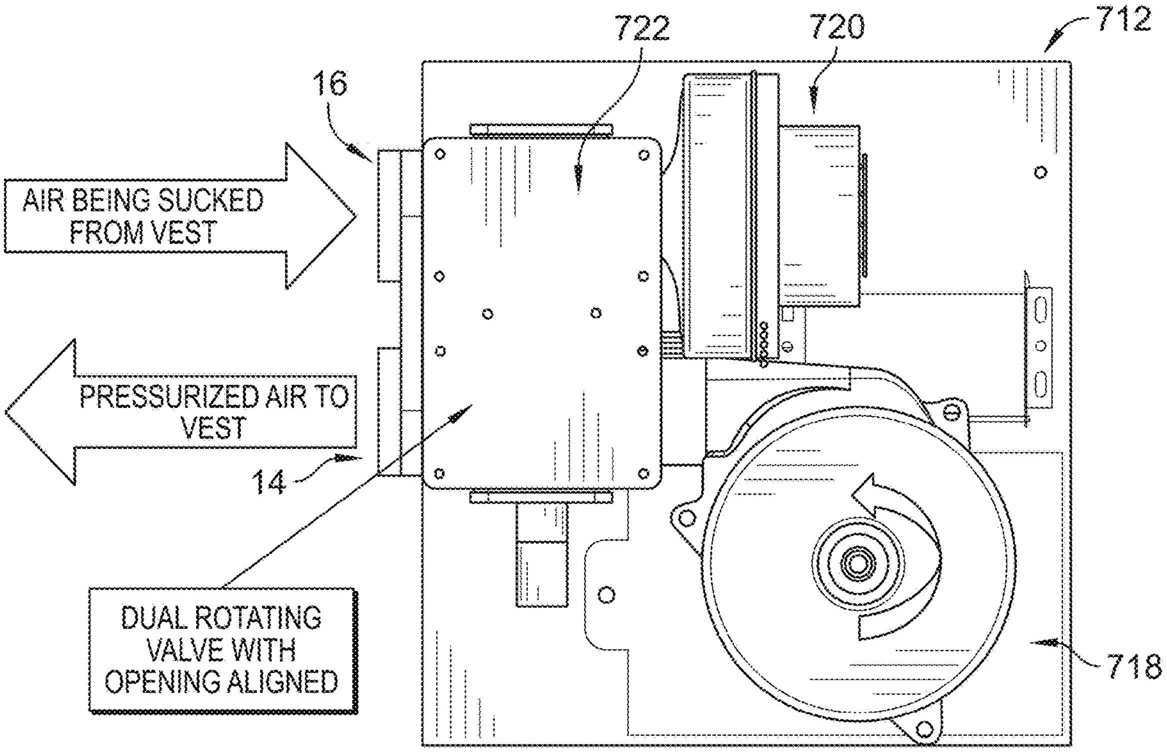
FIG. 49 is an elevation view of another embodiment of portions of a pump assembly of the force generator of FIG. 1.
Figure 50:
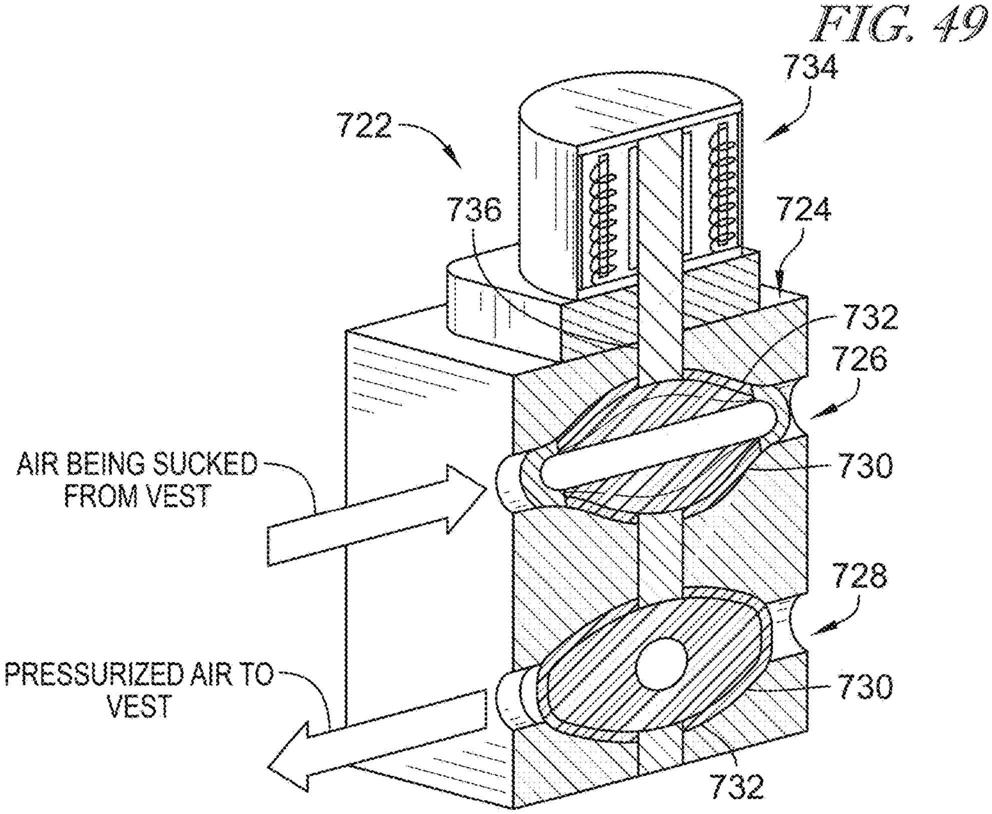
FIG. 50 is a cross-sectional view of a pump control assembly of the pump assembly of FIG. 49.

Referring now to FIG. 49, another pump assembly 712 is shown. The pump assembly 712 includes a pressurization bank as part of the force generator 16. The pressurization bank including a positive pressure port 714 for providing positive pressure for communication to the vest 14, and a negative pressure port 716 for providing negative pressure for communication to the vest 14. The pump assembly 712 illustratively includes a positive pressure pump 718 and negative pressure pump 720, although in some embodiments, a single pump may generate both positive and negative pressure. The pumps 718, 720 are arranged in selective communication with the ports 714, 716 via a pressure control assembly 722.

The pressure control assembly 722 comprise a pressure control device for successively providing positive and negative pressure to the vest 14. The pressure control assembly 722 illustratively includes a casing 724 defining two pressure flow paths 726, 728 each having one end connected with the corresponding port 714, 716 and the other end in connection with the corresponding pump 718, 720 such that one flow path 726 is a positive flow path and the other flow path 728 is a negative flow path. The pressure control assembly 722 includes positive side and negative side control bodies 730 arranged in each flow path 726, 728 for selective operation to communicate respective positive and negative pressure with the vest 14.

Each control body 730 includes a flow channel 732 defined therethough for selective arrangement in communication with corresponding flow path 726, 728 to allow the connected pressure to communicate with the vest 14 in open flow position, and selective arranged out of communication with the corresponding flow path 726, 728 to block against connected pressure to communicate with the vest 14 in closed flow position Each control body 730 rotates within the casing 724 to provide successive operation through open flow and closed flow position. Each flow channel 732 is arranged to have two opposite ends such that rotation in one direction creates two angular orientations having open flow position.

The control bodies 730 are arranged to have their flow channels 732 out of parallel with each other to permit only one of positive or negative pressure at a given time. More specifically, the angular position of the flow channels 732 of each control body 730 about its rotational axis is offset to be about perpendicular to each other during rotation. The control bodies 730 are each illustratively secured to the same rotational drive shaft 736 driven by rotation drive motor 734 to provide continuous rotation to successively communicate positive and negative pressure to the vest 14 to provide oscillation therapy according to the therapy control system 46.

The control bodies 730 are illustratively formed to have oblate spheroid shape. The flow channel 732 of each control body 730 illustratively extends through the longitudinal dimension of the control body 730. Operation of each of each of the pump assemblies 512, 612, 712 is illustratively governed according to the therapy control system, including accordingly to settings and/or inputs as discussed regarding the GUI 58.

Figure 51:
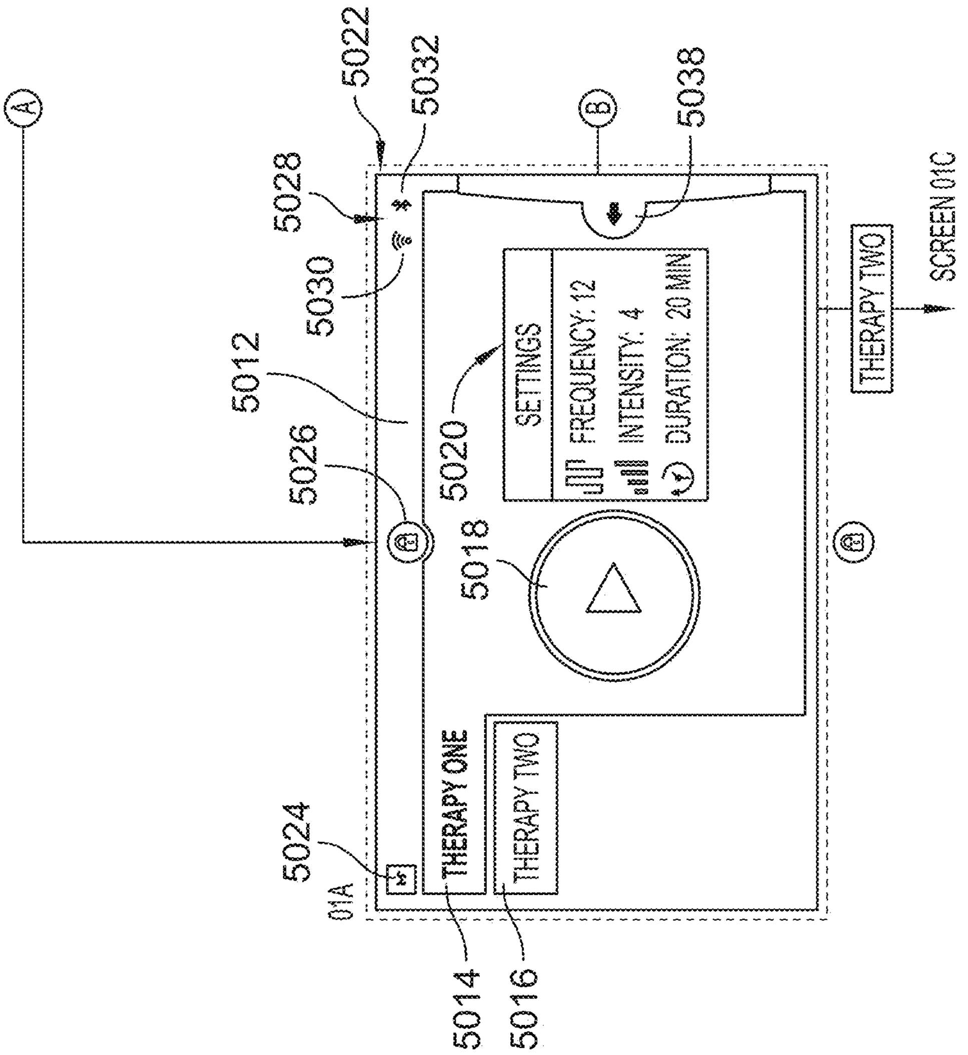
FIGS. 51-78 are other display screens presented on the GUI of the force generator of FIG. 18 indicating various operations of the force generator.

Referring now to FIG. 51, a default screen 5012 (screen 01A) of the GUI 58 is shown. The default screen 5012 is illustratively embodied as an initial screen appearing after time out of the introduction screen 212 as alternative to other screen operations discussed, for example, those screen operations related to screen 214 in FIG. 20, however, in some embodiments, screen operations related to either or both default screen 5012 and screen 214 may be combined in any suitable manner to support HFCWO operations. The default screen 5012 and related screen operations are similar to the screen 212 and related screen operations, and the disclosure of screen 212 and related screen operations applies equally to default screen 5012 and the related operations, except in instances of conflict with the specific disclosure of default screen 5012 and related operations.

In screen 5012, the GUI 58 presents a number of selection tab options including tabs 5014, 5016, the tab 5014 being presently selected as indicated by its bold text and by continuous connection with the remainder of the screen 5012 (right-side portion). The presently selected tab 5014 presents a therapy initiation button 5018, and HFCWO settings 5020 as presently set including frequency (12), intensity (4), and duration (20 min). The presently selected settings values for HFCWO therapy are illustratively applied as the default settings for the presently selected therapy regime, and in some arrangements, the HFCWO system determines settings values dynamically during the therapy, for example, determines dynamic changes to the settings to lessen frequency and/or intensity values during inhale and/or to increase frequency and/or intensity values during exhale, according to determination of the user's breathing as discussed above, for example, to increase comfort to the patient while maintaining effectiveness of therapy. In some embodiments, a dynamic toggle switch may be provided by the GUI 58 for user activation to toggle on and off dynamic HFCWO settings control, for example, for any given therapy regime.

In screen 5012, the GUI 58 presents a header bar 5022 visible on several screens. The header bar 5022 illustratively includes a provider icon 5024, system lock button 5026 indicating present lock arrangement by graphical illustration of a closed pad lock, and wireless communications indication 5028. The wireless communications indication 5028 illustratively includes a Wi-Fi indicator 5030 and Bluetooth indicator 5032 each for indicating availability of their respective connection type.

Figure 52:
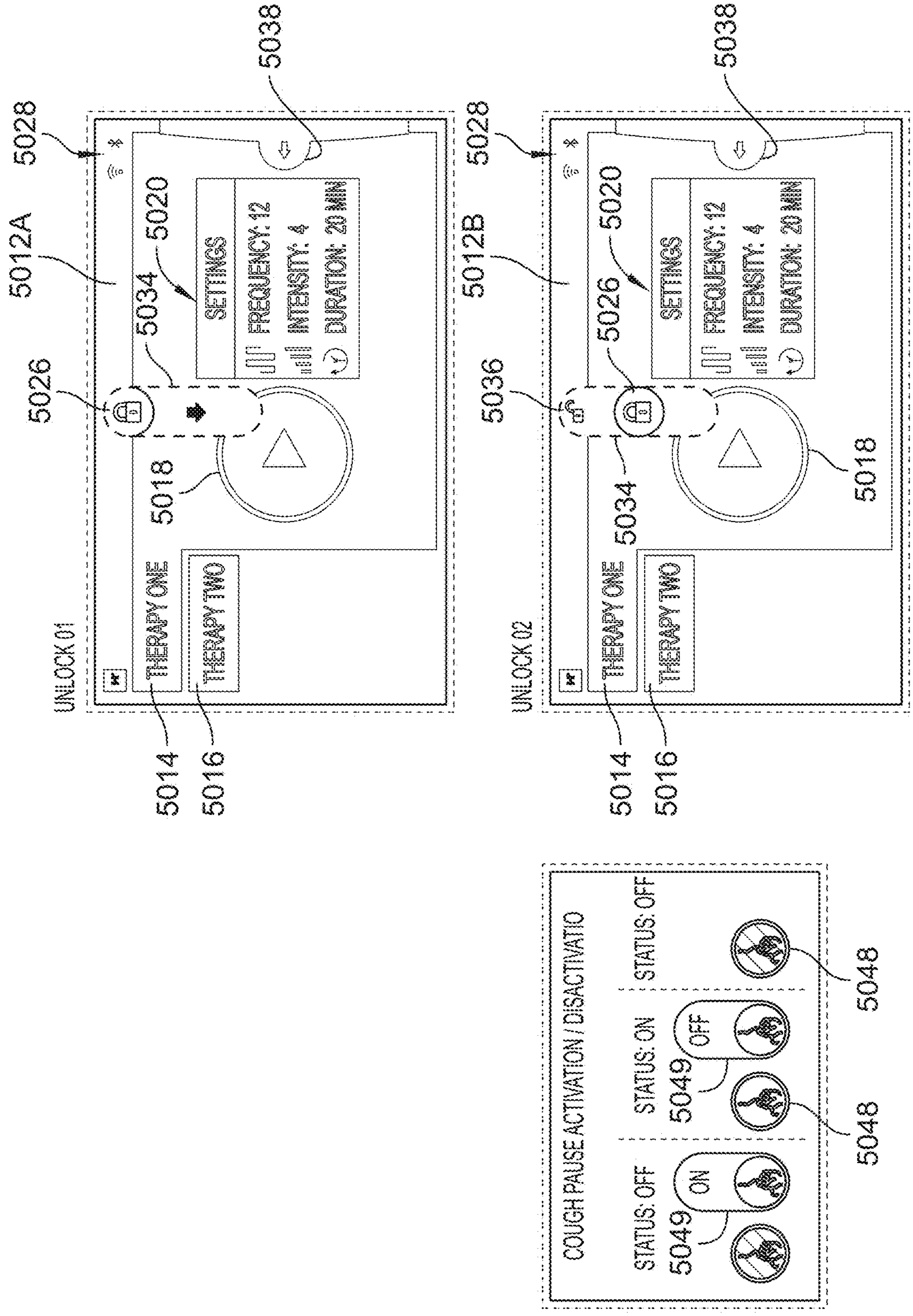

Referring to FIG. 52, on screen 5012A, the user can unlock the GUI 58 for adjustment by activation of the system lock button 5026. Upon initial selection of the system lock button 5026, illustratively, touching or near touching the system lock button 5026, the system lock button 5026 is slightly enlarged, and a drag track 5034 is displayed indicating to the user a drag direction and extent to activate unlock.

Figure 53:
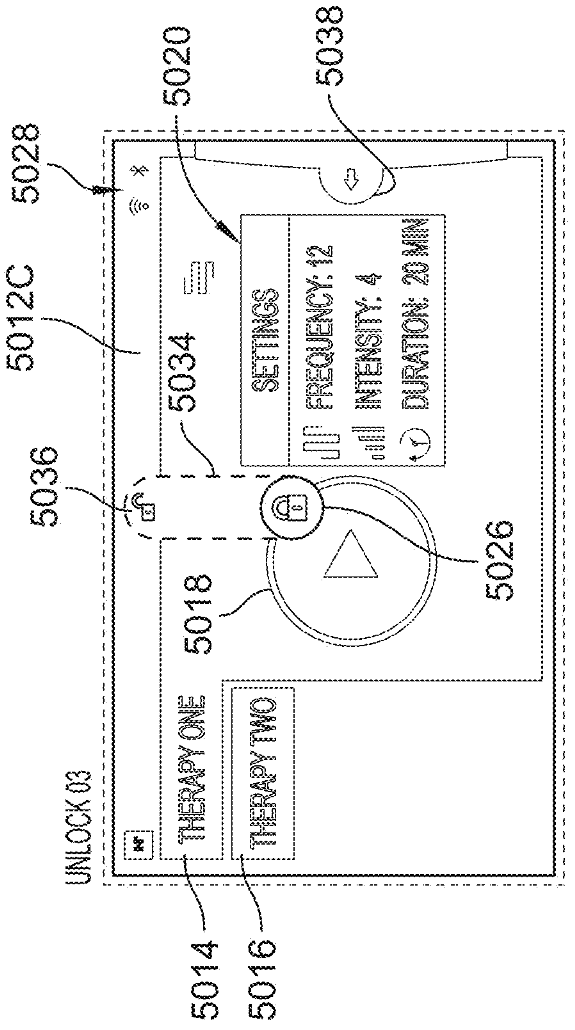

On screen 5012B, the user has begun to slide the system lock button 5026 along the drag track 5034, about midway along the extent revealing an unlock button 5036 beneath the initial position of the system lock button 5026. Referring to FIG. 53, on screen 5012C, the user has dragged the system lock button 5026 to the extent of the drag track 5034 activating unlocking of the GUI 58 for adjustment of HFCWO system parameters. User release of the system lock button 5026 before completion of unlocking allows the system lock button 5026 to spring resiliently back to its initial position returning to screen 5012. Completion of the unlocking proceeds to screen 1B, as discussed in additional detail herein regarding FIG. 56.

Figure 54:
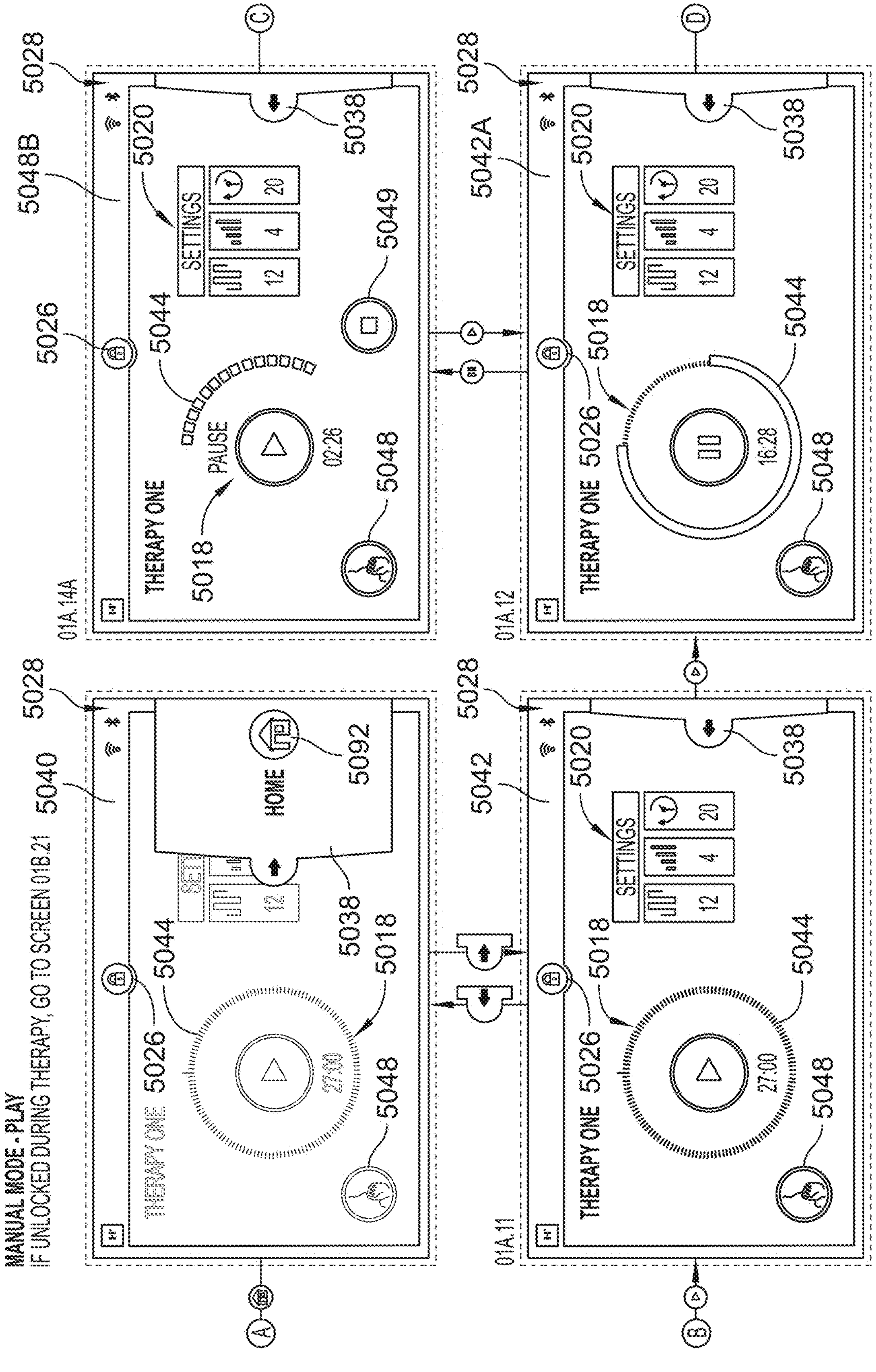

Returning briefly to FIG. 51, on screen 5012, the GUI 58 presents a pull tab 5038. The pull tab 5038 is illustratively arranged at the right hand side of the screen 5012 along an outer edge, an includes a bulbous tab projecting from an elongated base overlapping other background detail of screen 5012 to indicate to the user that additional information is available by engagement with the pull tab 5038. Referring to FIG. 54, on screen 5040, from any screen in which the pull tab 5038 is available, activation of the pull tab 5038 by user engagement with the pull tab 5038, for example, by touching or nearly touching, and dragging the pull tab 5038 (leftward) to an extended position to open the underlying base to reveal additional information. Other buttons/tabs disclosed herein having drag operations operates similarly to button 5026 and tab 5038. In some embodiments, pull tab/button drag actions may be completed by quick tapping of the tab/button. On screen 5040, the pull tab 5038 includes a home button 5092. User activation of the home button 5092 returns to screen 5012 (screen 01A) if the GUI 58 status is locked, or to screen 5066 if the GUI 58 status is unlocked, as discussed in additional detail herein regarding FIG. 56.

Still referring to FIG. 54, the user can close the pull tab 5038 by touching or nearly touching the bulbous end, and dragging the pull tab 5038 (rightward) towards its close position, to proceed to screen 5042 (screen 01A.11). The screen 5042 is a play screen which can be activated from the screen 5012 by activation of the therapy initiation button 5018 (or from any screen from which the therapy initiation button 5018 is available), as indicated by reference flag B to the left of screen 5042 which is similarly indicated in FIG. 51 to the right of screen 5012. Additional reference flags within FIGS. 51-74 indicate operations between images. On screen 5042, the therapy initiation button 5018 is slightly reduced in size and includes a therapy interval indicator 5044 embodied as a circular time indicator.

On screen 5042, a cough pause button 5048 is presented for user activation to enable pausing of therapy to allow the user to cough unimpeded by percussive therapy forces. Referring briefly to FIG. 52, cough pausing can be toggled between on and off states by activating the cough pause button 5048, for example, by touching or nearly touching to reveal a drag track 5047, and dragging the cough pause button 5048 to the opposite end of the drag track 5047. When deactivated, the cough pause button may be darkened in color as indicated by cross-hatching in FIG. 52. Deactivation of the cough pause button 5048 can cause predetermined pauses in the therapy regimes to be skipped, maintaining operation of therapy.

Returning to FIG. 54, user activation of the therapy initiation button 5018 on screen 5042 begins the therapy and proceeds to screen 5042A (screen 01A.12). The therapy interval indicator 5044 of the therapy initiation button 5018 indicates that an initial 27 min period has been tolled to a remaining time of 16 minutes and 28 seconds, as written in script and as indicated by the reduction of an equivalent portion of the circular time indicator to a dashed lined rather than a thick solid bar on screen 5042A. As the therapy interval is presently running, the therapy initiation button 5018 has been changed from a play symbol to a pause symbol (having two vertical bars). Referring to screen 5042B (screen 01A.14A), upon user activation of the pause symbol of the therapy initiation button 5018, by touching or nearly touching, activates pausing of the therapy interval and changes the therapy interval indicator 5044 to a pause timer indicator 5044, presents a stop interval button 5049 for user selection to optional stop the interval period, and returns the pause symbol of the therapy initiation button 5018 to a play symbol.

On screen 5042B, the therapy interval indicator 5044 has been changed to indicate a pause count including a circular timer counting the period of pause. User selection of the play symbol of the therapy initiation button 5018 restarts the therapy interval and returns to screen 5042A. However, if pause continues for an extended period, for example, a total of 10 minutes paused, the screen 5042B proceeds to screen 5050 (screen 01A.14B) in FIG. 55. Upon reaching the exemplary 10 minutes of pause, the GUI 58 presents screen 5052 (screen 01A.15) including an indication 5054 of missed therapy time determined as the remaining therapy time at the point of pausing. The screen 5052 includes a resume button 5056 for user activation to resume the therapy interval and return to screen 5042A, and an exit button 5058 for user activation to terminate the present therapy regime and return to screen 5012.

Figure 55:
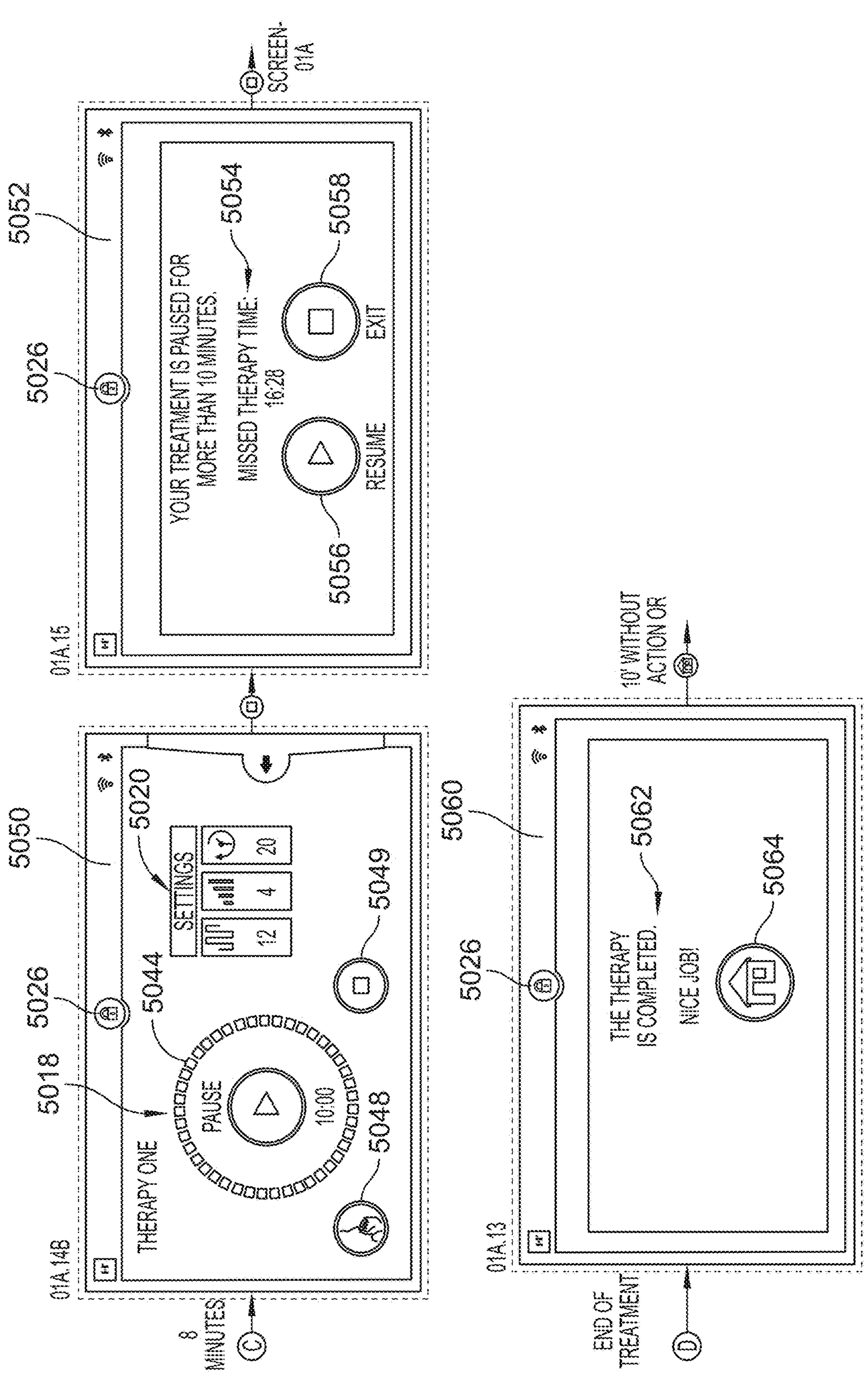

From screen 5042A (on FIG. 54), allowing the therapy interval to complete automatically proceeds to screen 5060 on FIG. 55. A completion message 5062 is provided and a home button 5064 is presented for user activation to return to screen 5012. If no user input is received within a 10 minute timeout window, the GUI 58 automatically returns to screen 5012.

Figure 56:
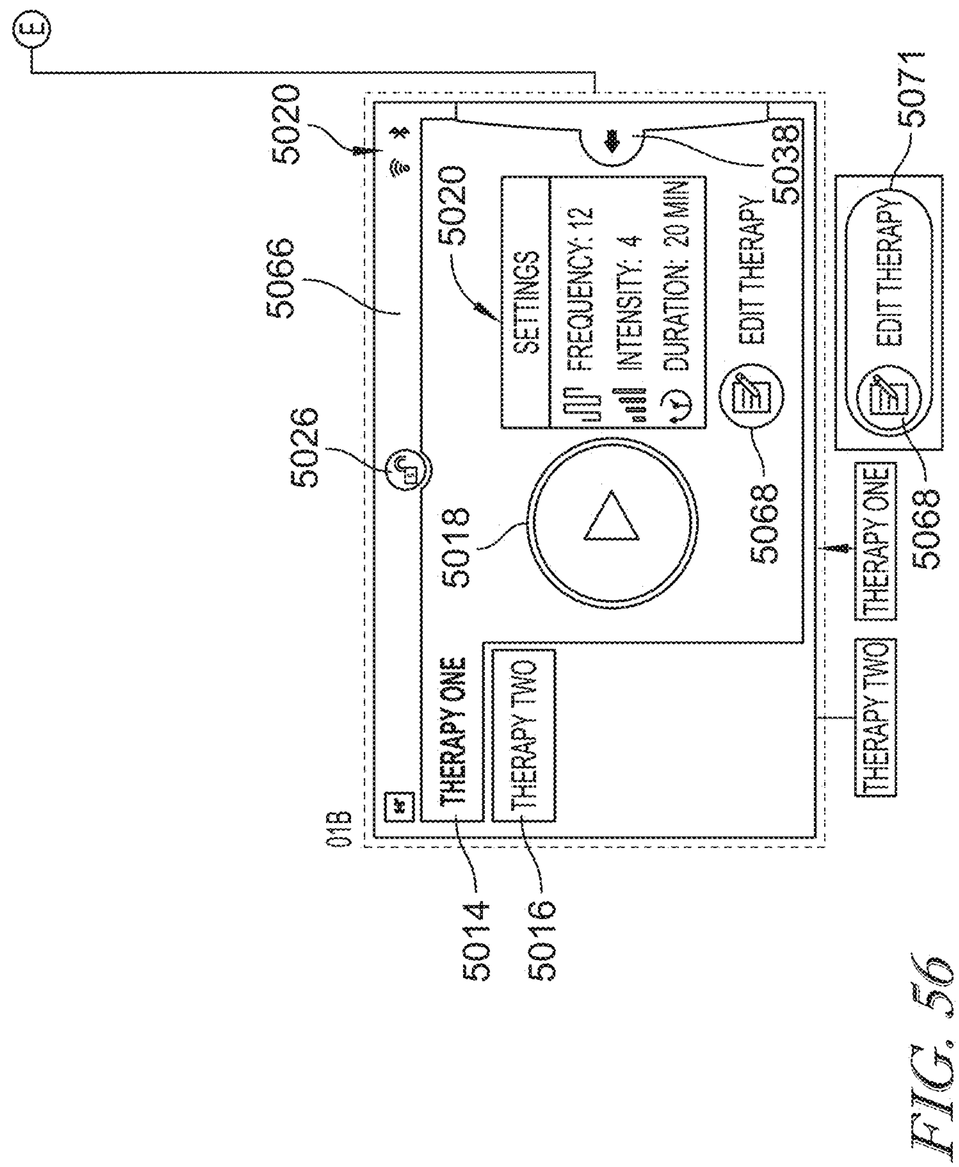

Referring to FIG. 56, an initial unlock screen 5066 (screen 01B) is shown. Unlocking of the GUI 58 for adjustment by activation of the system lock button 5026 has been mentioned above with reference to FIGS. 52-53 and screens 5012A-C which proceeds to screen 5066 and changes the system lock button 5026 from a locked padlock symbol to a unlocked padlock symbol. Unlocking of the GUI 58 presents an edit therapy button 5068 for user activation to allow editing of the therapy regimes. As shown below screen 5066, user selection, for example, by touching or nearly touching, of the edit therapy button 5068 presents a drag track 5071 to invite the user to drag the edit therapy button 5068 to the opposite (rightward) side of the drag track to activate the edit therapy button 5068.

Figure 57:
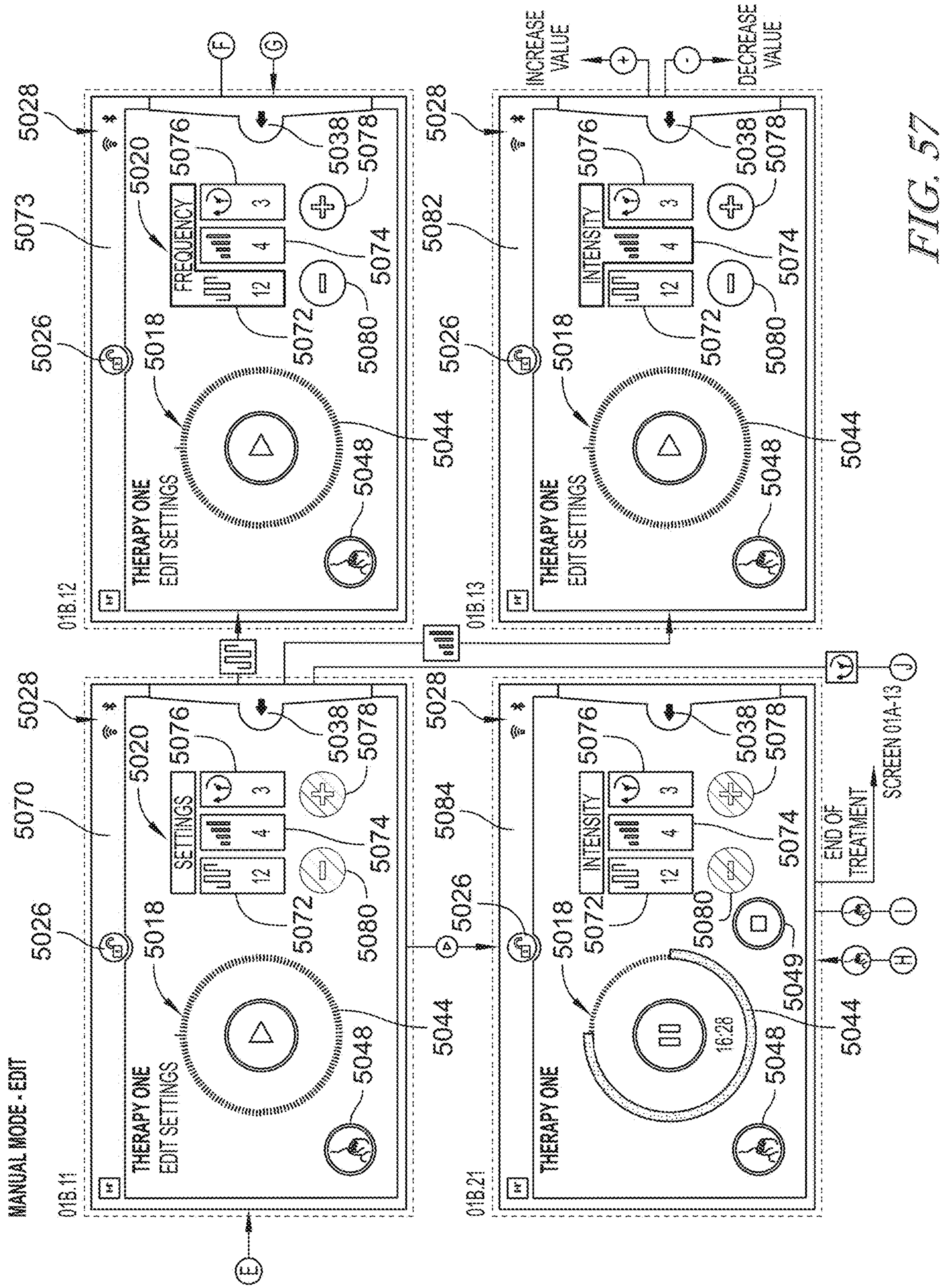
Figure 58:
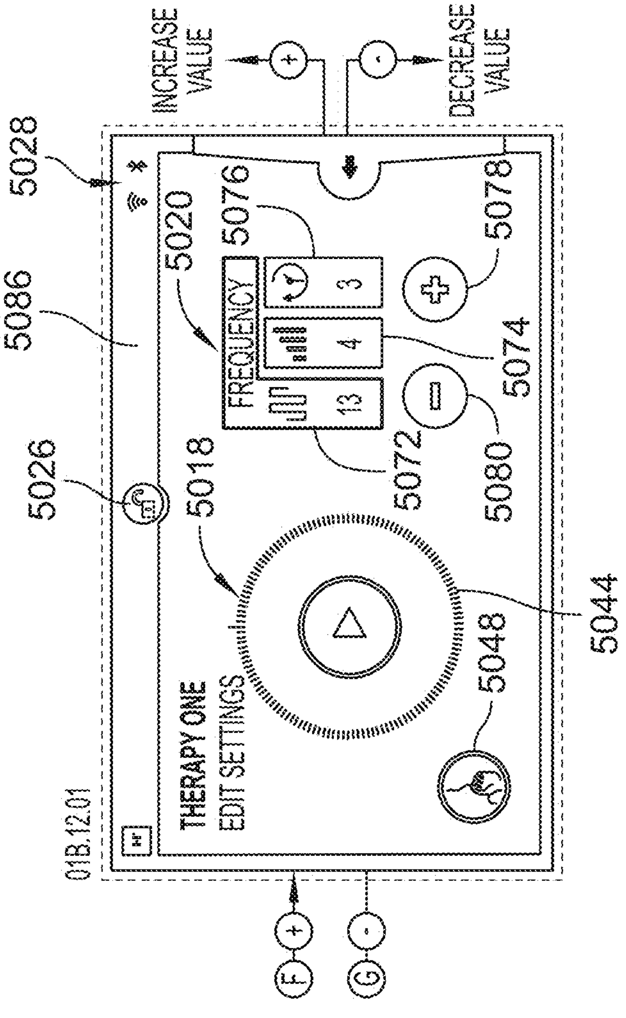

Responsive to user activation of the edit therapy button 5068, the GUI 58 proceeds to screen 5070 as shown in FIG. 57. On screen 5070 (screen 01B.11), the HFCWO settings 5020 for the therapy regime one have been enabled as settings buttons 5072, 5074, 5076 for user activation to allow adjustment of the corresponding parameters. The settings buttons include frequency button 5072 for user activation to adjust the frequency of percussive force, an intensity button 5074 for user activation to adjust the intensity of percussive force, and a duration button 5076 for user activation to adjust the duration of therapy.

On screen 5073 (screen 01B.12) in FIG. 57, the user has activated the frequency button 5072 as indicated by extension of the settings label to connect with the frequency button 5072 and change of the script "settings" to read "frequency". Responsive to activation of the frequency button 5072, the GUI 58 enables the increase button 5078 for user activation to increase the frequency setting and decrease button 5080 for user activation to decrease the frequency setting as suggested in screen 5086 (screen 01B.12.01) in FIG. 58.

On screen 5082 (screen 01B.13) in FIG. 57, the user has activated the intensity button 5074 as indicated by extension of the settings label to connect with the intensity button 5074 and change of the corresponding script to read "intensity". Responsive to activation of the intensity button 5074, the GUI 58 enables the increase button 5078 for user activation to increase the intensity setting and decrease button 5080 for user activation to decrease the intensity setting.

Figure 59:
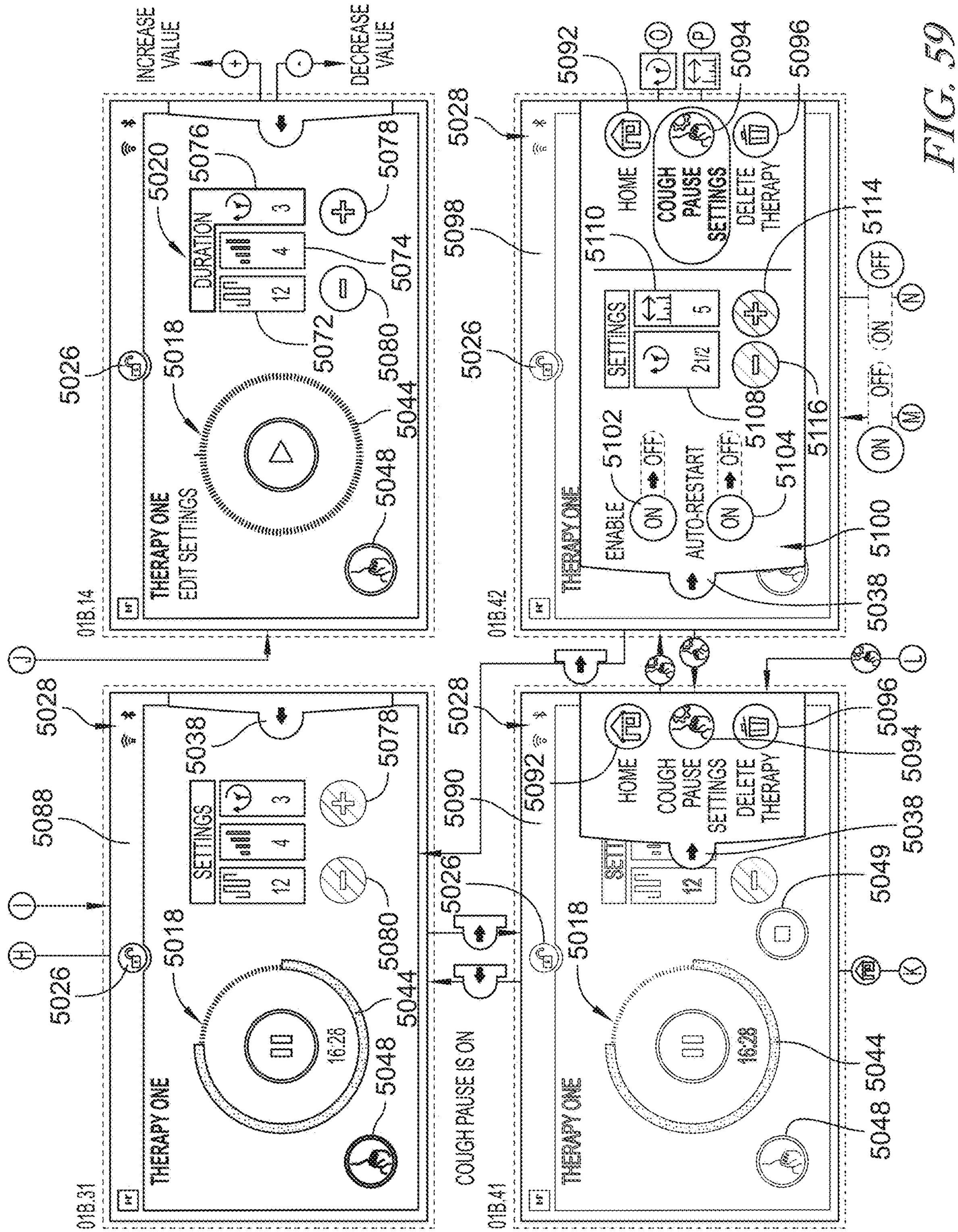

Referring briefly to FIG. 59, on screen 5082 (screen 01B.14), the user has activated the duration button 5076 as indicated by extension of the settings label to connect with the duration button 5076 and change of the corresponding script to read "duration". Responsive to activation of the duration button 5076, the GUI 58 enables the increase button 5078 for user activation to increase the duration setting and decrease button 5080 for user activation to decrease the duration setting.

User activation of the therapy initiation button 5018, for example from any of screens 5070, 5073, 5082, begins the therapy as suggested in screen 5084 (screen 01B.21) on FIG. 57. The therapy interval indicator 5044 of the therapy initiation button 5018 has been tolling to a remaining time of 16 minutes and 28 seconds, as written in script and as indicated by the reduction of an equivalent portion of the circular time indicator to a dashed lined rather than a thick solid bar on screen 5084. As the therapy interval is presently running, the therapy initiation button 5018 has been changed from a play symbol to a pause symbol (having two vertical bars). Responsive to user activation of the therapy initiation button 5018, by touching or nearly touching, a stop interval button 5049 is presented for user selection to stop the interval period, and to return the pause symbol of the therapy initiation button 5018 to a play symbol.

From screen 5084 (screen 01B.21) while the therapy interval is running, the user can activate the cough pause button 5048 to initiate pre-determined periodic pausing of therapy force to the patient to permit unimpeded coughing, for example, to clear and/or dislodge material from airways. Upon activation of the button 5048, the cough pause button 5048 institutes a predetermined periodic automatic pausing of the therapy interval beginning with a pause cycle as suggested in a pause screen 5088 in FIG. 59. From the pause screen 5088, the user can activate the pull tab 5038 for adjustment of cough pause parameters.

As suggested in FIG. 59, activation of the pull tab 5038 presents a number of menu options including a home button 5092 for user activation to return to screen 5066 (screen 1B), a cough pause settings button 5094 for user activation to adjust cough pause parameters, and a delete therapy button 5096 for user activation to delete the current therapy (with confirmation required). User activation of the cough pause settings button 5094 proceeds to screen 5098 (screen 01B.42).

On screen 5098 in FIG. 59, the user has activated the cough pause settings button 5094 as indicated by highlighting of the button image and responsive expansion of the pull tab 5038 to reveal cough pause parameters 5100. The cough pause parameters 5100 include an enable switch 5102 for user activation to enable adjustment of pause duration interval and interim period, and an auto-restart switch 5104 for user activation to toggle on/off auto-restarting of the therapy cycle upon completion of a cough pause cycle in lieu of need for user confirmation before restart of the therapy cycle. The cough parameters 5100 include a duration interval button 5108 for user activation to adjust the predetermined pause duration interval and a cough interim period button 5110 for user activation to adjust the predetermined period of time between cough pauses.

Figure 60:
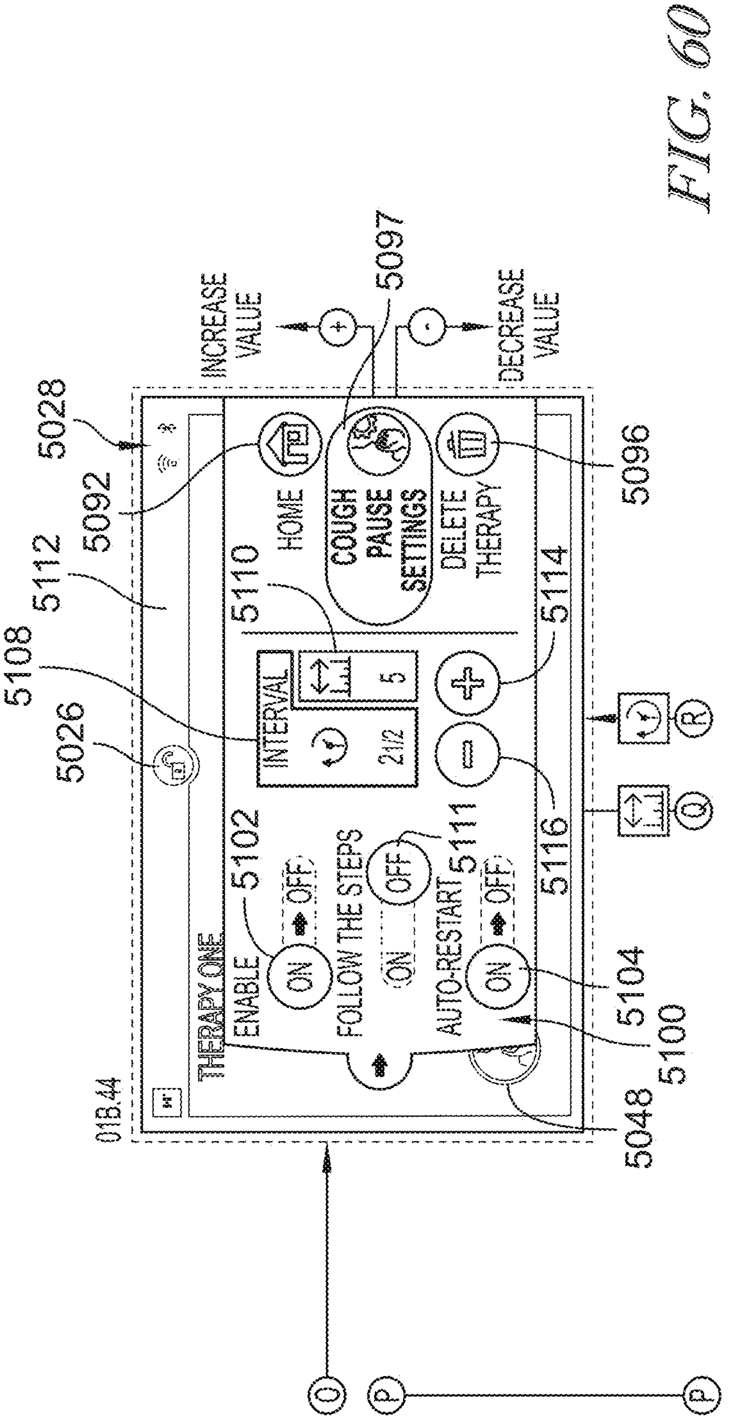

User activation of the cough duration button 5108 proceeds to screen 5112 (screen 01B.44) shown in FIG. 60, as indicated by connection of the overhead script with the button 5108 and change in the script from "settings" to "interval". On screen 5112, increase and decrease buttons 5114, 5116 are enabled for user activation to increase or decrease the predetermined cough duration interval as the length of time for pausing therapy force for each instance of cough pause. A follow-the-steps button 5111 is presented for user activation to toggle on/off control to provide cough pausing between interval steps of the therapy regime.

Figure 62:
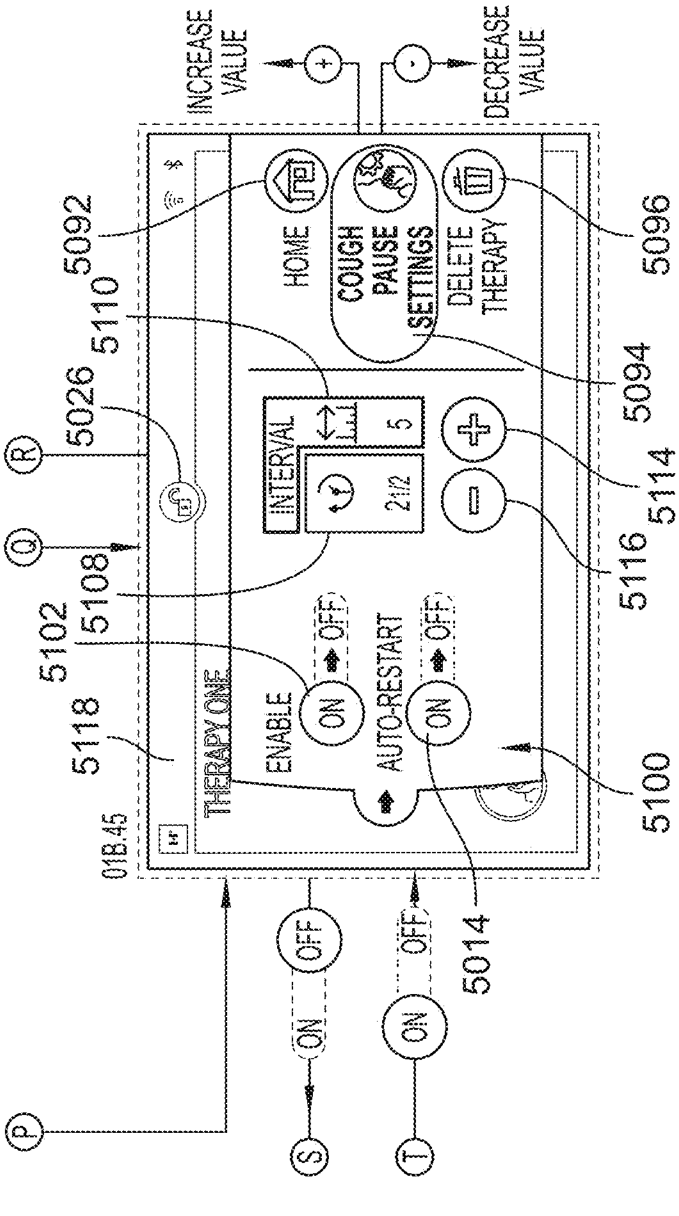

User activation of the cough interim period button 5110 proceeds to screen 5118 (screen 01B.45) on FIG. 62. On screen 5118, increase and decrease buttons 5114, 5116 are enabled for user activation to increase or decrease the predetermined cough interim period as a length of time between instances of cough pause.

Figure 61:
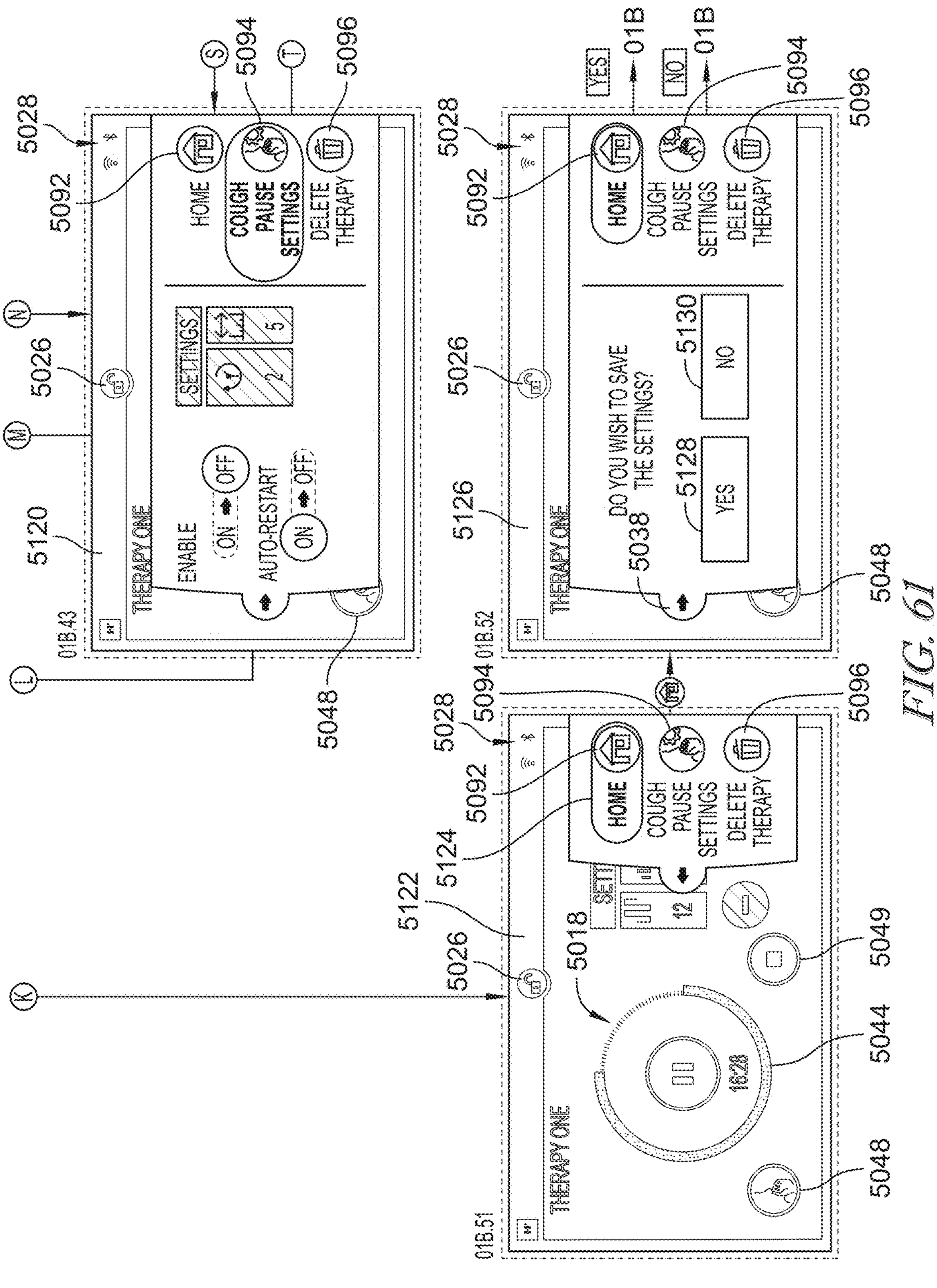

Returning briefly to FIG. 59, on screen 5098 user activation of the enable switch 5102 proceeds to screen 5120 (screen 01B.43) on FIG. 61 to deactivate the duration interval button 5108 and cough interim period button 5110 as indicated by cross-hatching. The increase and decrease buttons 5114, 5116 are removed. User (re)activation of the enable switch 5102 returns to screen 5098 and reactivates the duration interval button 5108 and cough interim period button 5110 for user selection.

User activation of the home button 5092 (for example, in FIG. 59) proceeds to screen 5122 (screen 01B.51) to present a drag track 5124 as shown in FIG. 61. The user can drag the home button 5092 to the opposite end of the drag track 5124 to activate the home button 5092 to proceed to screen 5126 to expand the pull tab 5038 to present a confirmation request. The confirmation request queries the user whether cough pause parameters should be saved and presents yes and no confirmation buttons 5128, 5130. User selection of yes and no confirmation buttons 5128, 5130 returns to screen 1066, with or without saving cough pause parameters, respectively.

User (de) activation of the cough pause settings button 5094, while the pull tab 5038 is expanded, contracts the pull tab 5038 and returns to screen 5090 on FIG. 59. From the expanded pull tab 5038, for example on screen 5098, user activation of the enable switch 5102 proceeds to screen 5120 on FIG. 61. As an example of the variety of screen operations within the present disclosure, screen 5120 can also accessed by activation of the cough pause settings button 5094 while the enable switch 5102 is already activated from screen 5098 on FIG. 59. Accordingly, predetermined cough pausing can be implemented and/or adjusted within a therapy regime.

Figure 63:
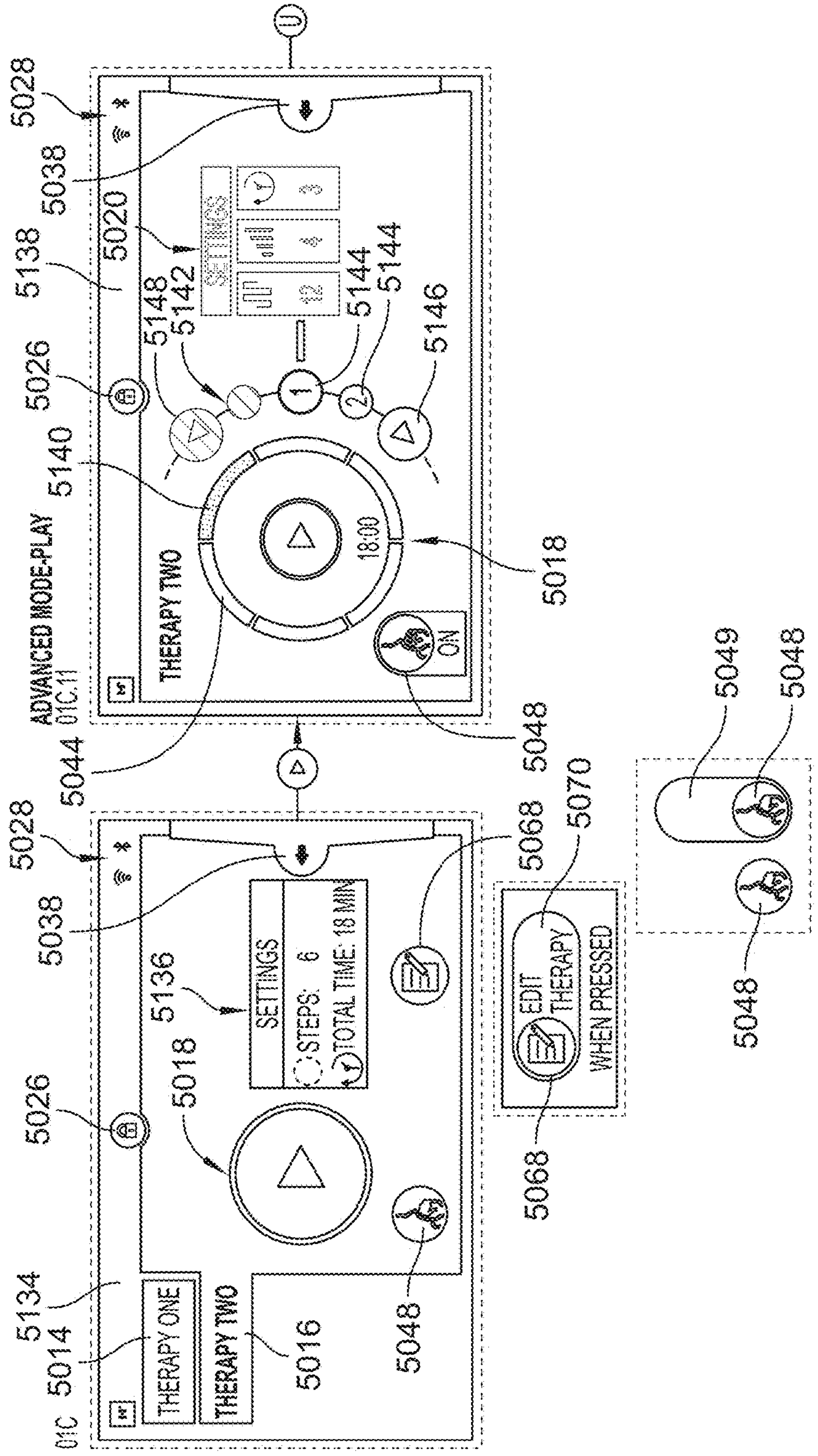

Returning briefly to FIG. 51, user activation of the selection tab 5016 activates the GUI 58 for interface with an additional therapy regime and proceeds to screen 5134 (screen 01C) as shown in FIG. 63. A settings menu 5136 indicates the predetermined therapy parameters of the additional therapy regime, which is embodied as an advanced therapy regime, illustratively including 6 total therapy steps and 18 minutes of total therapy time. User activation of the therapy initiation button 5018, while the additional therapy regime is active, begins percussion therapy according to the additional therapy regime and proceeds to screen 5138 (screen 01C.11).

On screen 5138, in FIG. 63, responsive to user selection of the therapy initiation button 5018, while the additional therapy regime is active, the therapy initiation button 5018 is reduced in size and includes the therapy interval indicator 5044 embodied as a segmented circular time indicator including one segment 5140 for each predetermined step of the additional therapy regime. A therapy regime step indicator 5142 is presented as a semi-circular line having step indicators 5144 and step selection buttons 5146, 5148. The presently selected step is step 1 as the corresponding step 1 indicator 5144 is horizontally level and can be emphasized by boldening, highlighting, coloring and/or any other suitable visual indicator, and the HFCWO settings 5020 corresponding step 1 are displayed (illustratively as frequency 12, intensity 4, and duration 3). User activation of the step selection buttons 5146, 5148 navigates to other steps of the regime.

Figure 64:
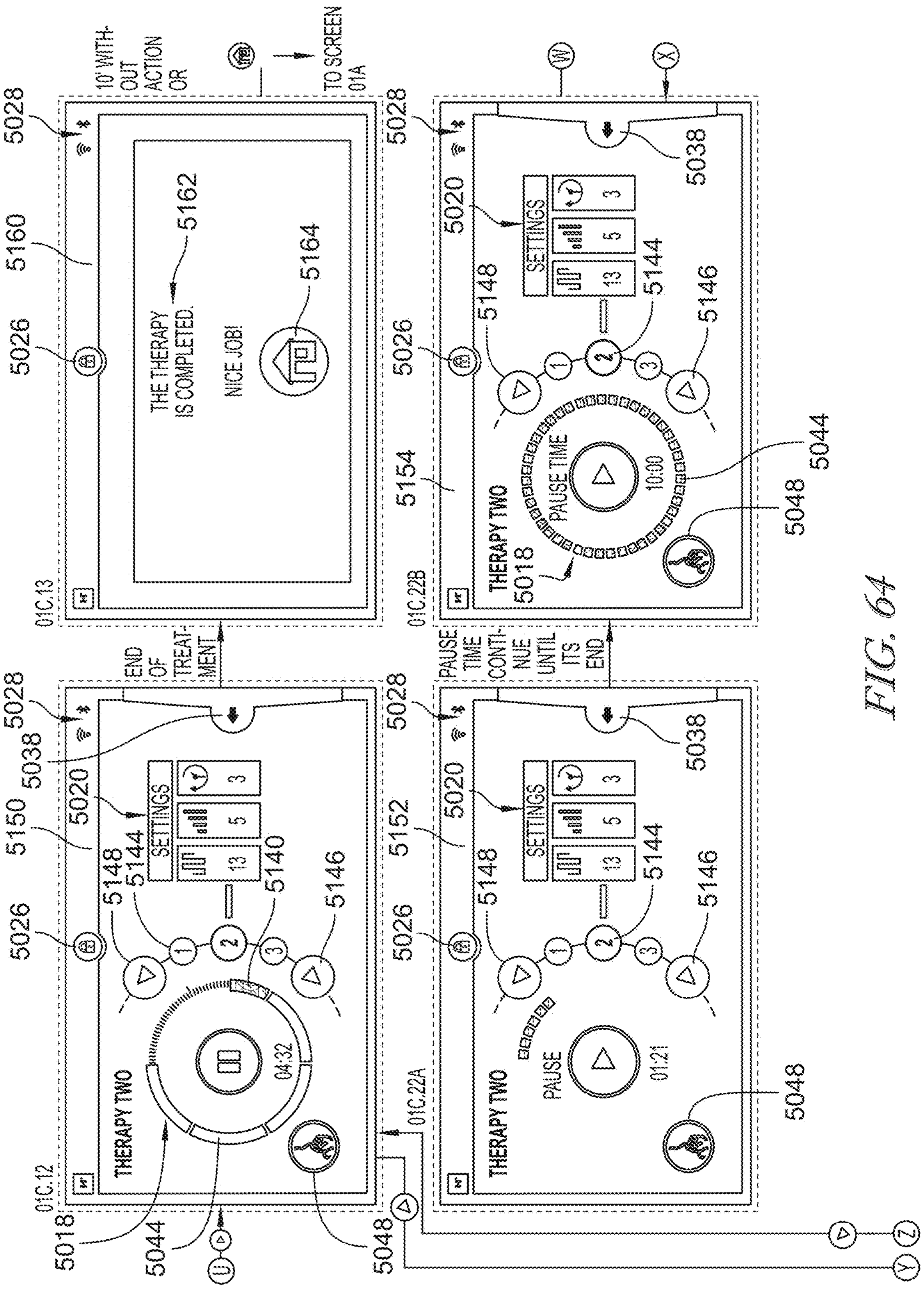

User activation of the therapy initiation button 5018 on screen 5138 activates the presently selected step of the additional therapy regime and proceeds to screen 5150 on FIG. 64. On screen 5150, the therapy initiation button 5018 has changed its play symbol to a pause symbol indicating that the additional therapy regime is occurring and 4 minutes and 32 seconds of total therapy time has occurred.

The second step of the therapy regime is indicated as presently selected by the step 2 indicator 5144 being horizontally level and can be emphasized by boldening, highlighting, coloring, and/or any other suitable visual indicator. The HFCWO settings 5020 corresponding step 2 are displayed (illustratively as frequency 13, intensity 5, and duration 3). The segment 5140 of the therapy interval indicator 5044 corresponding with the second step of the therapy regime is shown having a portion rendered into dashed lines and a portion in thick solid bar, such that the dashed line portion indicates the time passed for the step 2 and the thick solid bar indicates the remaining time in step 2.

Figure 65:
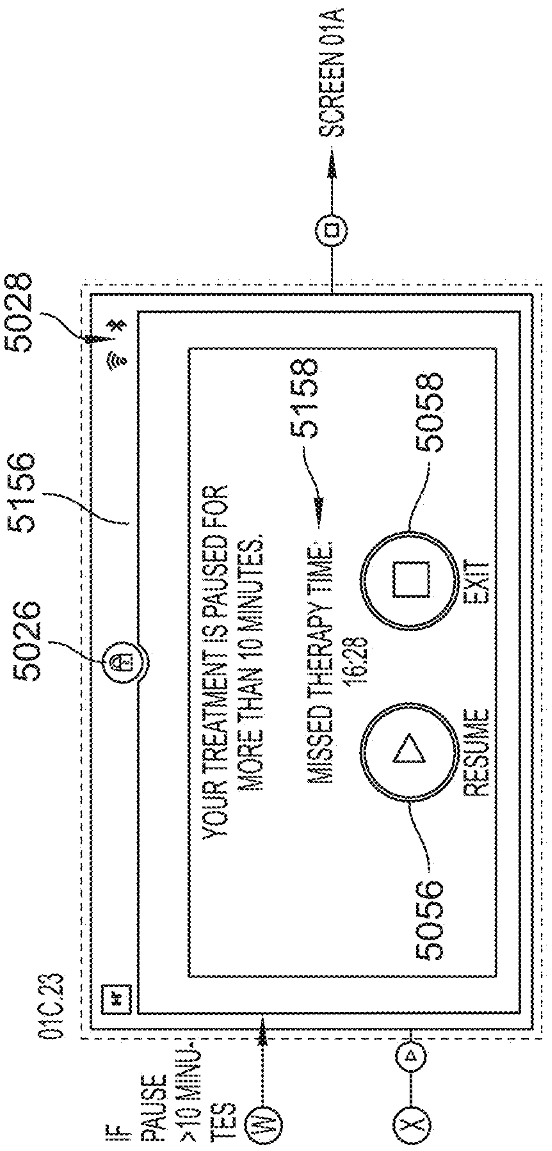
Figure 66:
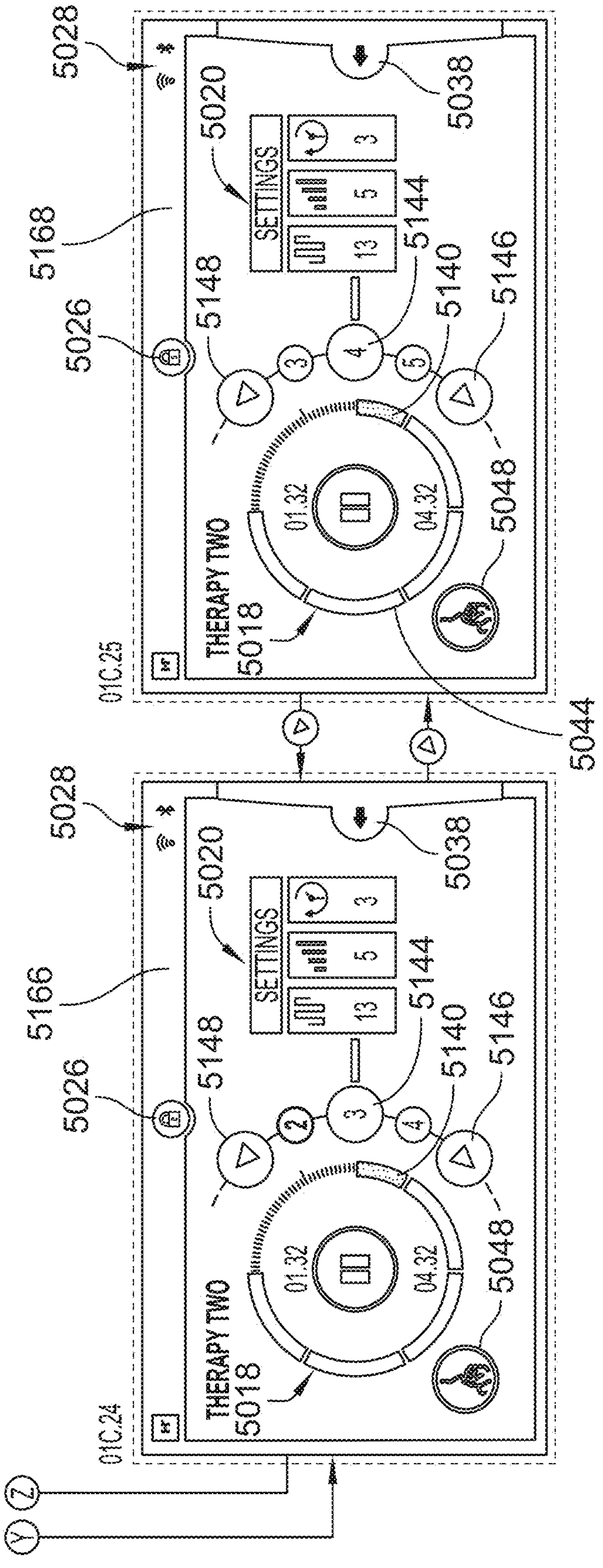

Upon user activation of the pause symbol of the therapy initiation button 5018, the current therapy operation is paused and the GUI 58 proceeds to screen 5152 (screen 01C.22A). The therapy initiation button 5018 is changed to the play symbol, the therapy interval indicator 5044 is changed to count the amount of time spent in pause, and the time script indicates that 1 minute and 21 seconds of pause time has occurred. On screen 5154 (screen 01C.22B), pause continues until the user activates the play symbol to restart therapy, or until expiration of the pause timer (e.g., 10 minutes of pause) which proceeds to screen 5156 (screen 01C.23) as shown in FIG. 65. Upon reaching the exemplary 10 minutes of pause, the GUI 58 presents screen 5156 including an indication 5158 of missed therapy time determined as the remaining therapy time at the point of pausing. The screen 5156 includes a resume button 5056 for user activation to resume the therapy interval and return to screen 5150, and an exit button 5058 for user activation to terminate the present therapy regime and return to screen 5012.

Returning to FIG. 64, upon completion of all steps of the therapy regime, the GUI 58 proceeds to screen 5160 (screen 01C.13). A completion message 5162 is provided and a home button 5164 is presented for user activation to return to screen 5012. If no action is taken within a 10 minute timeout window, the GUI 58 automatically returns to screen 5012.

From screen 5154 on FIG. 64, the user can activate the step selection button 5146 to increase the selected step level. Moving to FIG. 66, on screen 5166 (screen 01C.24), the user has increased the selected step level to level 3 as indicated by the horizontal position of the step 3 indicator 5144. The HFCWO settings 5020 have been changed to indicate the predetermined settings of step 3. However, the step 2 therapy regime is presently occurring with 1 minute and 32 seconds elapsed of the step 2 as indicated in script about the pause symbol of the therapy initiation button 5018, and the step 2 indicator 5144 is maintained with boldening, highlighting, coloring and/or any other suitable visual indicator to indicate its present operation, even while step 3 is selected for display. User selection of the step selection button 5146 to increase the presently selected step to step 4 proceeds to screen 5168 (screen 01C.25) which displays the HFCWO settings 5020 corresponding to step 4. User selection of the step selection button 5148 to decrease the presently selected step proceeds to screen 5166, and then onto screen 5150 in turn according to the number of activations.

Figure 67:
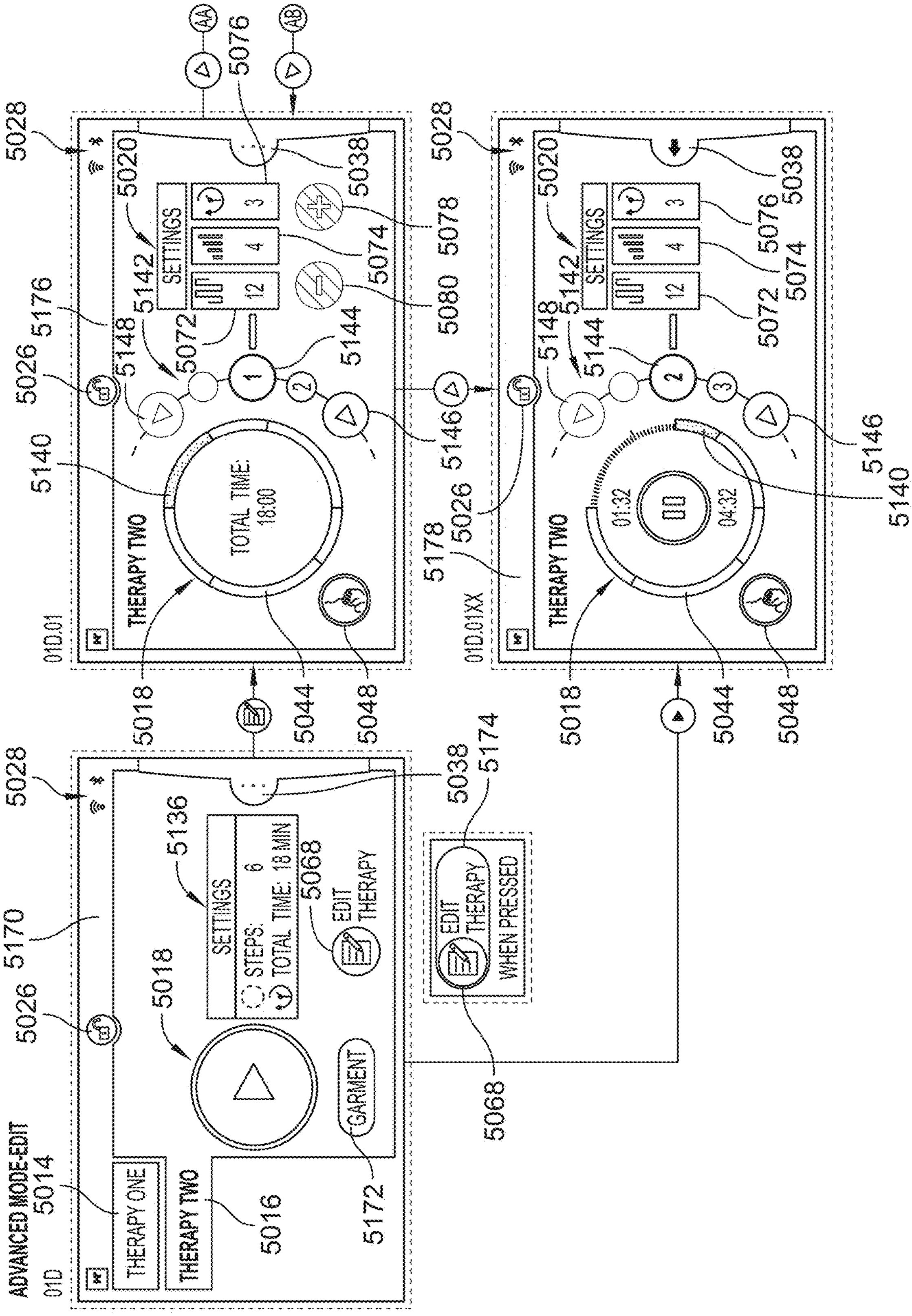

Referring to FIG. 67, while the GUI 58 is unlocked, as indicated by the lock button 5026 displaying an unlocked padlock symbol, user selection of the selection tab 5016 activates the additional therapy regime and proceeds to screen 5170 (screen 01D), and presents the edit therapy button 5068. The settings menu 5136 indicates the present settings of the additional therapy regime illustratively as 6 steps and 18 min. A garment button 5172 is presented for user activation to change the indication of the associated garment, for example, by model number of the garment. User activation of the therapy initiation button 5018 begins the additional therapy regime and proceeds to screen 5178 (screen 01D.01XX). User selection of the edit therapy button 5068 presents a drag track 5174 along which the user can drag the edit therapy button 5068 to the opposite end of the drag track 5174 to activate the edit therapy button 5068 to proceed to screen 5176 (screen 01D.01) to allow adjustment of settings of the additional therapy regime.

Similar to editing therapy settings for the therapy regime one, on screen 5176 (screen 01D.01), the HFCWO settings 5020 for the therapy regime two have been enabled as settings buttons including a frequency button 5072 for user activation to adjust the frequency of percussive force, an intensity button 5074 for user activation to adjust the intensity of percussive force, and a duration button 5076 for user activation to adjust the duration of therapy. However, in the edit mode for the advanced therapy regime (therapy regime 2), the HFCWO settings can be predetermined for each individual step of the therapy regime. For example, the presently selected step 1 is indicated by its horizontal position on the therapy regime step indicator 5142, and its settings include frequency 12, intensity 4, and duration 3. The user can activate the step selection buttons 5146, 5148 to navigate to other steps, such as the increase step button 5146 to advance to screen 5178 (screen 01D.11).

Figure 68:
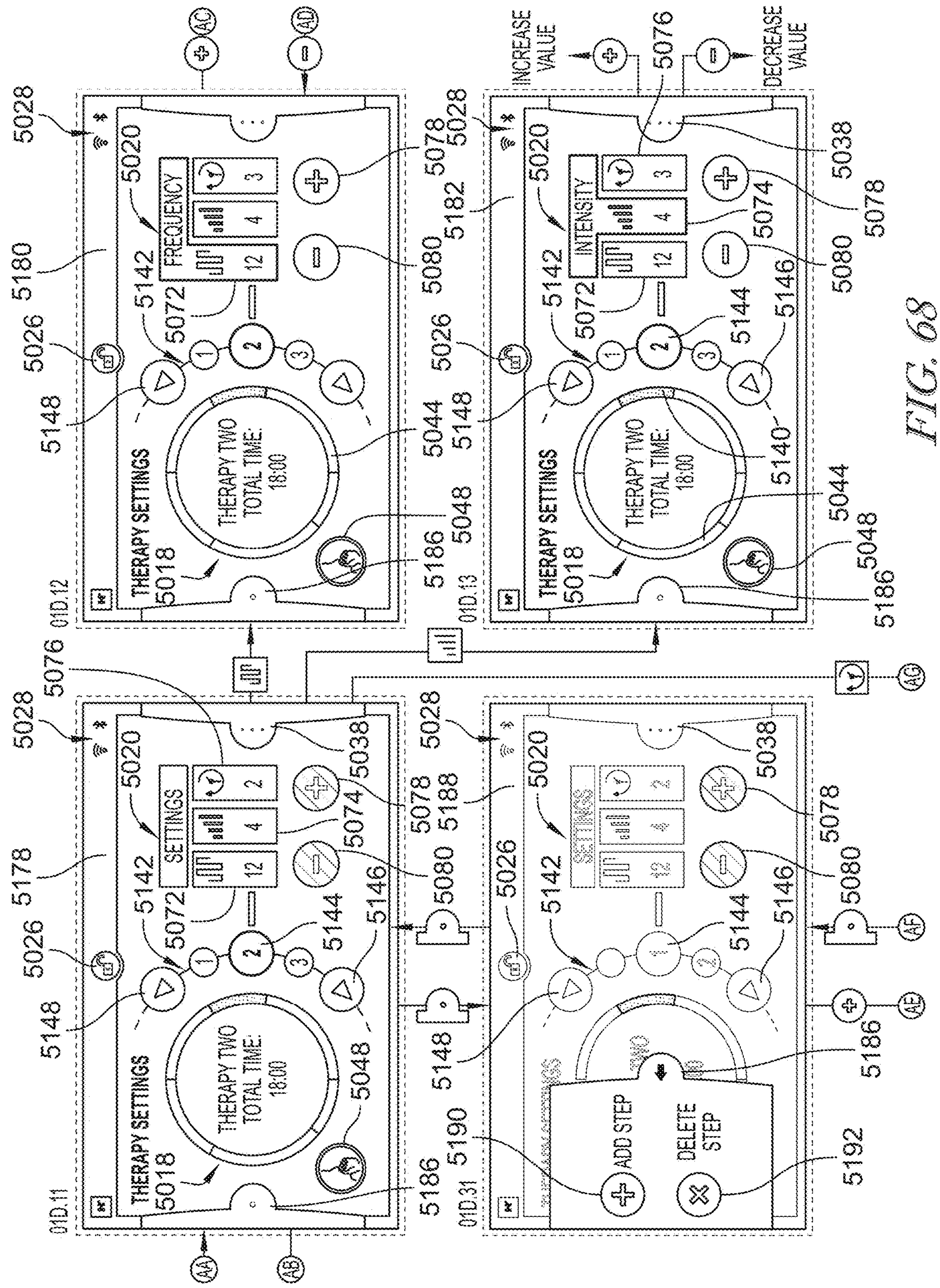
Figure 69:
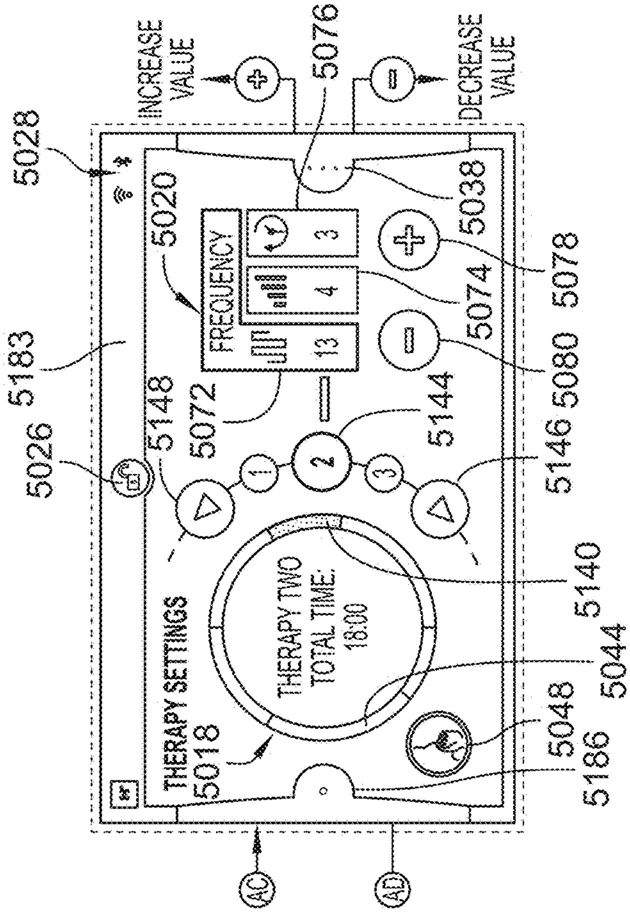

On screen 5178, when the step 2 indicator presently selected, the user can activate any of the settings buttons 5072, 5074, 5076 to adjust the predetermined parameter for the associated setting as suggest in FIG. 68. The user can activate the frequency button 5072, intensity button 5074, or duration button 5076, by contacting or nearly contacting the respective button 5072, 5074, 5076, and proceeding to screens 5180, 5182, 5184 (in FIG. 70) to activate the increase and decrease buttons 5078, 5080 to adjust the selected setting. For example, user activation of the frequency button 5072 and activation of the increase button proceeds to screen 5183 on FIG. 69 and indicates increase in the step 2 frequency setting to 13.

Figure 70:
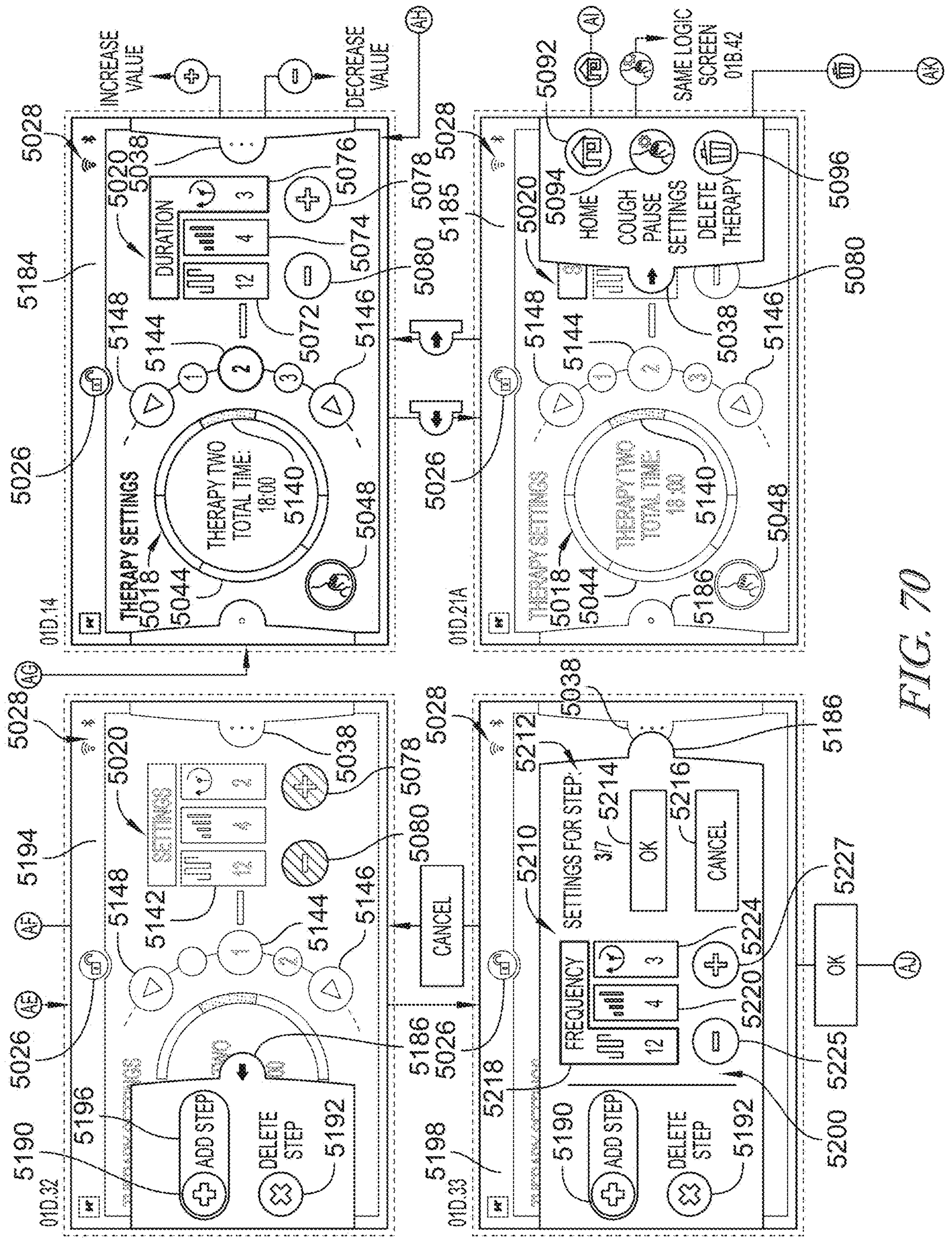
Figure 71:
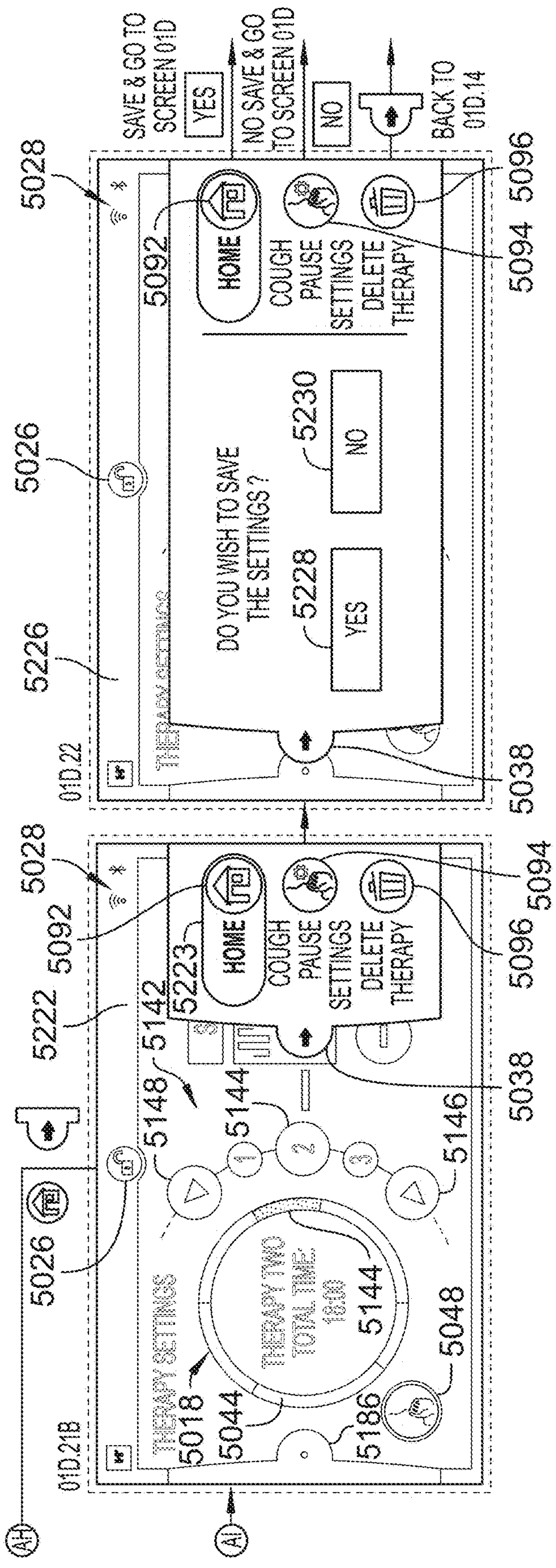
Figure 72:
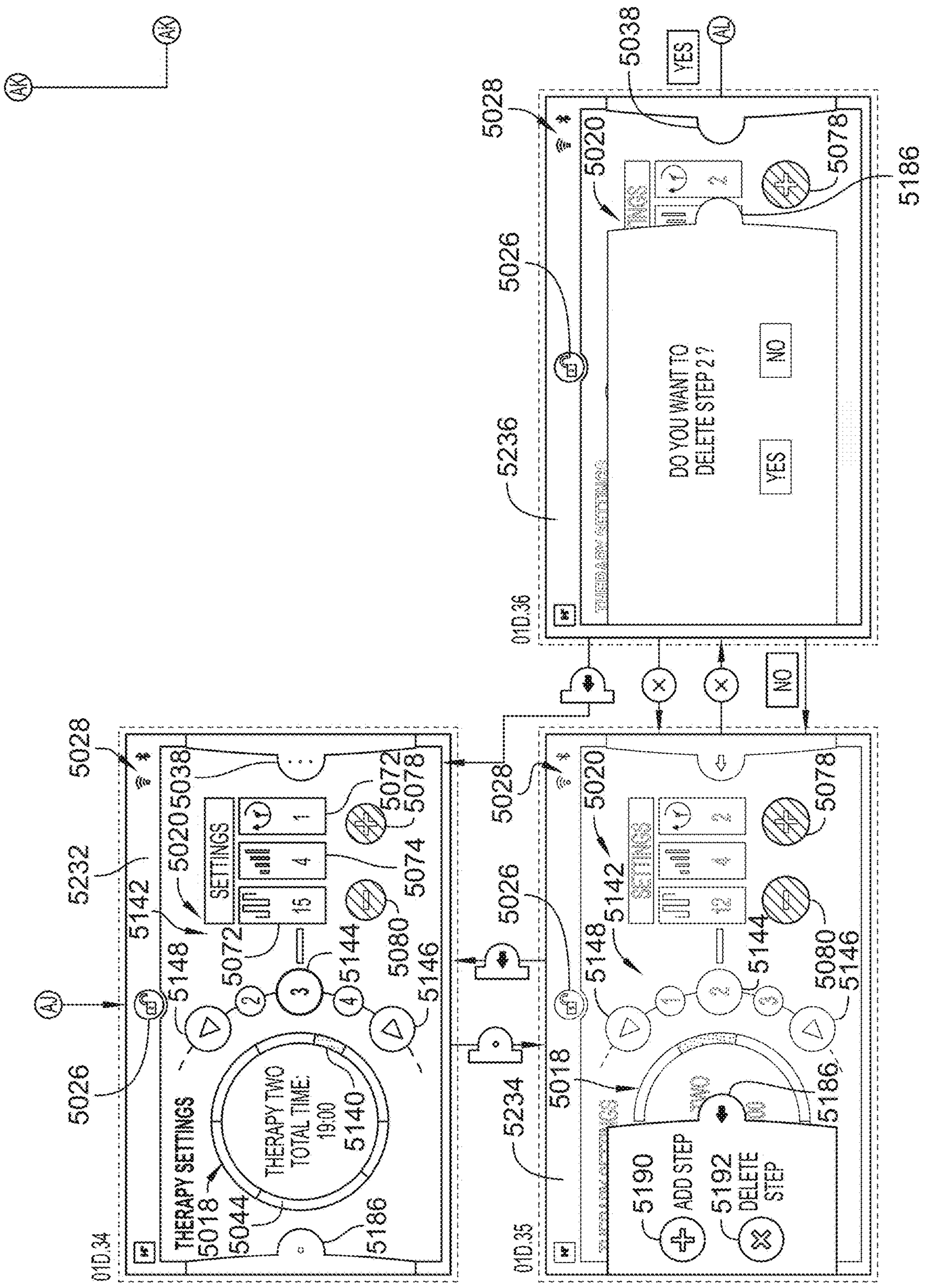

User activation of the pull tab 5038 expands the pull tab 5083 to display the home, cough pause, and delete buttons 5092, 5094, 5096 as shown on screen 5185 (01D.21A) in FIG. 70. User selection of the home button 5092 proceeds to screen 5222 on FIG. 71 and presents a drag track 5223 to allow the user to drag the home button 5092 to activate the home operation to proceed to screen 5226. User activation of the home operation causes expansion of the pull tab 5038 to reveal a save settings prompt, and yes and no buttons 5228, 5230 to save or not save settings, respectively, before returning to screen 5170 (FIG. 67). User (de)activation of the pull tab 5038 returns to screen 5184.

Referring to FIG. 68, the user can activate another pull tab 5186 to expand the pull tab 5186 into the display to reveal additional information as shown on screen 5188 (screen 01D.31). The pull tab 5186 includes an add step button 5190 for user activation to add a new step to the additional therapy regime, and a delete step button 5192 for removing the presently selected step from the additional therapy regime. User selection of the add step button 5190 proceeds to screen 5194 (screen 01D.32) on FIG. 70 and presents a drag track 5196 such that the user can drag the add step button 5190 to the opposite end of the drag track 5196 to activate the add step button 5190 to proceed to screen 5198 (screen 01D.33) further expanding the pull tab 5186 to reveal additional information.

On screen 5198 in FIG. 70, the pull tab 5186 is expanded to reveal new step options 5200 including settings 5210 for user selection of the HFCWO settings for the new step, indicator 5212 indicating the new step to be inserted as step 3, and confirm and cancel buttons 5214, 5216 for user activation to create the new step or cancel the step creation, respectively. User activation of the cancel button 5216 returns to screen 5194. The settings 5210 includes a frequency button 5218, intensity button 5220, and duration button 5224, each for user activation to allow adjustment of the corresponding value setting, presently indicated as frequency 12, intensity 3, and duration 3, by activation of increase and decrease buttons 5225, 5227 while the corresponding setting is selected in similar manner as adjustment of settings for existing steps. User activation of the confirm button 5214 adds the new step with the presently selected settings and proceeds to screen 5232 (screen 01D.34) on FIG. 72 indicating the newly create step 3 having added 1 minute of overall therapy regime duration to the 18 minutes of the previous 6 steps, for a total of 19 minutes and 7 steps as indicated by the therapy interval indicator 5044.

Illustration of user deletion of a step is presented on screen 5234 (01D.35), in which the user has activated the pull tab 5186 to reveal the add step and delete step buttons 5190, 5192. User activation of the delete button 5192 proceeds to screen 5236 which presents the user with a confirmation prompt regarding deletion of the present step and yes and no buttons 5238, 5240 for user activation to confirm or deny deletion respectively. User activation of the no button 5240 returns to screen 5234. User activation of the yes button 5238 confirms deletion of the selected step and proceeds to screen 5242 (01D.37) in FIG. 73.

Figure 73:
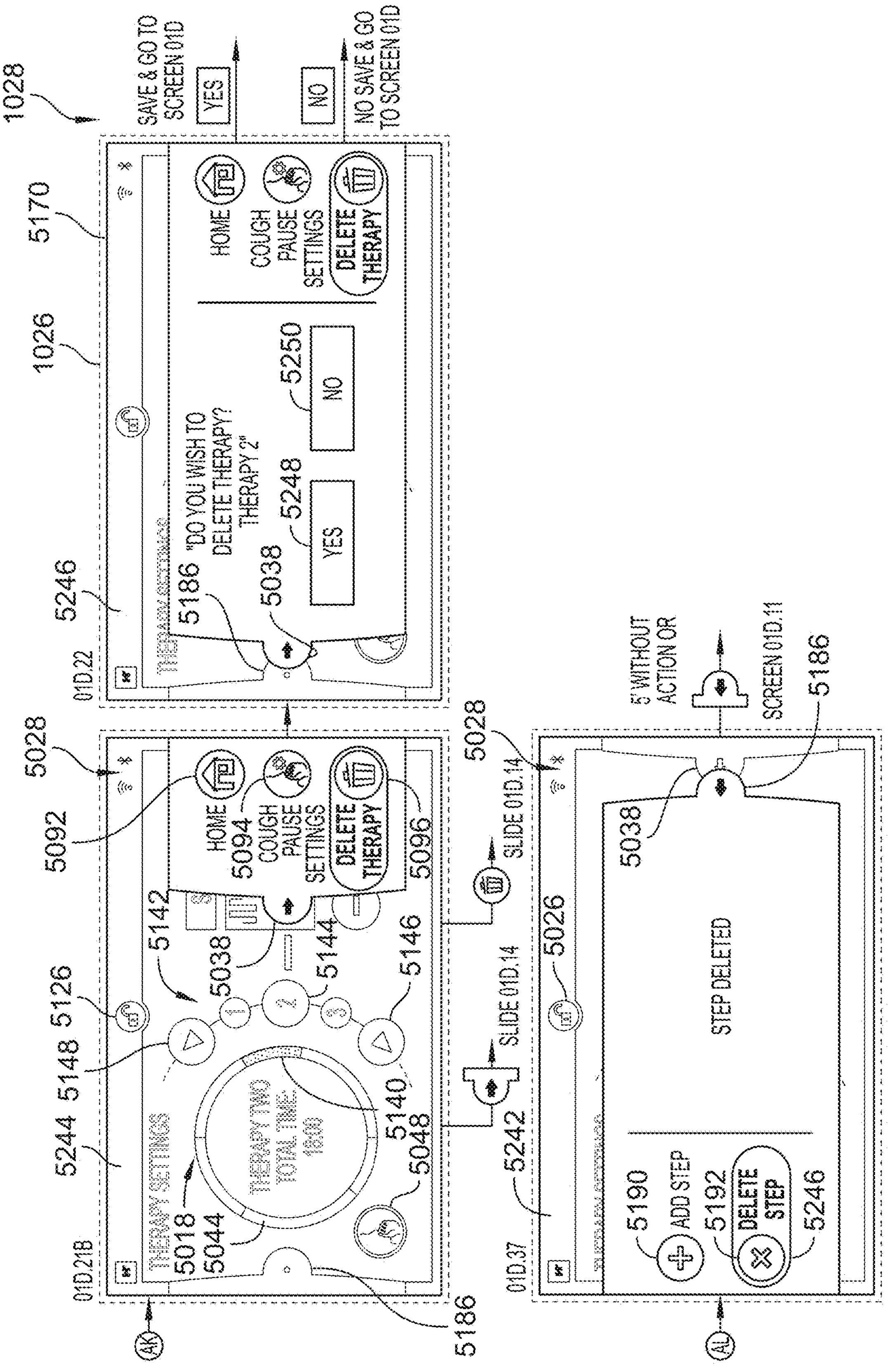

On screen 5242 on FIG. 73, the pull tab 5186 includes a message indicating that the step has been deleted. User (de)activation of the pull tab 5186 or time out (e.g., 5 minutes) causes return to screen 5178 in FIG. 68 with appropriate step adjustments.

Referring briefly to FIG. 70, on screen 5185 the pull tab 5038 has been activated to reveal home, cough pause settings, and delete therapy buttons 5092, 5094, 5096. User selection of the delete therapy button 5096 proceeds to screen 5244 on FIG. 73 and presents a drag track. The user can drag the delete therapy button 5096 to the opposite side of the drag track to activate the delete therapy button 5096 and proceed to screen 5246.

On screen 5246, the pull tab 5038 is further expanded to reveal a confirmation script to the user regarding deletion of the therapy and an indication of the selected therapy for deletion, illustratively Therapy Two (2). Yes and no buttons 5248, 5250 are presented for user activation to confirm or deny deletion of the therapy regime, respectively, each returning to screen 5170 (FIG. 67) while saving the setting and with or without deletion of the therapy regime.

Figure 74:
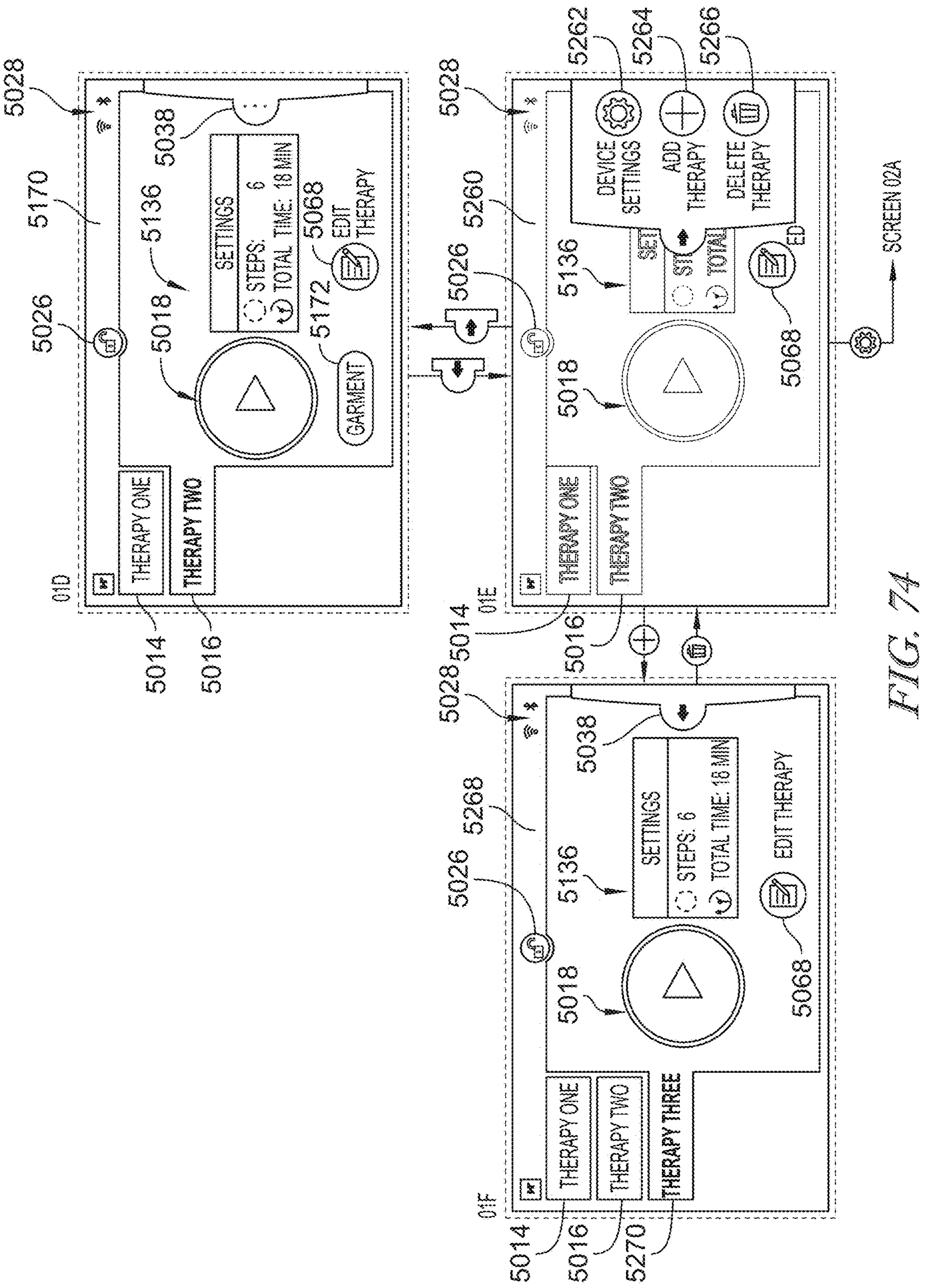

Referring to FIG. 74, screen 5170 (screen 01D) is shown again for ease of description. User activation of the pull tab 5038, by contacting or nearly contacting the pull tab 5038, expands the pull tab and proceeds to screen 5260 (screen 01E). The expanded pull tab 5038 presents a device settings button 5262, an add therapy button 5264, and a delete therapy button 5266. User activation of the add therapy button 5264 proceeds to screen 5268 (screen 01F).

On screen 5268, responsive to user activation of the add therapy button 5264, an additional therapy regime has been added as indicated by the additional selection tab 5270, labeled "Therapy Three". The newly create Therapy Three regime has predetermined settings equal to the therapy regime that was presently selected when the user activated the add therapy button 5264, illustratively Therapy Two having 6 steps and 18 total min, as presented in the settings menu 5136. User activation of the pull tab 5038 and activation of the delete therapy button 5266 while the Therapy Three selection tab 5270 is selected can delete the Therapy Three regime and return to screen 5260.

Figure 75:
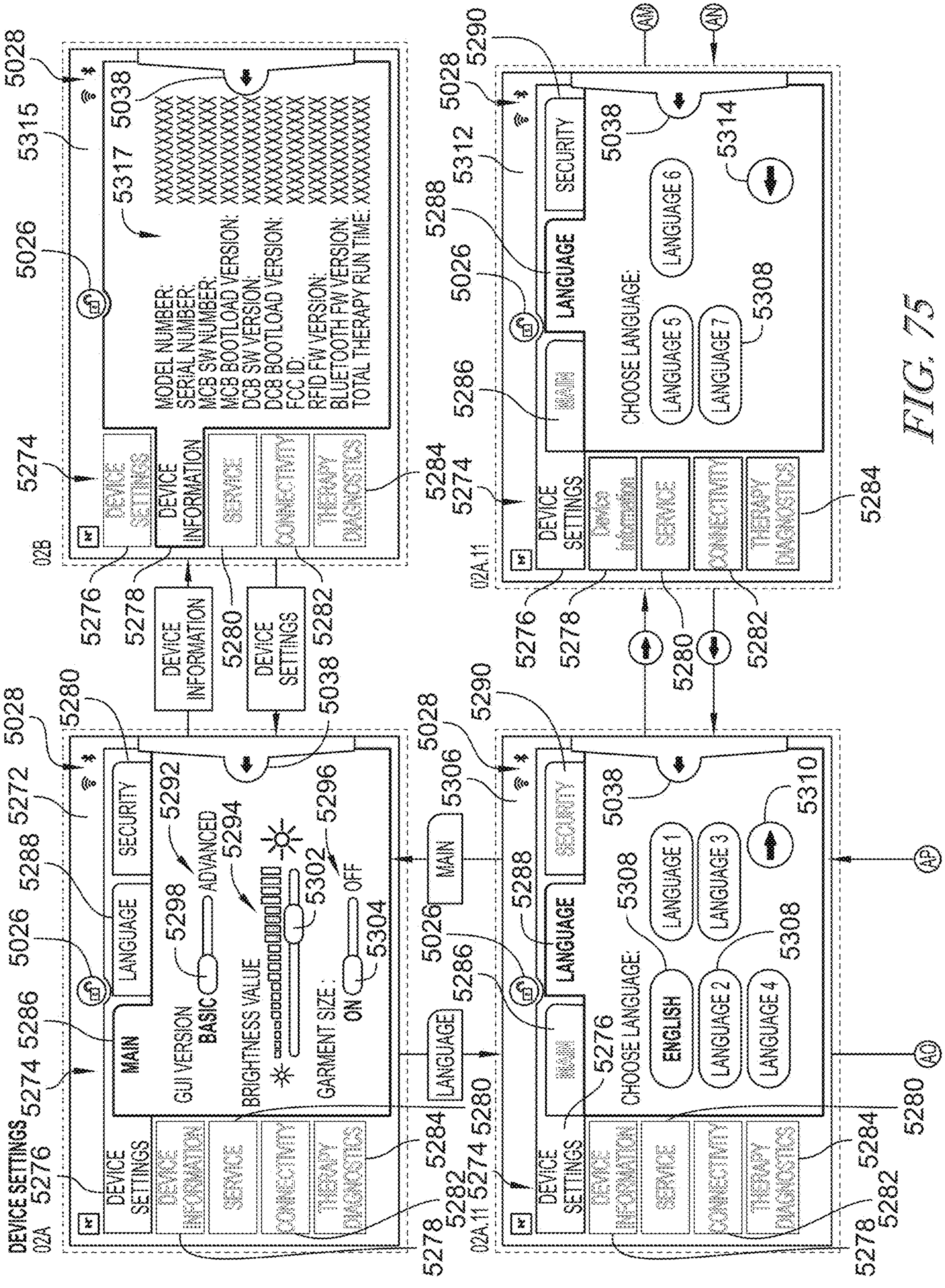

User activation of the device settings button 5262 proceeds to screen 5272 (screen 02A) as shown on FIG. 75. On screen 5272, the GUI 58 presents a device settings platform 5274. The device settings platform includes a number of selection tabs 5276, 5278, 5280, 5282, 5284 available for user activation. A device settings selection tab 5276 is presently selected as indicated by continuous connection of the tab 5276 with the additional information to the right of the selection tabs 5276 and also by the tab 5276 be boldened, highlighted, colored and/or having any other suitable visual indicator distinguished from the other tabs. Activation of the device settings selection tab 5276 presents sub-tabs including main sub-tab 5286, language sub-tab 5288, and security sub-tab 5290.

On screen 5272, the main sub-tab 5286 is presently selected revealing various options including a GUI version option 5292, a brightness option 5294, and a garment size option 5296. The GUI version option 5292 includes a toggle switch 5298 for user activation to toggle between basic and advanced versions of the graphic user interface. The brightness option 5294 includes a slider bar 5302, presently positioned at a fourth level of brightness, for user positioning along the linear extent of the brightness option 5294 to set the brightness of the GUI 58. The garment size option 5296 includes a toggle switch 5304 for user activation to toggle the consideration of the size of the therapy garment between on and off in applying various HFCWO operational settings, for example, between children's and adult size garments, there may be variation in the pressure levels and the HFCWO can more precisely account for the size of the garment in deploying percussive force when the garment size option 5296 is on.

Figure 76:
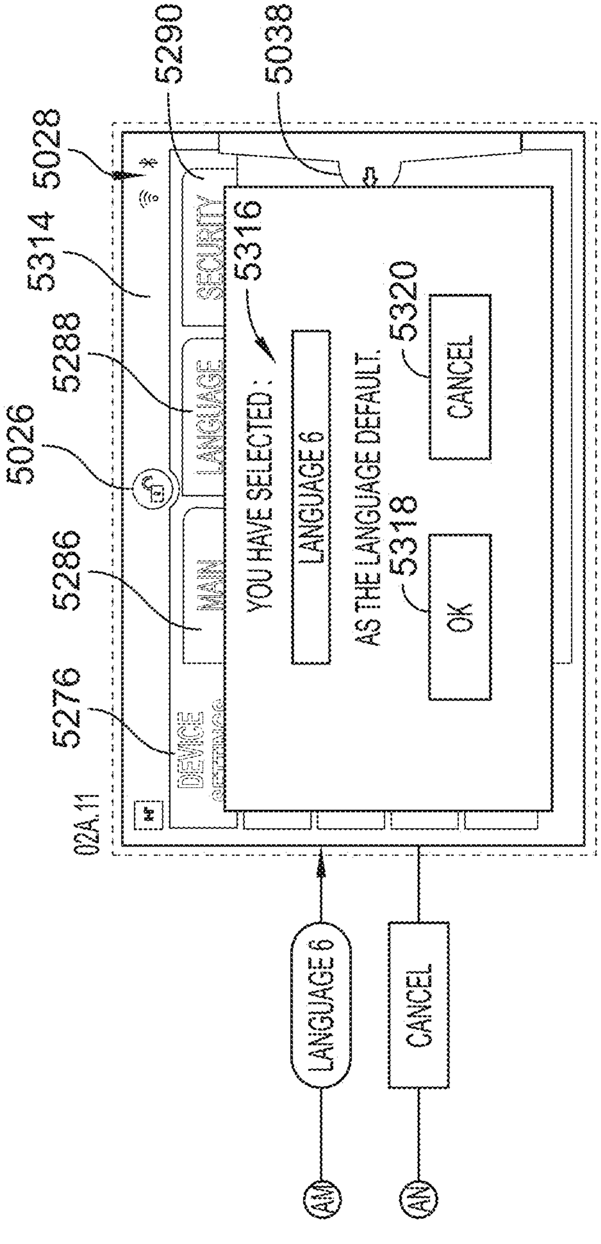

User activation of the language sub-tab 5284 proceeds to screen 5306 and calls forward the language options. The language options include buttons 5308 for various languages. The button 5308 corresponding with English is presently selected, and the user can activate another language (not presently populated) as the default language by contacting or nearly contacting the corresponding button 5308. A next button 5310 is presented for user activation to pan to an additional page of language buttons 5308 on screen 5312 (screen 02A.11) which changes the next button 5310 to a return button 5314 for user activation to pan back to screen 5306. User activation of a language button proceeds to screen 5312 (screen 02A.11) on FIG. 76 which presents a confirmation window and indication 5316 of the newly selected default language. Ok and cancel buttons 5318, 5320 are presented for user activation to accept or deny change in the default language, respectively.

Returning briefly to FIG. 75, user activation of the device information selection tab 5278 proceeds to screen 5315 (screen 02B) to present device information 5317. The device information illustratively includes device model number, serial number, control board information (e.g., control board software number, bootload version), FCC information, Bluetooth version, and total therapy run time.

Figure 77:
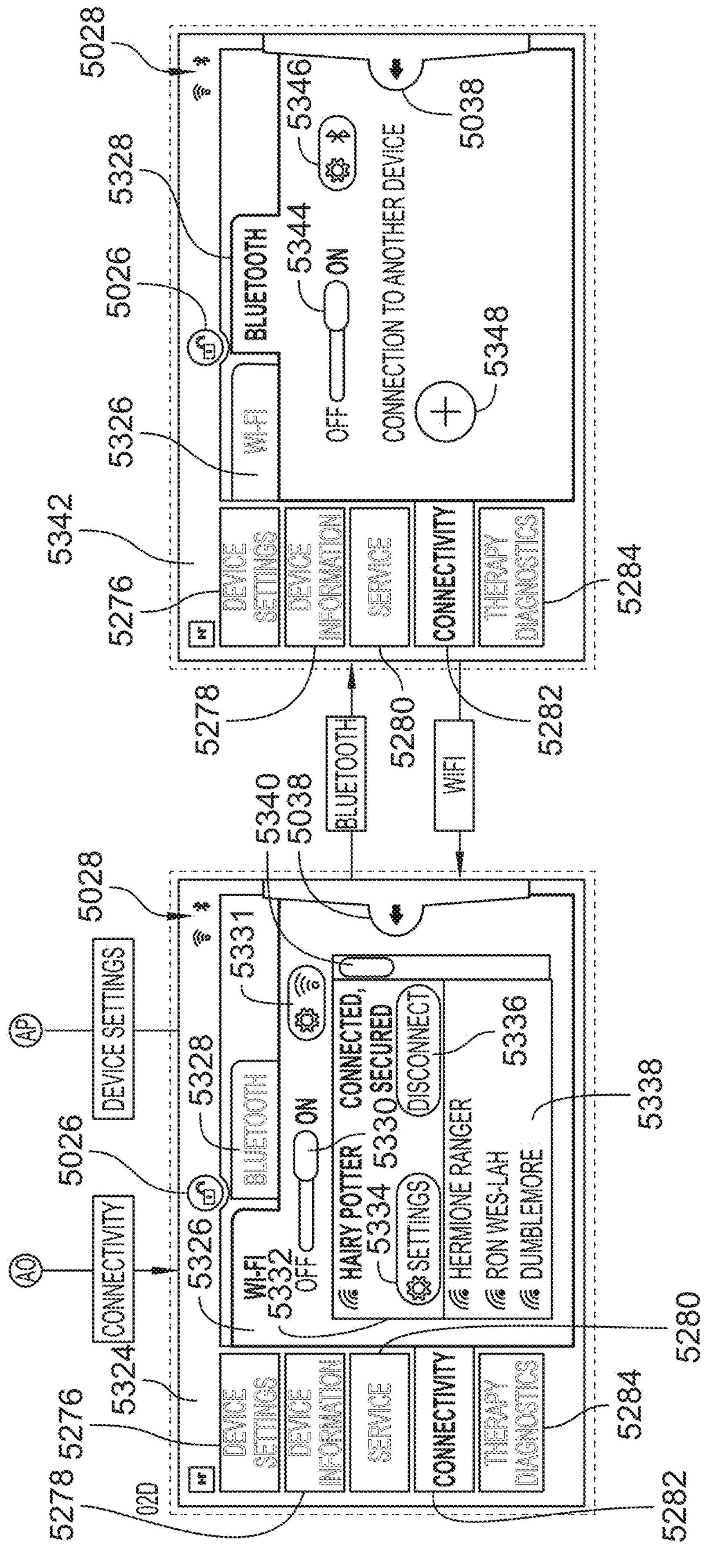

User activation of the connectivity selection tab 5282 proceeds to screen 5324 (screen 02D) and calls forward the connectivity options as suggested in FIG. 77. The connectivity options include a wifi sub-tab 5326 and bluetooth sub-tab 5328. On screen 5324, the wifi sub-tab 5326 is presently selected, calling forward wifi options including a wifi toggle switch 5330 for user activation to toggle on/off wifi connection, a wifi setting button 5331 for user activation to adjust wifi settings, and a wifi network list 5332.

The wifi network list 5332 includes indication of the currently connected wifi network, a network settings button 5334 for user activation to adjust various settings of the currently network connection, a disconnect button 5336 for terminating the current network connection, a list of other available wifi networks 5338 for user activation to connect to the corresponding wifi network, and a scroll bar 5340 for user operation to scroll through the list of other available wifi networks 5338.

User activation of the bluetooth sub-tab 5328 proceeds to screen 5342 and calls forward the bluetooth options. The bluetooth options include a bluetooth toggle switch 5344 for user activation to toggle the bluetooth connection on and off, a bluetooth settings button 5346 for user activation to adjust various settings of the bluetooth connection, and an add connection button 5348 for user activation to create a new bluetooth connection.

Figure 78:
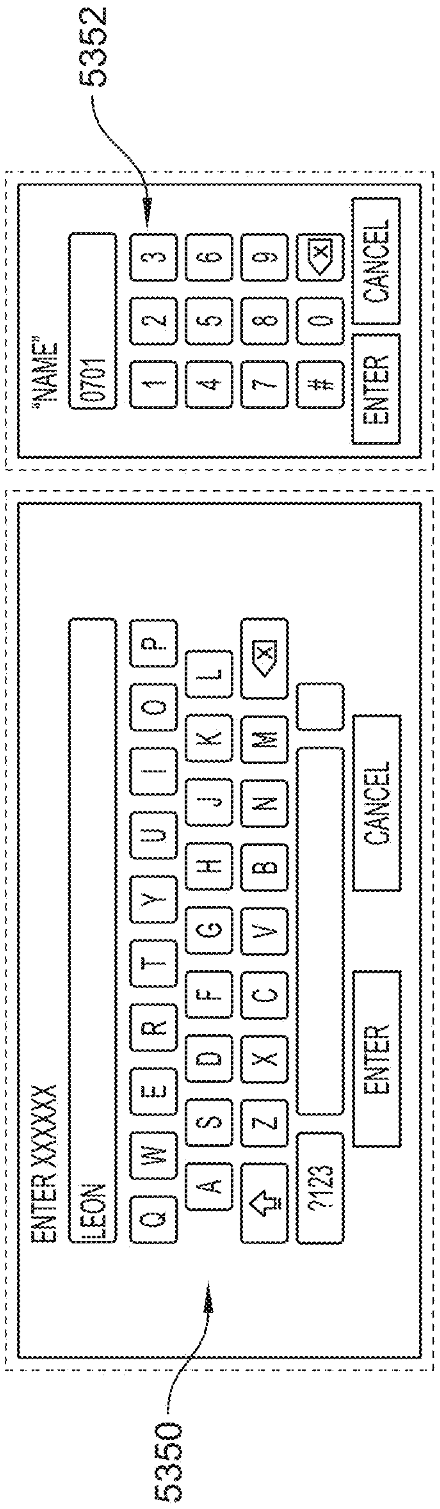

In FIG. 78, the GUI 58 can present a qwerty keyboard 5350 and/or numeral keypad 5352 for user activation to enter text and numbers with ease. The keyboard and/or keypad 5350, 5352 may be overlaid onto the present screen responsive to user activation of a relevant text/numeric entry field.

Within the present disclosure, HFCWO technology can provide for dislodging mucus from bronchial walls. The working principle in dislodging mucus may include imposes air oscillations in lungs results in reduction of mucus viscosity and the extra air-flow shearing as the main mechanism. There can also be an airflow bias that pushes mucus flow from peripheral towards central airways during HFCWO. An addition of chest wall compression during exhalation, can result in higher peak expiratory flow and greater difference between mean expiratory flow and mean inspiratory flow, i.e. better effectiveness of therapy. During inhalation, HFCWO can be less effective and may give rise to poor user's comfort. Pressure on chest can be reduced during user inspiration. By providing a feedback mechanism, e.g., user's breathing pattern, to control the air pump generator in order to vary the pressure output during inhalation and exhalation phase, improved HFCWO can be provided.

To acquire user's breathing pattern at patient's comfort and/or ease of use, Micro-Electro Mechanical Systems can provide miniaturized, nine-axis motion tracking devices, combining three-axis accelerometers, three-axis gyroscopes, and/or three-axis magnetometers. Such devices can be combined in the same chip together with a digital processor to process complex sensor fusion algorithms that provide three-dimensional motion reconstruction. Accordingly, breathing indications can be captured by movement. Bluetooth can be applied for wireless data transmission and/or feedback the information into mobile devices such as a mobile phone. Hence a small portable device (motion sensor) can be mounted on/in the vest for breathing data capture. Information can be communicated to an air pump force generator to vary the pressure output for patient's comfort. One or more motion sensors can be waterproofed, if necessary.

Additionally, respiratory rate has also been shown to be able to predict adverse clinical events, such as cardiac arrest. Breathing pattern data/motion can also be collected for assessment of lung's ventilatory function (e.g., respiratory rate and tidal volume), a subset indicator of lung's health.

Traditional systems may lack feedback capabilities and/or may lack consideration of user's breathing pattern to control pressure output, for user's comfort. Additionally breath information can be used for pre-diagnosis of user's lung health or potential danger. Accordingly, software/firmware implemented conversion of motion-sensor reading into breathing pattern and adapting/match pressure output from air pulse generator to user's baseline breathing pattern, can enhance HFCWO therapy.

Although certain illustrative embodiments have been described in detail above, variations and modifications exist within the scope and spirit of this disclosure as described and as defined in the following claims.

We claim:

1. A chest wall oscillation therapy system, comprising:

a chest engagement device for communicating impact force to a patient's chest;

a force generator arranged to generate successive force of impact as a therapy regime for the patient, the force generator arranged in communication with the chest engagement device to communicate force of impact from the force generator into impact force to the patient's chest to encourage airway clearance, and a therapy control system comprising at least one sensor arranged to detect an indication of a breathing pattern of the patient, wherein the therapy control system is arranged to dynamically configure the therapy regime of the force generator according to data from the at least one sensor including, for each cycle of inhalation and exhalation of the patient, to decrease an oscillation rate of the impact force while the patient inhales, and then, in response to cessation of inhalation, to increase the oscillation rate of the impact force while the patient exhales, wherein active therapy of the therapy regime continues for at least a portion of time while the patient inhales to communicate impact force during inhalation, wherein the therapy control system configures the therapy force generator to have an inhalation setting for the oscillation rate during patient inhalation, the inhalation setting being less than an exhalation setting for the oscillation rate during patient exhalation such that the patient experiences lesser time of force of impact during patient inhalation than during patient exhalation.

2. The chest wall oscillation therapy system of claim 1, wherein the at least one sensor comprises at least one micro electromechanical sensors.

3. The chest wall oscillation therapy system of claim 2, wherein the at least one sensor is mounted to the chest engagement device to detect motion of the patient's chest.

4. The chest wall oscillation therapy system of claim 1, wherein the at least one sensor is arranged to provide at least nine-axis tracking of chest movement of the patient.

5. The chest wall oscillation therapy system of claim 1, wherein the at least one sensor comprises at least one accelerometer.

6. The chest wall oscillation therapy system of claim 1, wherein the at least one sensor comprises at least one gyroscope.

7. The chest wall oscillation therapy system of claim 1, wherein the at least one sensor comprises at least one magnetometer.

8. The chest wall oscillation therapy system of claim 1, wherein the therapy control system includes at least one processor for providing construction of motion based on data received from the at least one sensor.

9. The chest wall oscillation therapy system of claim 1, wherein the therapy control system is arranged in communication with a personal mobile device to communicate indication of the patient's chest.

10. The chest wall oscillation therapy system of claim 1, wherein the therapy control system includes a graphical user interface for communicating with a user.

11. The chest wall oscillation therapy system of claim 10, wherein the graphical user interface is arranged to present selectable options for user selection.

12. The chest wall oscillation therapy system of claim 11, wherein the selectable options for user selection include an oscillation start button for initiating operation to provide impact force to the patient.

13. The chest wall oscillation therapy system of claim 12, wherein responsive to user selection of the oscillation start button, the graphical user interface presents a pause button.

14. The chest wall oscillation therapy system of claim 12, wherein the selectable options for user selection include a new predetermined therapy regime button for user creation of a new predetermined therapy regime for implementation as the therapy regime.

15. The chest wall oscillation therapy system of claim 14, wherein the new predetermined therapy regime button is accessible by user activation of a pull tab for expansion.

16. The chest wall oscillation therapy system of claim 12, wherein the selectable options for user selection include an unlock button, wherein responsive to user selection of the unlock button at least one of frequency, intensity, and time buttons are presented as selectable options for user selection to configure corresponding features.

17. The chest wall oscillation therapy system of claim 16, wherein user activation of the unlock button includes dragging the unlock button to a predetermined extent.

18. The chest wall oscillation therapy system of claim 17, wherein the therapy control system includes a garment size toggle switch operable for user selection between an on position in which the therapy control system adapts configuration of the force generator to account for the size of the wearable garment, and an off position in which the therapy control system does not adapt configuration of the force generator to account for the size of the wearable garment.

19. The chest wall oscillation therapy system of claim 12, wherein the selectable options for user selection include a predetermined therapy regime tab for implementing a predetermined therapy regime as the therapy regime.

20. The chest wall oscillation therapy system of claim 19, wherein responsive to user selection of at least one of the predetermined therapy regime tab and an unlock button, a cough pause tab is presented for user selection to configure cough pause settings of the predetermined therapy regime.

21. The chest wall oscillation therapy system of claim 20, wherein responsive to user selection of the cough pause tab at least one of a cough pause enable switch and auto-restart switch is presented for user selection.

22. The chest wall oscillation therapy system of claim 21, wherein responsive to user selection of the cough pause enable switch to affirm cough pause, at least one of a pause duration and pause frequency button are presented for user selection to adjust corresponding features.

23. The chest wall oscillation therapy system of claim 11, the selectable options include a pull tab for user activation to present additional selectable options, wherein the additional selectable options include at least one of a home button, a cough pause settings button, and a delete therapy button.

24. The chest wall oscillation therapy system of claim 1, wherein the chest engagement device comprises a wearable garment.

25. The chest wall oscillation therapy system of claim 1, wherein the therapy control system configures the therapy force generator to have an exhalation setting for at least one of the oscillation rate and an intensity of the impact force during patient exhalation, the exhalation setting being greater than a predetermined nominal setting for the at least one of the oscillation frequency and the intensity of the impact force.

26. The chest wall oscillation therapy system of claim 1, wherein the therapy control system configures the therapy force generator to have an inhalation setting for the intensity of the impact force during patient inhalation, the inhalation setting being less than the exhalation setting during patient exhalation.

27. The chest wall oscillation therapy system of claim 26, wherein the inhalation setting is less than or equal to the predetermined nominal setting.

28. The chest wall oscillation therapy system of claim 1, wherein the therapy control system configures the therapy force generator to have an inhalation setting for at least one of the oscillation rate and an intensity of the impact force during patient inhalation, the inhalation setting being less than a predetermined nominal setting for the at least one of the oscillation frequency and the intensity of the impact force.

29. The chest wall oscillation therapy system of claim 28, wherein the therapy control system configures the therapy force generator to have an exhalation setting for at least one of the oscillation frequency and the intensity of the impact force during patient exhalation, the exhalation setting being greater than the inhalation setting during patient inhalation.

30. The chest wall oscillation therapy system of claim 29, wherein the exhalation setting is greater than or equal to the predetermined nominal setting.

* * * * *